United States Patent
Nakamura et al.

(10) Patent No.: US 6,185,312 B1
(45) Date of Patent: Feb. 6, 2001

(54) METHOD FOR EMBEDDING AND READING WATERMARK-INFORMATION IN DIGITAL FORM, AND APPARATUS THEREOF

(75) Inventors: Takao Nakamura; Hiroshi Ogawa; Yoichi Takashima, all of Yokohama (JP)

(73) Assignee: Nippon Telegraph and Telephone Corporation (JP)

(*) Notice: Under 35 U.S.C. 154(b), the term of this patent shall be extended for 0 days.

(21) Appl. No.: 09/014,159

(22) Filed: Jan. 27, 1998

(30) Foreign Application Priority Data

Jan. 28, 1997 (JP) .................................................. 9-014388
Mar. 12, 1997 (JP) .................................................. 9-057516
Apr. 25, 1997 (JP) .................................................. 9-109924
Jun. 20, 1997 (JP) .................................................. 9-164466
Jul. 23, 1997 (JP) .................................................. 9-197003

(51) Int. Cl.[7] .............................. G06K 9/00; G06K 9/36; G09C 3/00; B42D 15/00
(52) U.S. Cl. .......................... 382/100; 382/232; 382/251; 380/54; 283/113
(58) Field of Search .................................... 382/232, 100, 382/115, 284, 237, 251; 380/4, 54, 23, 3, 28, 55; 283/113, 17, 73

(56) References Cited

U.S. PATENT DOCUMENTS 5,339,108 * 8/1994 Coleman et al. ...................... 348/408
5,905,819 * 5/1999 Daly ...................................... 382/232
5,915,027 * 6/1999 Cox et al. ............................... 380/54
5,930,369 * 7/1999 Cox et al. ............................... 380/54

FOREIGN PATENT DOCUMENTS 9-191394  7/1997  (JP) ............................... H04N/1/387

OTHER PUBLICATIONS

"Video–Steganogrphy: How to Secretly Embed a Signature in a Picture," Kineo Matsui and Kiyoshi Tanaka, IMA Intellectual Property Project Proceedings, Jan. 1994, vol. 1, issue 1, pp. 187–205.*

(List continued on next page.)

Primary Examiner—Thomas D. Lee
Assistant Examiner—Wenpeng Chen
(74) Attorney, Agent, or Firm—Pennie & Edmonds LLP

(57) ABSTRACT

An apparatus for embedding information comprises: a blocking step for dividing data to be processed into blocks; an orthogonal transform step for obtaining coefficients by carrying out orthogonal transformation for each block; an embedding coefficient selecting step for determining coefficients in which the watermark-information will be embedded by using a random sequence which is generated by initial value; an information embedding step for sequentially embedding the watermark-information, which has arbitrary length of bits, by quantizing value of said coefficients using a predetermined value for quantization; and an inverse orthogonal transform step for carrying out inverse orthogonal transformation for modified coefficients to form block in which the watermark-information is embedded, as well as combining the divided blocks and reconstructing the original form.

75 Claims, 62 Drawing Sheets

OTHER PUBLICATIONS

"Image Authentication for a Slippery New Age," Steve Walton, Dr. Dobb's Journal, Apr. 1995, pp. 18–87.*

T. Nakamura et al., "A method of watermarking under frequency domain for protecting copyright of digital image," 1997 Symposium on Cryptography and Information Security, Jan. 29, 1997.

H. Nakazawa et al., "A study on digital watermarking on MPEG2 video for copyright protection," 1997 Symposium on Cryptography and Information Security, Jan. 29, 1997.

H. Ogawa et al., "A copyright information embedding method using DCT for digital movies," 1997 Symposium on Cryptography and Information Security, Jan. 29, 1997.

T. Nakamura et al., "A watermarking technique based on frequency domain modification," The Institute of Electronics, Information and Communication Engineers, Mar. 24, 1997.

T. Nakamura et al., "A watermarking technique aimed at image quality improvement," The Institute of Electronics, Information and Communication Engineers, Sep. 3, 1997.

H. Ogawa et al., "An effectiveness of the digital watermarking method for interframe," The Institute of Electronics, Information and Communication Engineers, Sep. 3, 1997.

H. Ogawa et al., "A method of copyright protection for digital movies using invisible digital watermark," Information Processing Society of Japan, Sep. 24, 1997.

Bors and Pitas, 1996, "Embedding Parametric Digital Signatures in Images", Proceedings of EUSIPCO–96, vol. 3, 10–13, pp. 1701–1704.

Swanson et al., 1996, "Transparent Robust Image Watermarking", Proceedings of the Singapore International Conference on Image Processing, vol. 3, No. 3, pp. 211–214.

Zhao et al., 1995, "Embedding Robust Labels Into Images For Copyright Protection", Fraunhofer Institute for Computer Graphics, Darmstadt, Germany, Proceedings of the Knowright, Conference, Proceedings of the International Congress on Intellectual Property Rights for Specialized Information, Knowledge and New Technology, pp. 242–251.

* cited by examiner

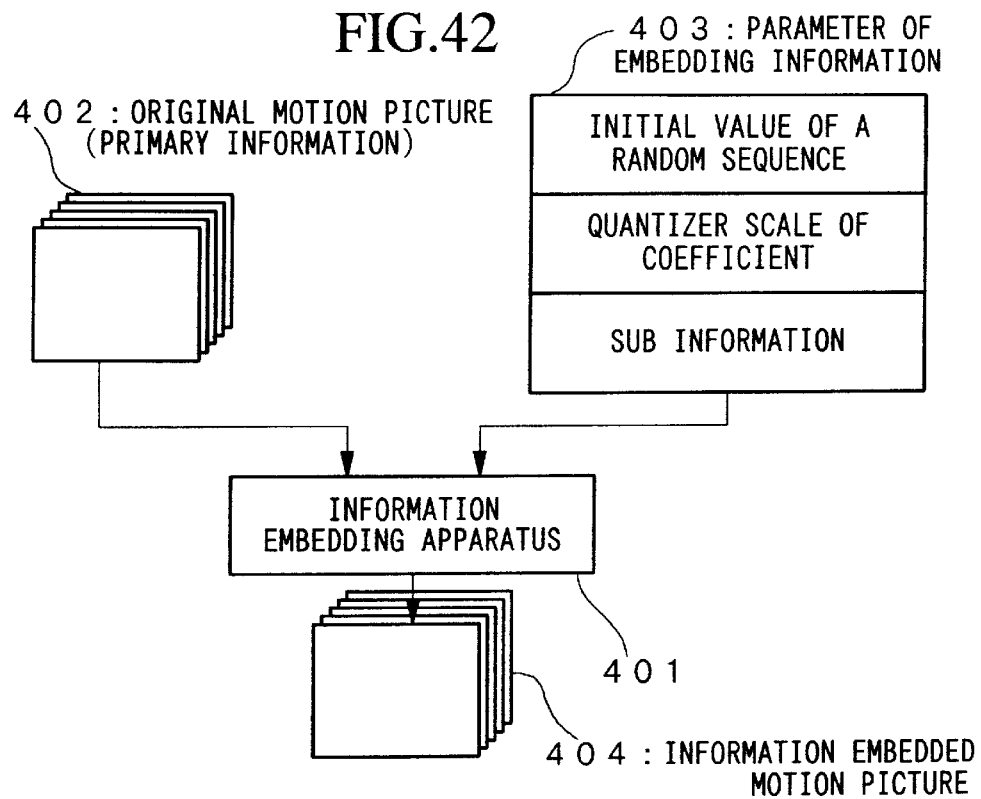
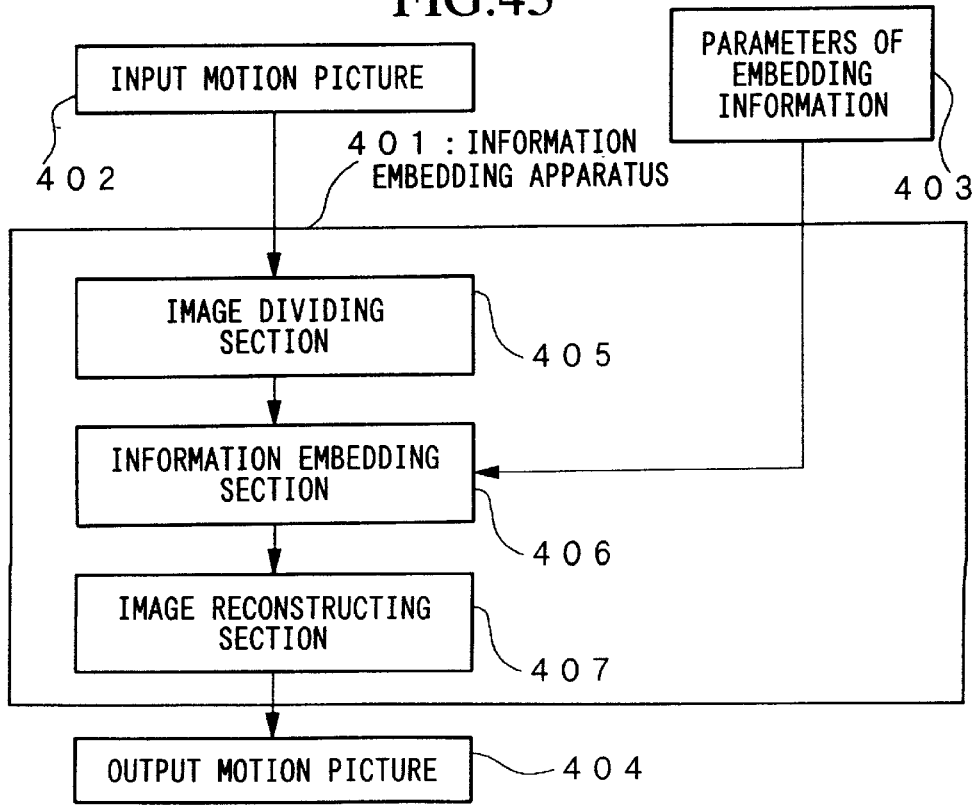

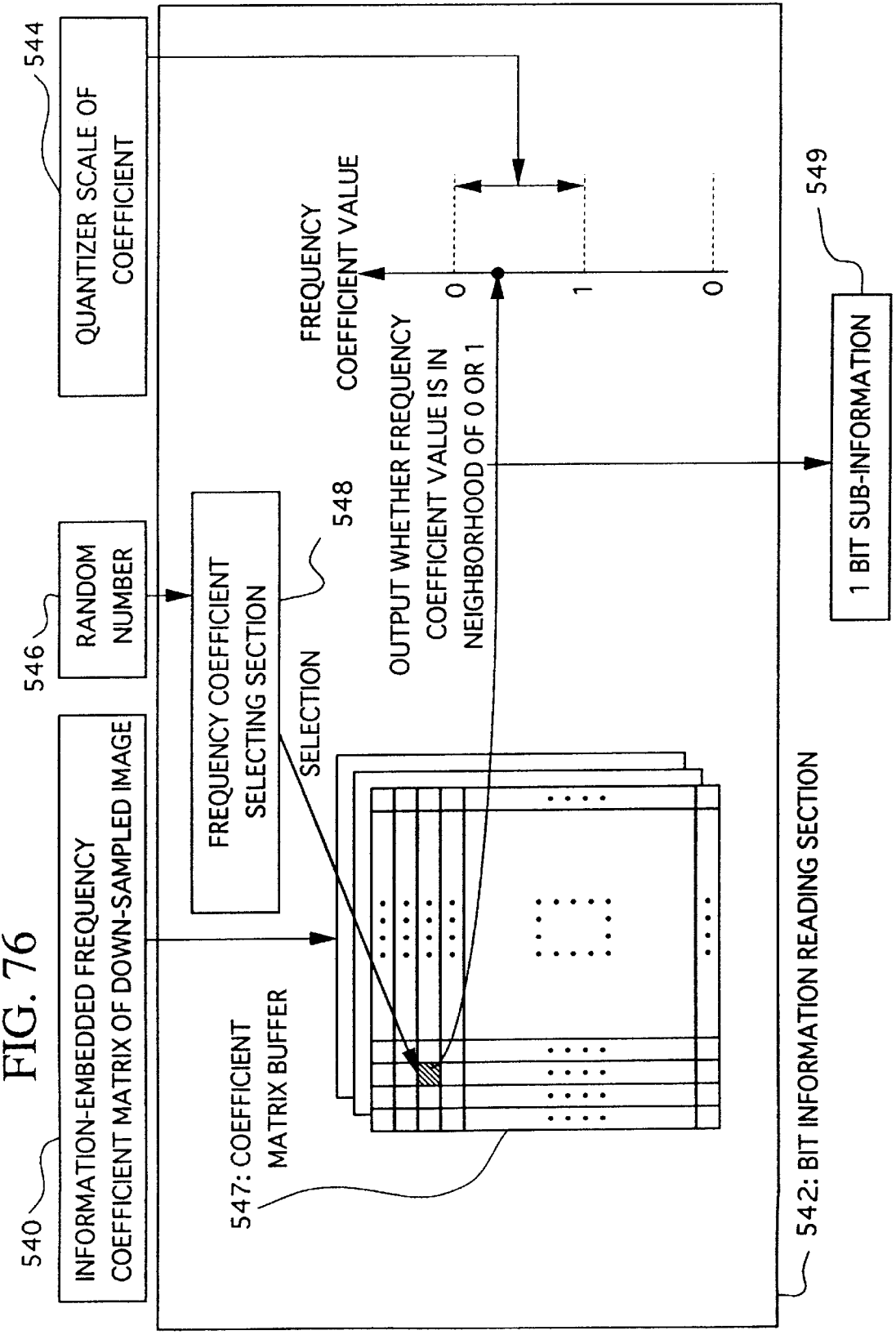

METHOD FOR EMBEDDING AND READING WATERMARK-INFORMATION IN DIGITAL FORM, AND APPARATUS THEREOF

BACKGROUND OF THE INVENTION

1. Field of the Invention

The present invention relates to a method of embedding watermark-information so as not to be perceived by the human senses when other information is embedded in digital information, and to a method of reading the watermark-information embedded in the digital information and to apparatus therefor. The term watermark-information is used herein to describe the information to be embedded, due to its analogy to the watermark used to prevent forging of banknotes.

2. Description of the Related Art

The technique of embedding other information into digital information so as not to be perceived by the human senses has now been widely used for the protection of copyright of digital information contents or in systems for preventing false reproduction, by embedding the copyright information, the user ID and the like into the information contents.

With the conventional technique, however, there is a problem in that the embedded information is easily deleted by the lossy compression processing or the compilation processing of the digital information represented by the JPEG (Joint Photograph Expert Group) and the MPEG (Motion Picture Expert Group). Furthermore, since the processing is complicated, it has been difficult to perform embedding and reading of the motion picture and the like on a real-time basis. Assuming that the object in which the information is embedded is, for example, an image, since an area where the luminance change is small is comparatively easily perceived by the human sense, it is difficult to perform embedding without deteriorating the image quality. Moreover, in the lossy compression, the pixel information is deleted in an area where the luminance change is small rather than in an area where the luminance change is large. Therefore, when the lossy compression is performed after the information is embedded with respect to an image having a small luminance change, there is a problem in that the embedded information cannot be read.

SUMMARY OF THE INVENTION

It is the object of the present invention to make it possible to read embedded information even if compression processing or compilation processing are performed, and to minimize the deterioration of the digital information even if information has been embedded in the digital information, which have been problems with the technique of embedding the information which can not be perceived by the human senses.

With a view to attaining the above objectives, there is provided a method of embedding information comprising the steps of: dividing data to be processed into fixed size data groups which are called blocks; obtaining coefficients by carrying out orthogonal transformation for each block; determining coefficients in which the watermark-information will be embedded by using a random sequence which is generated by initial value; sequentially embedding the watermark-information, which has arbitrary length of bits, by quantizing value of said coefficients using a predetermined value for quantization; and carrying out inverse orthogonal transformation for modified coefficients to form block in which the watermark-information is embedded, as well as combining the divided blocks and reconstructing the original form. Also provided is an apparatus therefor, and a recording medium which stores the information embedding program.

Furthermore, in order to read the information from the data embedded with information by the above-mentioned method, there is provided a method of reading information comprising the steps of: dividing the information-embedded data into blocks; determining coefficients from which the watermark-information will be read by using a random sequence which is generated by initial value which is used at the time of embedding the watermark-information; obtaining the coefficients by carry out orthogonal transformation for each block; sequentially reading each bit of the embedded watermark-information; and outputting the read watermark-information. Also provided is an apparatus therefor, and a recording medium which stores the information reading program.

As described above, when the information is embedded, then by embedding the information to the orthogonal transformation coefficient which is relatively not affected by quantization by the data compression, the embedded information can remain even if extreme compression is performed. Moreover, by suitably carrying out quantization using local features of the digital information which is the object of the information embedding, then deterioration of the digital information after embedding is minimal compared to with normal embedding methods.

BRIEF DESCRIPTION OF THE DRAWINGS

FIG. 42 is a schematic diagram showing an information input/output relationship of an information-embedding-apparatus according to a fourth embodiment;

FIG. 43 is an overall structure diagram of one example of the information-embedding-apparatus according to the fourth embodiment;

FIG. 76 is a conceptual diagram of a schematic structure and processing of a bit-information-reading-section of FIG. 73.

DESCRIPTION OF PREFERRED EMBODIMENTS

The information embedding method, the information reading method and the apparatus thereof according to one embodiment of the present invention will now be described with reference to the accompanying drawings.

First, the structure and the general operation of the information embedding apparatus and the information reading apparatus of the present invention will be explained.

Figure 1:
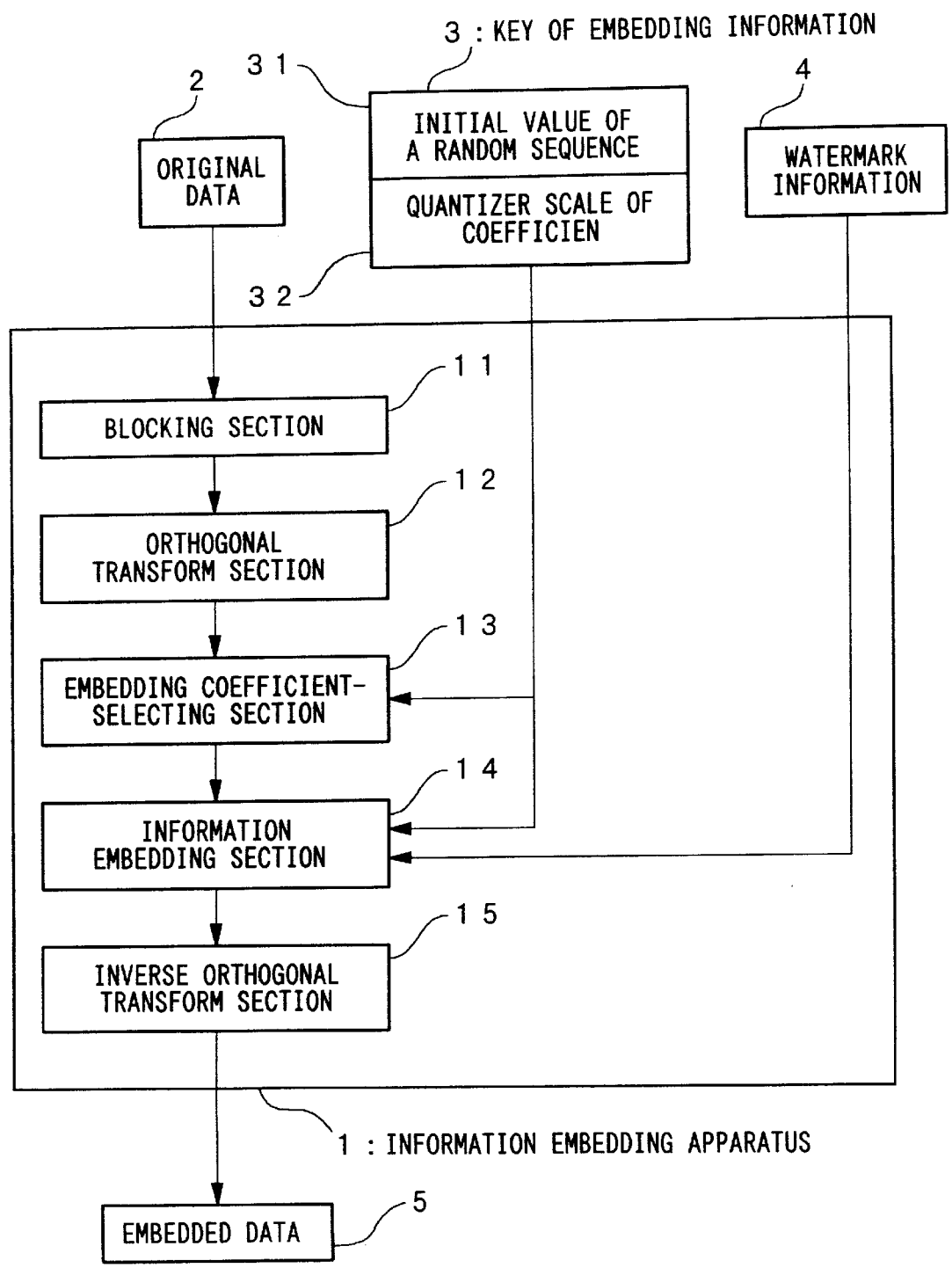
FIG. 1 is a schematic block diagram showing one embodiment of an information-embedding-apparatus according to the present invention.

FIG. 1 is a schematic block diagram showing one embodiment of an information embedding apparatus of the present invention. Referring to FIG. 1, the information-embedding-apparatus 1 comprises; a blocking-section 11 (a section for dividing the information into blocks), an orthogonal-transform-section 12, an embedding-coefficient-selecting-section 13, an information-embedding-section 14 and an inverse-orthogonal-transform-section 15.

Figure 2:
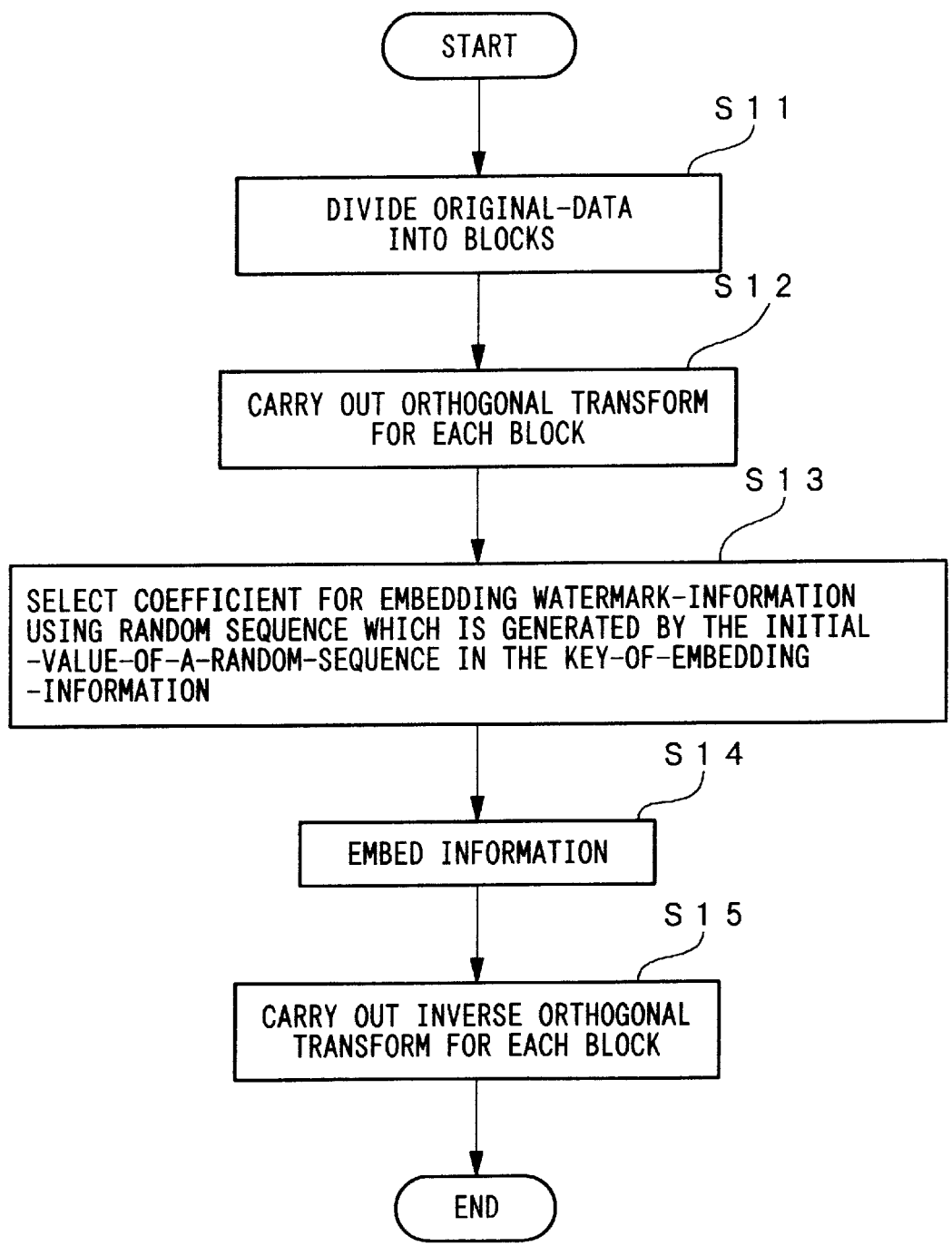
FIG. 2 is a flow chart showing the operation of the information-embedding-apparatus of FIG. 1.

An outline of the operation of this information-embedding-apparatus 1 will be described using FIG. 2, with reference to FIG. 1.

First, original-data 2 to be processed is divided into data groups having a predetermined size which are called blocks, by the blocking-section 11 (step S11).

Then, the-orthogonal-transform-section 12 carries out orthogonal transformation for each block, and coefficients of the orthogonal transformation are obtained (step S12).

After this, the-initial-value-of-random-sequence 31 in the key-of-embedding-information 3 is read by the-embedding-coefficient-selecting-section 13, and a random sequence is generated by the-initial-value-of-the-random-sequence 31. Moreover, coefficients in which the watermark-information 4 will be embedded are determined using the random sequence in the-embedding-coefficients-selection-section 13 (step S13).

Then watermark-information 4 is embedded sequentially by the-information-embedding-section 14, by quantizing the coefficients determined in step S13, using an quantizer-scale-of-coefficient 32 being the information related to the quantization in the key-of-embedding-information 3, and the watermark-information 4 having an arbitrary length of bits, being the watermark-information (step S14).

After this, the-inverse-orthogonal-transform-section 15 carries out inverse orthogonal transformation for the coefficients in which the watermark-information 4 is embedded in step S14 to form block in which the watermark-information 4 is embedded, and combines divided blocks and reconstructs the original form, then outputs the embedded-data 5 being data embedded with the watermark-information 4 (step S15).

As described above, the information-embedding-apparatus 1 embeds the watermark-information 4 in the original-data 2 using the key-of-embedding-information 3, and outputs the embedded-data 5. Incidentally, it is assumed that at least the initial-value-of-a-random-sequence 31 used in the embedding-coefficient-selecting-section 13, and the quantizer-scale-of-coefficient 32 used in the information-embedding-section 14 are contained in the key-of-embedding-information 3. Here, the orthogonal transform coefficient change width 33 means the information relating to the method of quantizing the orthogonal transform coefficient, or of reading the embedded information.

Figure 3:
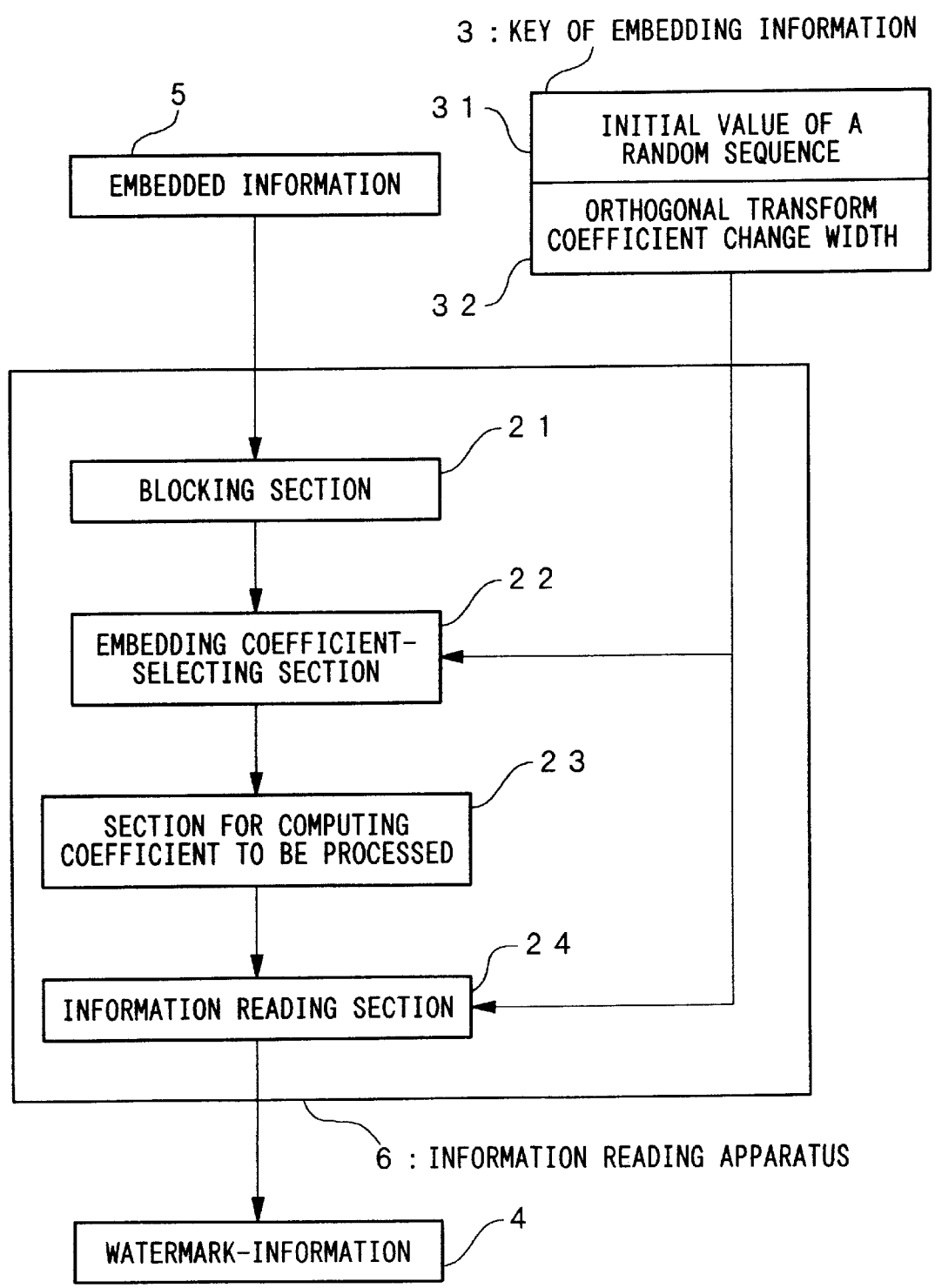
FIG. 3 is a schematic block diagram showing one embodiment of an information-reading-apparatus according to the present invention.

FIG. 3 is a schematic block diagram showing one embodiment of an information-reading-apparatus 6 according to the present invention. The information-reading-apparatus 6 comprises; a blocking-section 21, an embedding-coefficient-selecting-section 22, a section-for-computing-coefficient-to-be-processed 23, and an information-reading-section 24.

Figure 4:
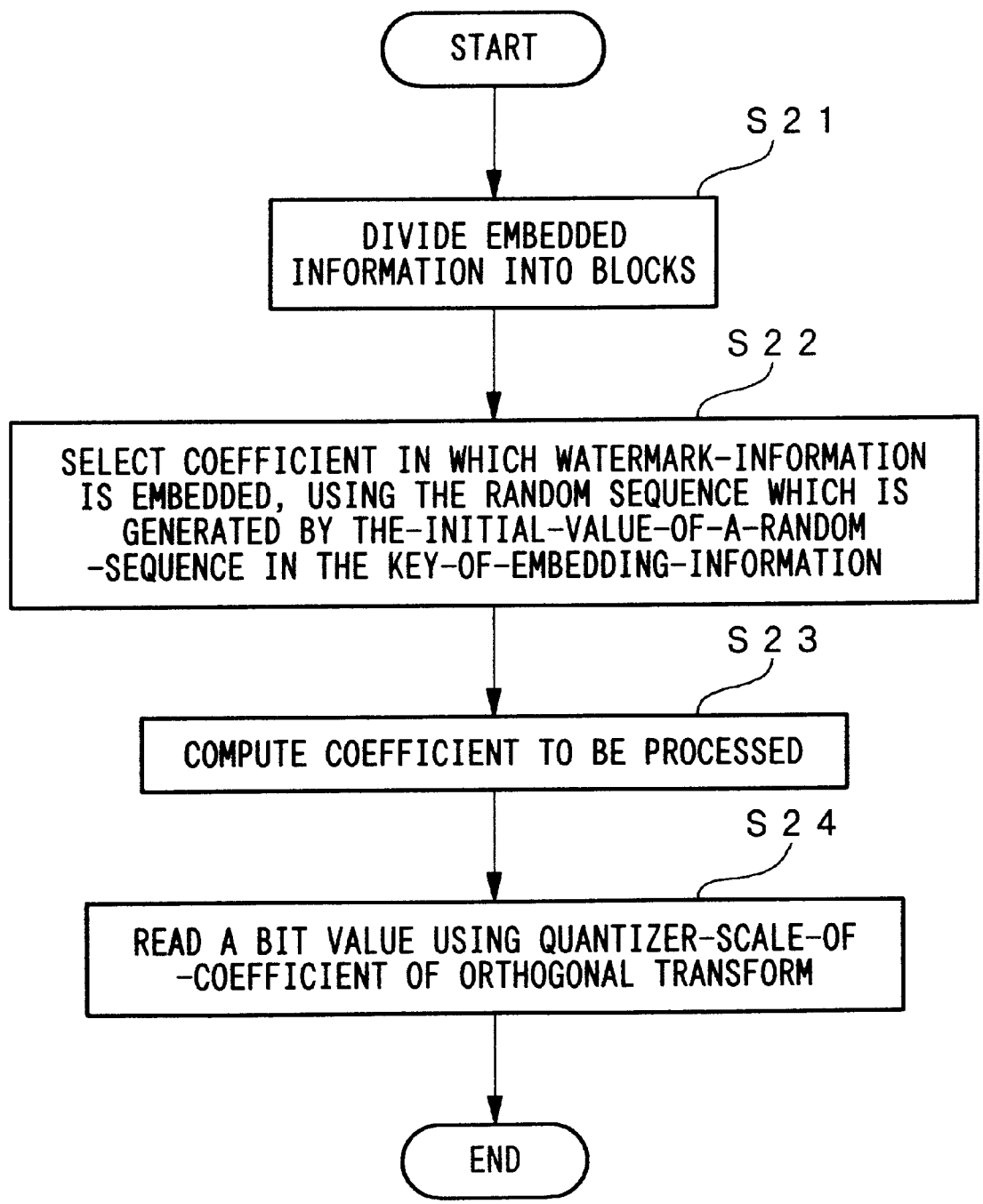
FIG. 4 is a flow chart showing the operation of the information-reading-apparatus of FIG. 3.

The general operation of this information-reading-apparatus 6 will be described using FIG. 4, with reference to FIG. 3.

First, the embedded-data 5 is divided into blocks by the blocking-section 21 (Step S21). Incidentally, the blocking-section 21 performs the same operation as the blocking-section 11 in the information-embedding-apparatus 1, and divides the information into blocks having the same size as that of the block at the time of embedding the information.

Next, the-initial-value-of-a-random-sequence 31, which is used at the time of embedding the watermark-information 4, is read by the-embedding-coefficient-selecting-section 22, and a random sequence is generated by using the initial-value-of-a-random-sequence 31. Moreover, coefficients (being the object) from which the watermark-information 4 will be read are determined by using the random sequence in the embedding-coefficient-selecting-section 22 (step S22). This embedding-coefficient-selecting-section 22 must perform the same operation as that of the embedding-coefficient-selecting-section 13 of the-information-embedding-apparatus 1.

Then, in order to obtain the coefficients which is decided as the object in step S22, the section-for-computing-coefficient-to-be-processed 23 carries out orthogonal transformation for each block obtained in step S21(step S23). The orthogonal transformation used here must be the same orthogonal transformation used in the orthogonal-transform-section 12 of the information-embedding-apparatus 1.

Then, with the information-reading-section 24, each bit of the embedded watermark-information is sequentially read from the obtained coefficients in step S23, and the embedded watermark-information 4 is output (step S24). In addition, in the information-reading-section 24, the quantizer-scale-of-coefficient 32 are used for sampling the bit, however it is not always used according to the bit reading method.

As described above, the watermark-information 4 is read from the embedded-data 5 in which the information is embedded by the information-embedding-apparatus 1.

Incidentally, the order of the above steps S23 and S22 may be changed. That is, the blocks obtained by the blocking-section 21 are orthogonally transformed by the section-for-computing-coefficient-to-be-processed 23, to obtain the orthogonal transform coefficient group for the whole block. Then the initial-value-of-a-random-sequence 31 used at the time of embedding the information is read by the embedding-coefficient-selecting-section 22, and the first orthogonal transform coefficient for reading the embedded information is selected from the obtained orthogonal transform coefficient group. Moreover the orthogonal transform coefficient (being the object) from which the information is sequentially read by the random number may be selected from the obtained orthogonal transform coefficient group.

This information-embedding-apparatus 1 and the information-reading-apparatus 6 will now be described in detail for each embodiment, using a motion picture or a still image as an example of the original-data 2 in which the information is to be embedded.

First Embodiment

A first embodiment of the present invention will now be described with reference to the accompanying drawings.

Figure 5:
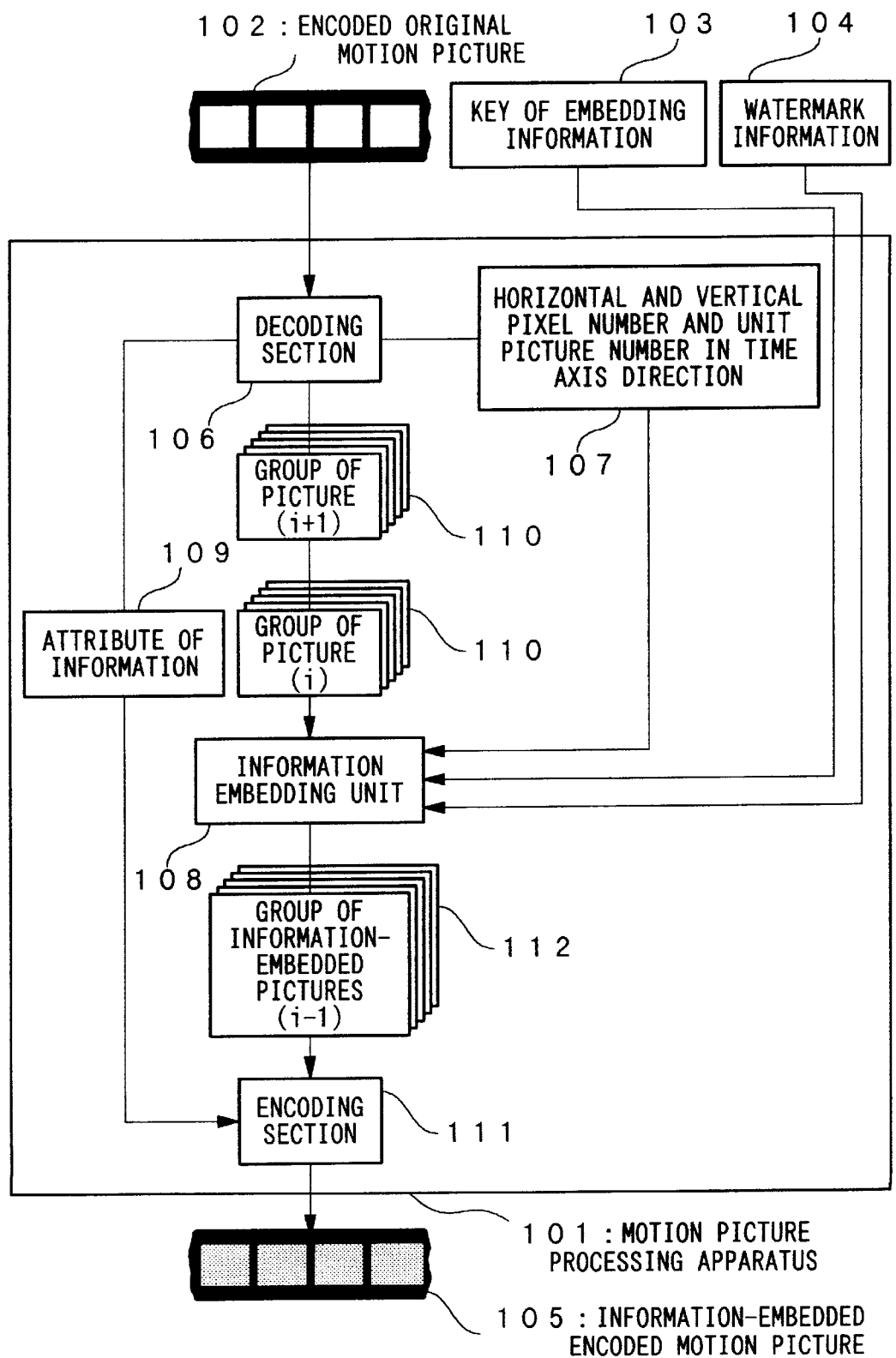
FIG. 5 is a schematic block diagram showing one embodiment of an embedding processing side of a motion-picture-processing-apparatus according to the first embodiment.

FIG. 5 is a diagram showing the processing of the motion picture processing apparatus on the information embedding processing side according to the present invention, and the data flow thereof. With the motion-picture-processing-apparatus 101, an encoded-original-motion-picture 102, a key-of-embedding-information 103 and watermark-information 104 are input, and an information-embedded-encoded-motion-picture 105 is output.

The motion-picture-processing-apparatus 101 receives the encoded-original-motion-picture 102, and interprets the format of the picture using the decoding-section 106 to perform decoding. The decoding-section 106 first reads the horizontal and vertical pixel numbers and the unit picture numbers in the time axis direction 107 from the received motion picture, and sends these to the information-embedding-unit 108. Here, the unit picture numbers in the time axis direction are, for example, the frame numbers in the GOP (Group Of Pictures) in the digital motion picture encoding method of the MPEG (Moving Picture image coding Experts Group). Thereafter, the decoding-section 106 resolves the motion picture data into attribute-of-information 109 of the motion picture and frame pictures 110 (for example, frame pictures per 15 pieces) of the unit picture numbers in the time axis direction, and sequentially sends the attribute-of-information 109 to the encoding-section 111, and the frame pictures 110 of the unit picture numbers in the time axis direction to the information-embedding-unit 108. The information-embedding-unit 108 receives as an input the key-of-embedding-information 103, the watermark-information 104, the picture horizontal and vertical pixel numbers and the unit picture numbers in the time axis direction 107, and the frame pictures 110 of the unit picture numbers in the time axis direction, and performs the information embedding processing to output the information-embedded frame pictures 112 of the unit picture number in the time axis direction. The encoding-section 111 encodes the attribute-of-information 109 of the motion picture and the information-embedded frame pictures 112 of the unit picture numbers in the time axis direction, while receiving these in synchronous and outputs the information-embedded-encoded-motion-picture 105.

As described above, this embodiment relates to the motion-picture-processing-apparatus 101 which embeds the information in the motion picture already encoded by the MPEG and the like, and outputs it again as the encoded motion picture. Comparing FIG. 1 and FIG. 5, the information-embedding-unit 108 in FIG. 5 corresponds to the information-embedding-apparatus 1 in FIG. 1. In addition, the group of pictures 110 and the group of information-embedded pictures 112 in FIG. 5 correspond to the original-data 2 and the embedded-data 5 in FIG. 1, respectively. Moreover, the key-of-embedding-information 103 and the watermark-information 104 in FIG. 5 correspond to the key-of-embedding-information 3 and the watermark-information 4 in FIG. 1, respectively.

Figure 6:
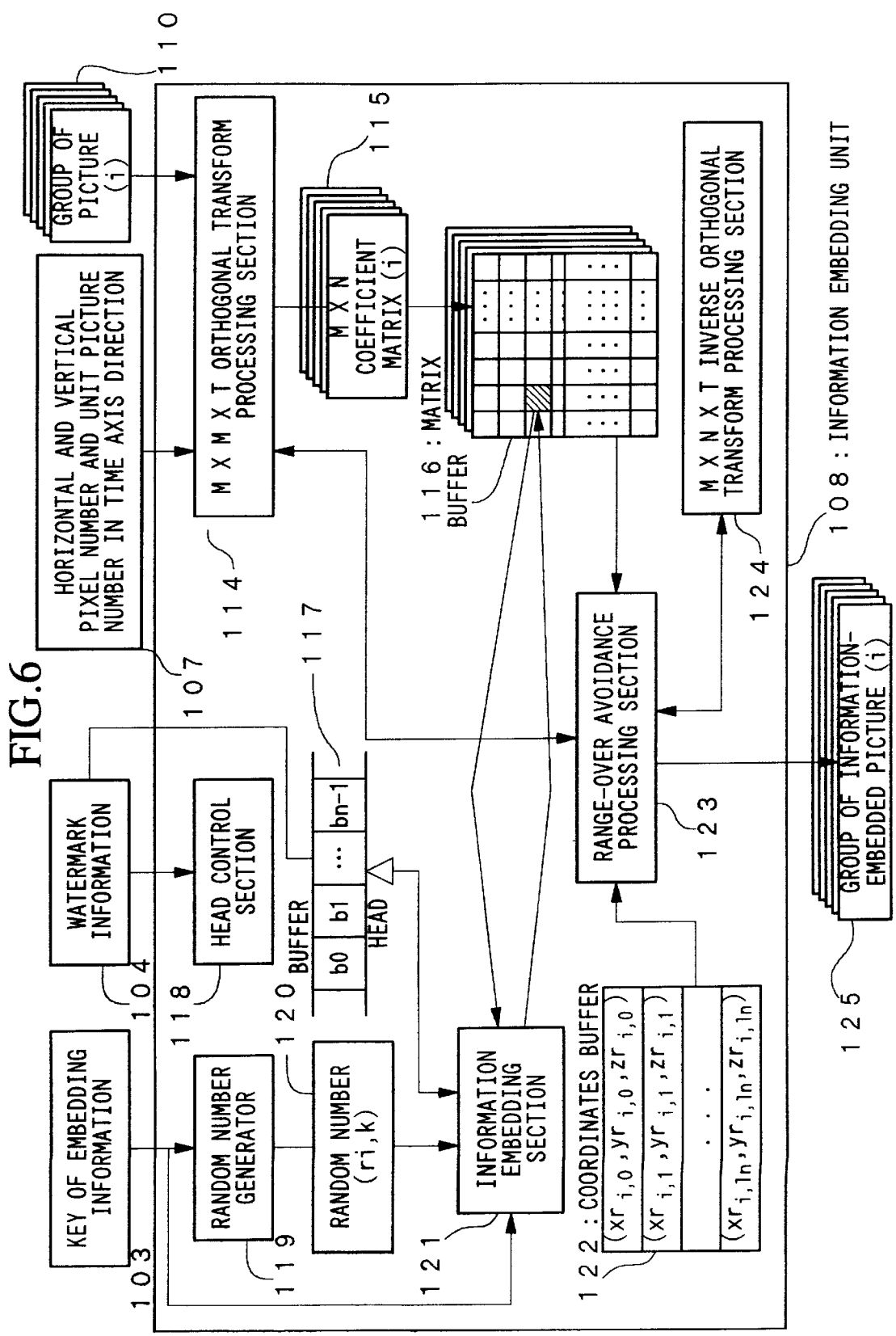
FIG. 6 is a detailed block diagram of an information-embedding-unit of FIG. 5.

Next, the information-embedding-unit 108 will be described. FIG. 6 is a structure diagram of the information-embedding-unit 108, which uses an M×N×T orthogonal transform. Here, M is the horizontal pixel numbers of the picture, N is the vertical pixel numbers of the picture, and T is the unit picture numbers in the time axis direction, but these are only one example.

First, the structural correspondence of the information-embedding-unit 108 of FIG. 6 to the information-embedding-apparatus 1 of FIG. 1 will be described. The functions of the blocking-section 11 and the orthogonal-transform-section 12 in FIG. 1 are included in an M×N×T orthogonal transform section 114 in FIG. 6. The function of the embedding-coefficient-selecting-section 13 in FIG. 1 is realized by a part of the function of an information-embedding-section 121 and a random-number-generator 119 in FIG. 6, and the information-embedding-section 14 in FIG. 1 corresponds to a part of the function of the information-embedding-section 121 and a head-control-section 118 in FIG. 6. Furthermore, the inverse-orthogonal-transform-section 15 in FIG. 1 corresponds to an M×N×T-inverse-orthogonal-transform-processing-section 124 and a range-over-avoidance-processing-section 123. In addition, in FIG. 6, various buffers are provided to be used in the respective processing sections.

In FIG. 6, in the information-embedding-unit 108, at first the M×N×T-orthogonal-transform-processing-section 114 transforms the input horizontal and vertical pixel numbers (M and N) and the unit picture numbers in the time axis direction (M×N×T) 107, and the frame pictures 110 of the unit picture numbers in the time axis direction, into an M×N×T coefficient matrix 115. This coefficient matrix 115 is stored in a matrix buffer 116.

On the other hand, the watermark-information 104 is stored in the buffer 117. Here, the input watermark-information 104 is assumed to be a bit matrix $b_0, b_1 \ldots b_{n-1}$ (with the bit length designated as n). The head-control-section 118 fixes the head position at the first bit $b_0$, every time there is an input of new watermark-information 104.

The random-number-generator 119 generates one random number ($r_{i,k}$) 120 per bit of the watermark-information 104, designating the former half of the input key-of-embedding-information 103 as the initial-value-of-a-random-sequence 31, and sends it to the information-embedding-section 121. Here, it is assumed that the random-number-generator 119 generates a sufficiently large figure so there is no conflict with each other. The latter half of the input key-of-embedding-information 103 is sent to the information-embedding-section 121, and transformed into an information embedding intensity embedding_range being the quantizer-scale-of-coefficient 32.

Next, is a description of the case where the k-th embedded information bit $b_k \in \{0, 1\}$ read by an information read head from amongst the watermark-information 104 stored in a buffer 117 is embedded in an M×N×T coefficient matrix $[c_{(h, v, t)}]_i$ stored in the matrix buffer 116.

The information-embedding-section 121 selects one coefficient $c(h_{r_{i,k}}, v_{r_{i,k}}, t_{r_{i,k}})$ in a low frequency domain from amongst the M×N×T coefficient matrix $[c_{(h, v, t)}]_i$ stored in the matrix buffer 116, using the random number $r_{i,k}$ sent from the random-number-generator 119 so that there is no conflict in the orthogonal transform matrix, and changes its value according to the following rules:
in the case where the embedded information $b_k$ is equal to:

$$c(h_{r_{i,k}}, v_{r_{i,k}}, r_{r_{i,k}}) \text{ to: } \left\lfloor \frac{c(h_{r_{i,k}}, v_{r_{i,k}}, t_{r_{i,k}})}{\text{embedding\_range}} \right\rfloor \times \text{embedding\_range}$$

$$\left\lfloor \frac{c(h_{r_{i,k}}, v_{r_{i,k}}, t_{r_{i,k}})}{\text{embedding\_range}} + \frac{1}{2} \right\rfloor \bmod 2$$

in the case where the embedded information $b_k$ is not equal to:

$$\left\lfloor \frac{c(h_{r_{i,k}}, v_{r_{i,k}}, t_{r_{i,k}})}{\text{embedding\_range}} + \frac{1}{2} \right\rfloor \bmod 2$$

and: $\left\lfloor \frac{c(h_{r_{i,k}}, v_{r_{i,k}}, t_{r_{i,k}})}{\text{embedding\_range}} + \frac{1}{2} \right\rfloor$ is equal to: $\left\lfloor \frac{c(h_{r_{i,k}}, v_{r_{i,k}}, t_{r_{i,k}})}{\text{embedding\_range}} \right\rfloor$ and to: $\left\lfloor \frac{c(h_{r_{i,k}}, v_{r_{i,k}}, t_{r_{i,k}})}{\text{embedding\_range}} \right\rfloor \times \text{embedding\_range}$ in the case where the embedded information $b_k$ is not equal to:

$$\left\lfloor \frac{c(h_{r_{i,k}}, v_{r_{i,k}}, t_{r_{i,k}})}{\text{embedding\_range}} + \frac{1}{2} \right\rfloor \bmod 2$$

and: $\left\lfloor \frac{c(h_{r_{i,k}}, v_{r_{i,k}}, t_{r_{i,k}})}{\text{embedding\_range}} + \frac{1}{2} \right\rfloor$ is not equal to: $\left\lfloor \frac{c(h_{r_{i,k}}, v_{r_{i,k}}, t_{r_{i,k}})}{\text{embedding\_range}} \right\rfloor$ to thereby embed the bit k which is the water-mark-information 140. In the equations, "[X]" indicates a maximum integer not exceeding X and "x mod y" indicates the remainder after dividing x by y. The thus selected orthogonal transform coefficient is quantized using the information embedding intensity embedding_range, and the nearest quantized value is selected according to the value of bit k, to thereby embed the watermark-information (embedding).

The coordinates ($h_{r_{i,k}}$, $v_{r_{i,k}}$, $t_{r_{i,k}}$) of the embedded coefficient are stored in a coordinates buffer 122.

The head-control-section 118 shifts the head position to the head position $b_0$ when the head position is $b_n$, and shifts the head position by one to the right in other cases, thereby shifting the head position from $b_k$ to $b_{k+1}$. Synchronously therewith, the random-number-generator 119 generates the next random number.

The information-embedding-section 121 takes the input of each bit in the buffer 117 and the random number 120 sequentially, and performs the above-mentioned embedding process n times for the bit length of the watermark-information 104 with respect to the M×N×T coefficient matrix in the matrix buffer 116. This is then repeated one more time as indicated by the secret information in the information-embedding-section 121 (here, it is assumed that one time is specified as the number of repeat times). Thereby, the watermark-information 104 is embedded in the M×N×T frame picture in a closed format, a plural number of times (n×1).

In the embodiment of FIG. 6, after the embedding processing in the information-embedding-section 121 is repeated 1×n times, the coefficient matrix $[c_{(h, v, t)}]_i$ stored in the matrix buffer 116 is sent to the range-over-avoidance-processing-section 123. The range-over-avoidance-processing-section 123 cooperates with the M×N×T-inverse-orthogonal-transform-processing-section 124 and the M×N×T-orthogonal-transform-processing-section 114 to avoid the range-over of the pixel value.

Here, it is designated that matrix $[P1_{(h, v, t)}]$ is a pixel value matrix obtained by changing the (0, 0, 0) component value (DC component) of the coefficient matrix $[c_{(h, v, t)}]_i$ input to the range-over-avoidance-processing-section 123 to the minimum value of the defined range and setting all the values of the coefficients of the 1×n coordinates in the coordinates buffer 122 to 0, and after that inversely transforming the changed matrix using the M×N×T inverse-orthogonal-transform-processing-section 124. Also, it is designated that matrix $[p2_{(h, v, t)}]_i$ is a pixel value matrix obtained by changing the (0, 0, 0) component value [DC component] of the coefficient matrix $[c_{(h, v, t)}]_i$ input to the range-over-avoidance-processing-section 123 and setting the values of the coefficients other than the components of the 1×n coordinates in the coordinates buffer 122 to 0, and after that inversely transforming the changed matrix using the M×N×T inverse-orthogonal-transform-processing-section 124. The middle value of defined range of the pixel value is designated as Lm.

The range-over-avoidance-processing-section 123 obtains the pixel value matrix $[p'_{(h, v, t)}]_i$ by calculating $$\forall h \forall v \forall t \ p'_{(h,v,t)_i} = \lfloor const_{f_i} \cdot p1_{(h,v,t)_i} + const_{g_i} \rfloor$$

where, $const_{f_i}$ is $$\min_{(x,y,z) \in A_i} \left\{ \frac{f_{(x,y,z)}}{p1_{(x,y,z)_i}} \right\},$$

$const_{g_i}$ is $$const_{g_i} = \begin{cases} \max(x, y, z) \in A_i \{|p2_{(x,y,z)} - Lm| - Lm\} \cdot \frac{Lm - p2_{(x,y,z)}}{|Lm - p2_{(x,y,z)}|} \\ (\text{if } p_{(x,y,z)_i} < L\min, p2_{(x,y,z)_i} < L_{(x,y,z)_i} \text{ or } P_{(x,y,z)_i} > \\ L\max, p2_{(x,y,z)_i} > L\max) \\ 0 \\ (\text{if}\{(x, y, z) \mid p_{(x,y,z)} < L\min, p2_{(x,y,z)_i} < \\ L\min \text{ or } p_{(x,y,z)_i} > L\max, p2_{(x,y,z)_i} > L\max\} = \Phi), \end{cases}$$

and $f(x, y, z)$ is $$f(x, y, z) = \begin{cases} L\min - P2_{(x,y,z)_i} & \text{if } p_{(x,y,z)_i} < L\min, p2_{(x,y,z)_i} > L\min \\ L\max - P2_{(x,y,z)_i} & \text{if } p_{(x,y,z)_i} < L\max, p2_{(x,y,z)_i} > L\max \end{cases}$$

using $[p1(x, y, z)]i$, and $[p2(x, y, z)]i$, in the set $Ai=\{(x, y, z)|p(x, y, z)1<L_{min}$ or $p(x, y, z)i>L_{max}\}$ ($L_{min}$ is the minimum value of the pixel value, and $L_{max}$ is the maximum value of the pixel value), only when Ai is not an empty set. Then by orthogonally transforming it using the M×N×T-orthogonal-transform-processing-section 114, obtains the coefficient matrix $[c'_{(h, v, t)}]_i$ in which the measures against the range-over of the pixel value have been taken. However, in the pixel value matrix $[p2_{(h, v, t)}]_i$, when a pixel value smaller than $L_{min}$ and a pixel value larger than $L_{max}$ exist together, the algorithm of this range-over avoidance is not applicable.

In the range-over-avoidance-processing-section 123, the coefficient matrix $[c'_{(h, v, t)}]_i$ in which measures against range-over of the pixel value have been taken, is again inverse orthogonally transformed using the M×N×T-inverse-orthogonal-transform-processing-section 124, to output a group of the information-embedded frame pictures 125 of unit picture number in the time axis direction. As described above, processing so that the value after the inverse orthogonal transform does not exceed a defined range, is performed using the orthogonal transform coefficient.

By repeating the above-mentioned embedding process for each unit picture in the time axis direction n times being the information bit length to be embedded, for every one of the secret information in the information-embedding-section 121, the embedding processing for one motion picture is completed.

Figure 7:
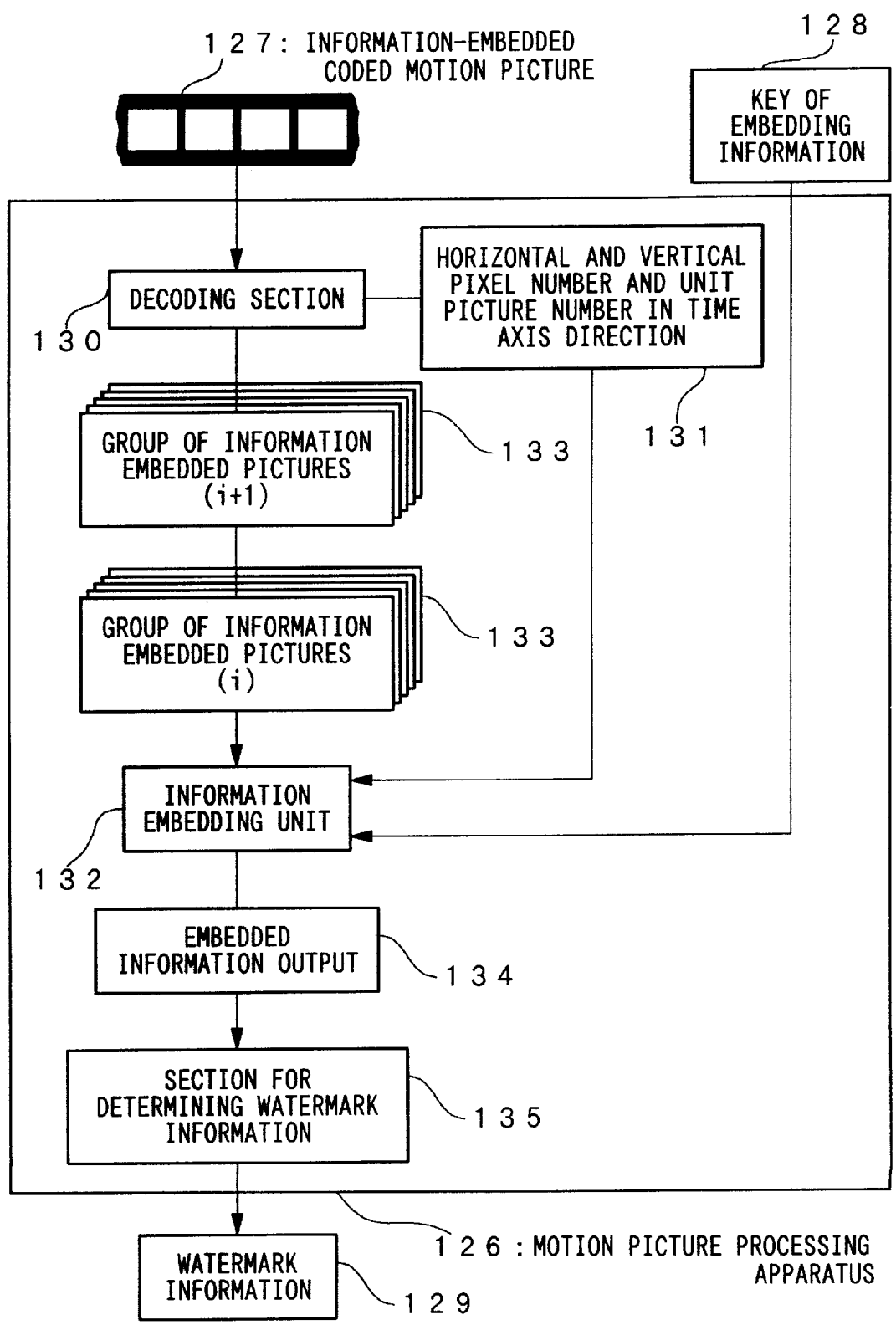
FIG. 7 is a schematic block diagram showing one embodiment of an information read processing side of a motion-picture-processing-apparatus according to the first embodiment.

FIG. 7 is a diagram showing the processing of the motion picture processing apparatus on the information read processing side, according to the present invention, and the data flow thereof With a motion-picture-processing-apparatus 126, a motion picture 127 in which the information has already been embedded and coded and an key-of-embedding-information 128 are input, and the information embedded in the motion picture, being watermark-information 129, is output.

As described above, this embodiment relates to the motion-picture-processing-apparatus 126 which reads the embedded information from the information-embedded and coded motion picture 127 already encoded by the MPEG and the like. Comparing FIG. 3 and FIG. 7, an information-reading-unit 132 and a watermark-information-determining-processing-section 135 in FIG. 7 correspond to the information-reading-apparatus 6 in FIG. 3. In addition, group-of-information-embedded-pictures 133 and the watermark-information 129 in FIG. 7 correspond to the embedded-data 5 and the watermark-information 4 in FIG. 3, respectively. Moreover, the key-of-embedding-information 128 in FIG. 7 corresponds to the key-of-embedding-information 3 in FIG. 3.

The motion-picture-processing-apparatus 126 receives the information-embedded and coded motion picture 127, and interprets the image format using the decoding-section 130 to start decoding. The decoding-section 130 first reads the horizontal and vertical pixel numbers and the unit picture numbers in the time axis direction 131 from the received motion picture, and sends them to the information-reading-unit 132. Thereafter, the decoding-section 130 resolves the motion picture data into the frame pictures 133 of the unit picture number in the time axis direction, and sends them to the information-reading-unit 132. The information-reading-unit 132 receives as an input the key-of-embedding-information 128 and the picture horizontal and vertical pixel numbers and the unit picture numbers in the time axis direction 131, and subjects them to the information reading processing and outputs the embedded-information 134 in each unit picture in the time axis direction. The watermark-information-determining-processing-section 135 determines the watermark-information by using an error correction code such as majority vote, from the information embedded in each unit picture in the time axis direction given as an input sequentially, and outputs the result as the information 129 embedded in the motion picture.

Figure 8:
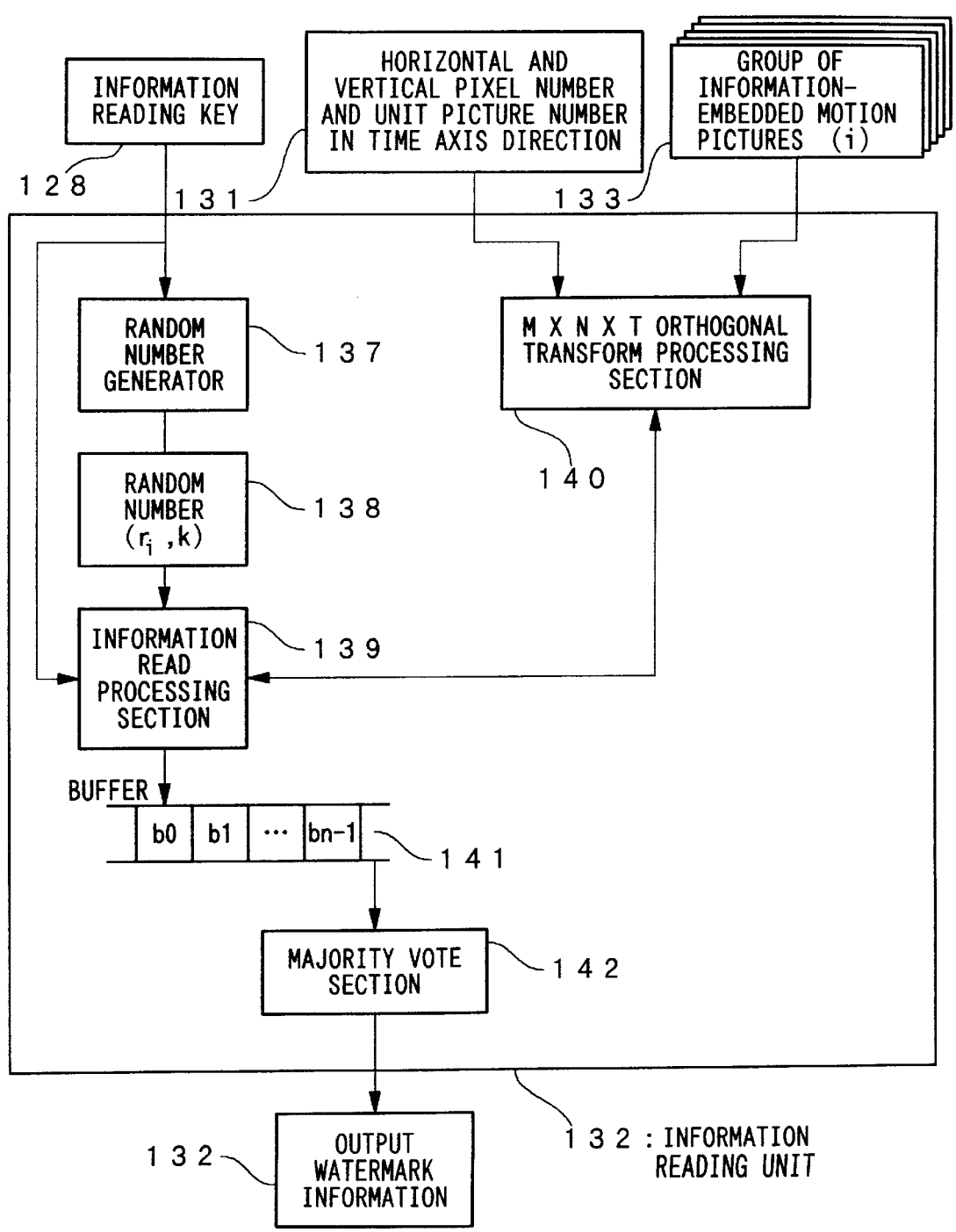
FIG. 8 is a detailed block diagram of an information-reading-unit of FIG. 7.

Next, the information-reading-unit 132 will be more specifically described. FIG. 8 is a structure diagram of the information-reading-unit 132, which uses an M×N×T orthogonal transform. Here, M, N and T are the same value as for the orthogonal transform used at the time of embedding the information.

The information-reading-apparatus 6 in FIG. 3 and the information-reading-unit 132 in FIG. 8 will now be compared. The function of the blocking-section 21 in FIG. 3 is included in an M×N×T-orthogonal-transform-processing-section 140 in FIG. 8. The embedding coefficient determining section 22 in FIG. 3 corresponds to a random-number-generator 137 in FIG. 8. Moreover, the function of the section-for-computing-coefficient-to-be-processed 23 in FIG. 3 is included in the M×N×T-orthogonal-transform-processing-section 140 in FIG. 8, while the information-reading-section 24 in FIG. 3 corresponds to an information-read-processing-section 139 and majority-vote-section 142 in FIG. 8.

In FIG. 8, the random-number-generator 137 generates a random number $(r_{i,k})$ 138 one by one, designating the former half of the input key-of-embedding-information 128 as the initial-value-of-a-random-sequence 31, and sends it to the information-read-processing-section 139. The latter half of the input key-of-embedding-information 128 is sent to the information-read-processing-section 139, and transformed into an information reading intensity verifying range corresponding to the quantizer-scale-of-coefficient 32.

It is assumed that the key-of-embedding-information 128 to be input is the same as the key-of-embedding-information 103 used at the time of embedding the information, and the random-number-generator 137 generates a sufficiently large figure so there is no conflict with each other so that if other keys are input, the correct information cannot be read. Moreover, it is assumed that the n-bit information is embedded, repeating one more time, in the information-embedded frame picture 133 of the unit picture number in the time axis direction.

Next, is a description of the case where the k-th (k: integer larger than 0) information bit $b_k \in \{0, 1\}$ embedded in the information-embedded frame pictures 133 of the unit picture number in the time axis direction is read.

The information-read-processing-section 139 selects the component position of the orthogonal transform coefficient $(h_{r_{i,k}}, v_{r_{i,k}}, t_{r_{i,k}})$ in a low frequency domain, using the random number $r_{i,k}$ sent from the random-number-generator 137, so that there is no conflict in the orthogonal transform matrix, and sends it to the M×N×T-orthogonal-transform-processing-section 140 which computes only one component of the orthogonal transform coefficient. As a result, the M×N×T orthogonal transform coefficient $(h_{r_{i,k}}, z_{r_{i,k}}, t_{r_{i,k}})$ is obtained. By computing only one component of the orthogonal transform coefficient with the M×N×T-orthogonal-transform-processing-section 140, high-speed reading of the information becomes possible, enabling processing on a real-time basis, such as during the reproduction of a motion picture.

The information-read-processing-section 139 computes the following expression:

$$b_k = \left\lfloor \frac{c(h_{r_{i,k}}, v_{r_{i,k}}, t_{r_{i,k}})}{\text{verifying\_range}} + \frac{1}{2} \right\rfloor \bmod 2$$

with respect to the obtained value of the M×N×T orthogonal transform coefficient $c(h_{r_{i,k}}, z_{r_{i,k}}, t_{r_{i,k}})$ to read the k-th information embedded in the information-embedded frame pictures 133 of the unit picture number in the time axis direction, and stores it in the (k mode n)th of a buffer 141. Thereby, the k-th information is obtained from the nearest quantized value of the orthogonal transform coefficient, which uses the information reading intensity verifying range. In addition, the information in the buffer 141 is sent to a majority-vote-section 142.

The above-mentioned information reading process is performed n times which is the bit length of the information embedded in each unit picture in the time axis direction, and further repeated for one more time which is shown by the secret information in the information-read-processing-section 139 to read a set of information of the embedded n bit length for each bit. This is then input to the majority-vote-section 142, and a decision made using an error correction code, such as majority vote, to output one piece of information 134 embedded in each unit picture in the time axis direction.

The present embodiment has been described above, however with the present invention, the information embedding is performed with respect to different media, that is, the overall motion picture and each still image, by designating T as 1 at the time of embedding the information in the motion picture, and embedding the closed information for every frame. Hence it is possible to read the information from the different media, that is, the respective motion pictures and the still images.

Furthermore, by performing the orthogonal transform of a plurality of sizes having little influence with each other due to the digital watermark processing which uses the orthogonal transform, and performing the information embedding separately with respect to each orthogonal transform matrix, a plurality of information can be embedded and read. Namely, when a plurality of watermark-information is embedded, the first information is embedded in the orthogonal transform coefficient obtained by dividing the information into blocks having a predetermined size in order to embed the first information. Then, when the N-th information from the second and subsequent information is embedded, the N-th information is embedded with respect to the orthogonal transform coefficient obtained by dividing the information into blocks having a different size from that of the blocks divided for embedding the (N−1)th information from 1 and having a size with little influence on each other due to the digital watermark processing. On the other hand, when a plurality of watermark-information is embedded with a plurality of block sizes, the information is divided in turn into blocks having the same size as the size divided at the time of embedding the information, the bit is read for obtaining the orthogonal transform coefficient for every block of each block size, and the embedded watermark-information is read sequentially.

Furthermore, by making the plurality of watermark-information all the same, and comparing the obtained plural information to be read with each other, it becomes possible to detect the presence of a dishonest alteration in the information-embedded motion picture.

According to the present invention, the following effects can be obtained:

(1) It is possible to input the motion picture, the key information and the watermark-information, to then embed the watermark-information in the motion picture while keeping the inherent quality of the picture, and to read this embedded information, regardless of the presence of coding.

(2) At the time of embedding the information in the motion picture, block distortion is dissolved from the watermark-information by dividing the motion picture into groups of frames of unit time, and embedding the information using the orthogonal transform of M×N×T size. Moreover, by embedding the information in a frequency domain, which does not influence quantization due to the information compression, the reading of information is possible even if extreme compression is performed.

(3) At the time of embedding the information in the motion picture, it is possible to embed the information simultaneously with respect to different media, such as the overall motion picture and each still image and read this embedded information, by embedding a closed information for every frame.

(4) By inverse orthogonally transforming the information-embedded orthogonal transform coefficient matrix and taking measure against range-over of the pixel value, it becomes possible to raise the borderline between the quality of the watermark-information and the rate of continuation of the watermark-information, which are in a relation of trade-off.

(5) By calculating only one component of the orthogonal transform coefficient necessary at the time of reading the information from the motion picture, the information can be read on a real time basis during reproduction of a motion picture. Hence the information can be read at high speed.

(6) By utilizing the property that the information contents and the watermark-information cannot be separated, it can be used as a constituent technique in a high-level copy right protection system.

Second Embodiment

With this embodiment, a picture is subdivided into blocks having a size larger than, for example, 8×8 block size used in the conventional lossy compression, and a portion of this block of a size (distance from the origin) for when the frequency coefficient subjected to the Discrete Fourier Transform is displayed in the polar coordinate system is changed. As a result, the sub-information and the discrimination code showing that the embedding is completed, are repeatedly embedded in one block. Hence, the sub-information can be read correctly even if the lossy compression is performed.

Furthermore, by performing embedding, and sub-information reading, after normalizing the frequency coefficient to a range up to a determined value, weaker image processing than in the complicated area is performed in a flat area, and the deterioration of the image quality due to the embedding is suppressed, while the robustness against the contrast change is maintained.

Moreover, by increasing (decreasing) the change amount of the frequency coefficient with the increase (decrease) of the value of the frequency coefficient to be changed, deterioration of the image quality can be further suppressed. In addition, when a picture is subdivided into blocks, then in order to correspond to an optional picture size, an image area whose size is not sufficiently large to fill one block is treated as one block by filling the insufficient portion with a mean value of the pixel value or by repeating a linearly symmetrical pattern.

Furthermore, by forming the sub-information to be read from the whole picture with respect to each block, after obtaining the reliability of the information read from the block and adding a weight to the information per block, the correct sub-information can be read even if the picture is compiled partially, or a picture having a large flat area is subjected to the lossy compression.

The second embodiment will now be described with reference to the accompanying drawings.

Figure 9:
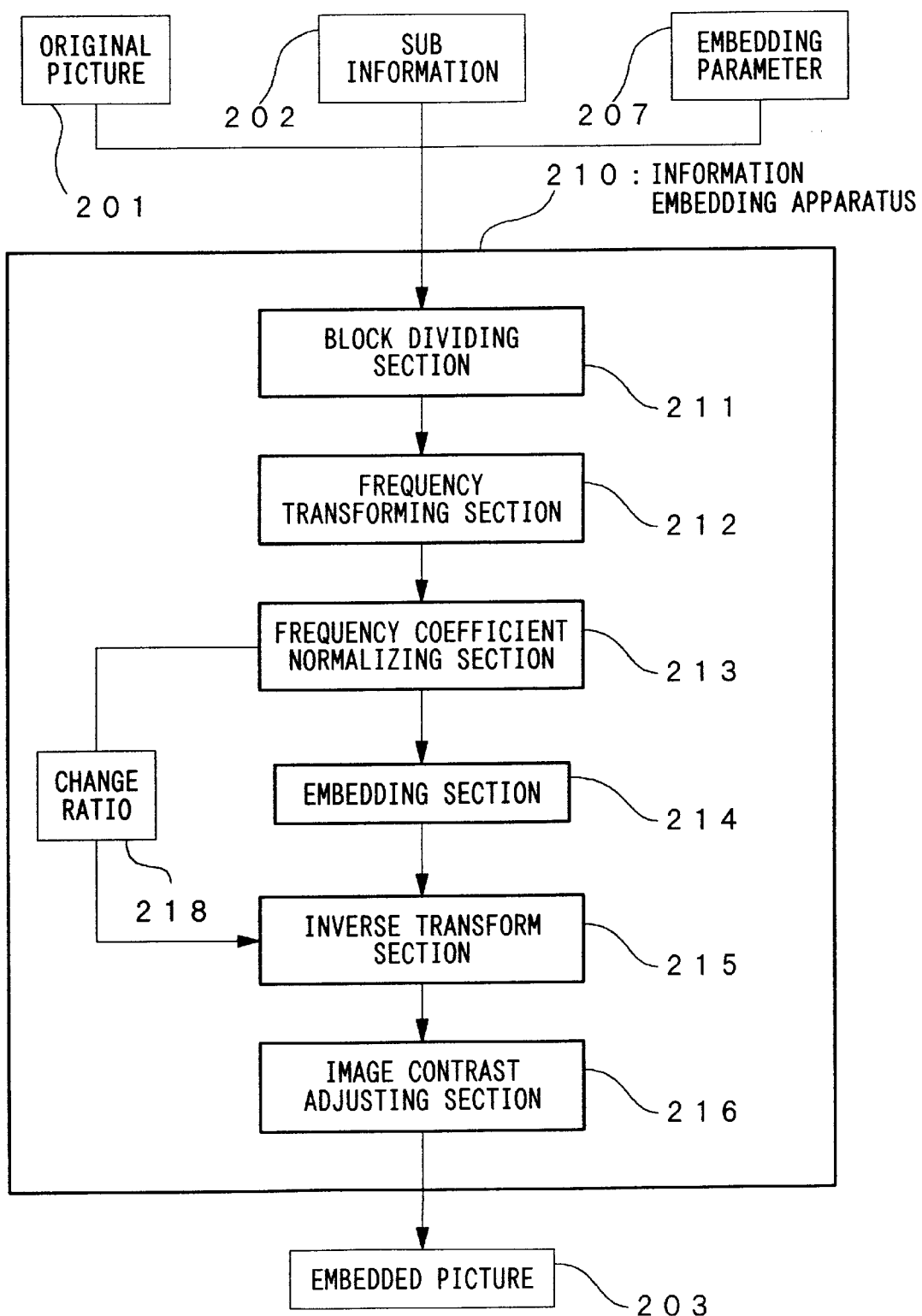
FIG. 9 is a diagram showing the structure and the processing flow of one example of an information-embedding-apparatus according to a second embodiment.

FIG. 9 is a diagram showing the overall structure and the flow of the processing of one example of an information embedding apparatus according to this embodiment. Comparing FIG. 1 and FIG. 9, the information-embedding-apparatus 1, the original-data 2, the key-of-embedding-information 3, the watermark-information 4 and the embedded-data 5 in FIG. 1 correspond to an informationembedding-apparatus 210, an original-picture 201, parameter-of-embedding 207, sub-information 202 and an embedded-picture 203 in FIG. 9, respectively. Moreover, the correspondence of the apparatus is as follows. The blocking-section 11 and the orthogonal-transform-section 12 in FIG. 1 correspond to a block-dividing-section 211 and a frequency-transforming-section 212 in FIG. 9, respectively. In addition, the function of the embedding-coefficient-selecting-section 13 is included in an embedding-section 214. Furthermore the information-embedding-section 14 in FIG. 1 corresponds to the function of a frequency-coefficient-normalizing-section 213, the embedding-section 214 and a part of the function of an inverse-transform-section 215. Moreover, the inverse-orthogonal-transform-section 15 in FIG. 1 corresponds to the remaining function of the inverse-transform-section 215, and to an image-contrast-adjusting-section 216. Here, "frequency transform" means to transform the original-data 2 in which the information is to be embedded into a frequency domain. "Orthogonal transform" and "frequency transform, ie. transform into frequency domain" are synonymous, and "the orthogonal transform coefficient" and "the frequency coefficient" are also synonymous. This synonymous relation is the same in other embodiments.

Figure 11:
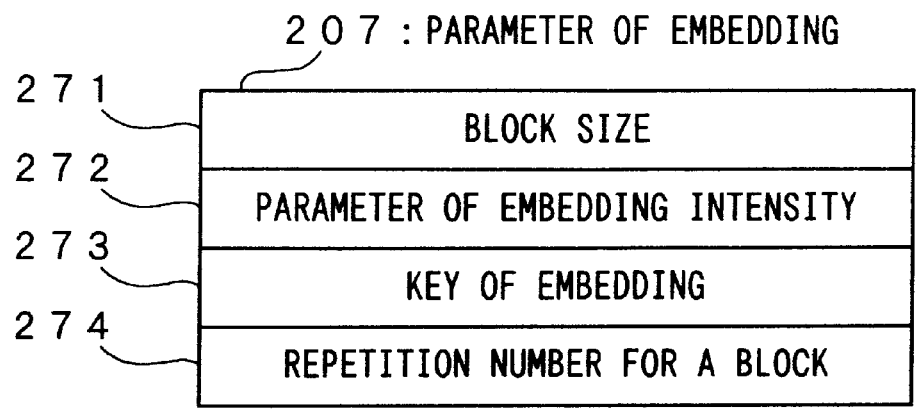
FIG. 11 is a diagram showing an example of a structure of an embedding-parameter used in the present embodiment.

The information-embedding-apparatus 210 takes the input of the original-picture 201, the sub-information to be embedded 202 and the parameter-of-embedding 207 for specifying the method of embedding, and outputs the embedded information 203. FIG. 11 shows a structural example of the parameter-of-embedding 207, which comprises; a block size 271 for specifying the size of blocks into which the original information is subdivided (this block size is not smaller than the normal 8×8 size in order to provide a sufficient robustness against the lossy compression), an parameter-of-embedding-intensity 272 for deciding the degree of difficulty for deleting the embedded sub-information and the degree of deterioration of the picture due to the embedding processing, an key-of-embedding 273 for ensuring safety against intentionally deleting the sub-information from the embedded information, and a repetition-number-for-a-block 274 which specifies the number of repetitions of embedding the sub-information per block. The parameter-of-embedding-intensity 272 and the key-of-embedding 273 correspond to the quantizer-scale-of-coefficient 32 and the initial-value-of-a-random-sequence 31 in FIG. 1, respectively.

With the information-embedding-apparatus 210, first in the block-dividing-section 211, the original picture (digital image) 201 is subdivided into blocks having a size specified by the block size 271 which is one of the constituents in the parameter-of-embedding 207. When this original-picture 201 is subdivided into blocks, if the area at the end of the picture is not big enough for the block size 217, the insufficient portion is filled by a predetermined method to form one block. This method will be described later. Next, with the frequency-transforming-section 212, a Discrete Fourier Transform is performed per subdivided block to obtain a coefficient matrix. Then, with the frequency-coefficient-normalizing-section 213, the amplitude of the frequency coefficient is normalized to obtain a normalized coefficient matrix. In addition, with the frequency-coefficient-normalizing-section 213, a ratio representing how much the frequency was expanded/contracted at the time of normalizing is sent as a change ratio 218 to the inverse-transform-section 215. Then, with the embedding-section 214, by changing some of the coefficient values amongst the normalized coefficient matrix, the sub-information 202 is repeated by the repetition-number-for-a-block 274 which is one of the constituents in the parameter-of-embedding 207, and thus embedded. The degree of change of the coefficient values is specified by the parameter-of-embedding-intensity 272 which is one of the constituents in the parameter-of-embedding 207. Furthermore, the selection of the frequency coefficient for performing the embedding processing is decided by the key-of-embedding 273 which is one of the constituents in the parameter-of-embedding 207. Then, with the inverse-transform-section 215, the sub-information-embedded coefficient matrix is returned back to the original range and subjected to inverse Discrete Fourier Transform. Finally, with the image-contrast-adjusting-section 216, processing to avoid the range-over of the pixel value is performed according to need, to obtain the embedded-picture 203.

Figure 10:
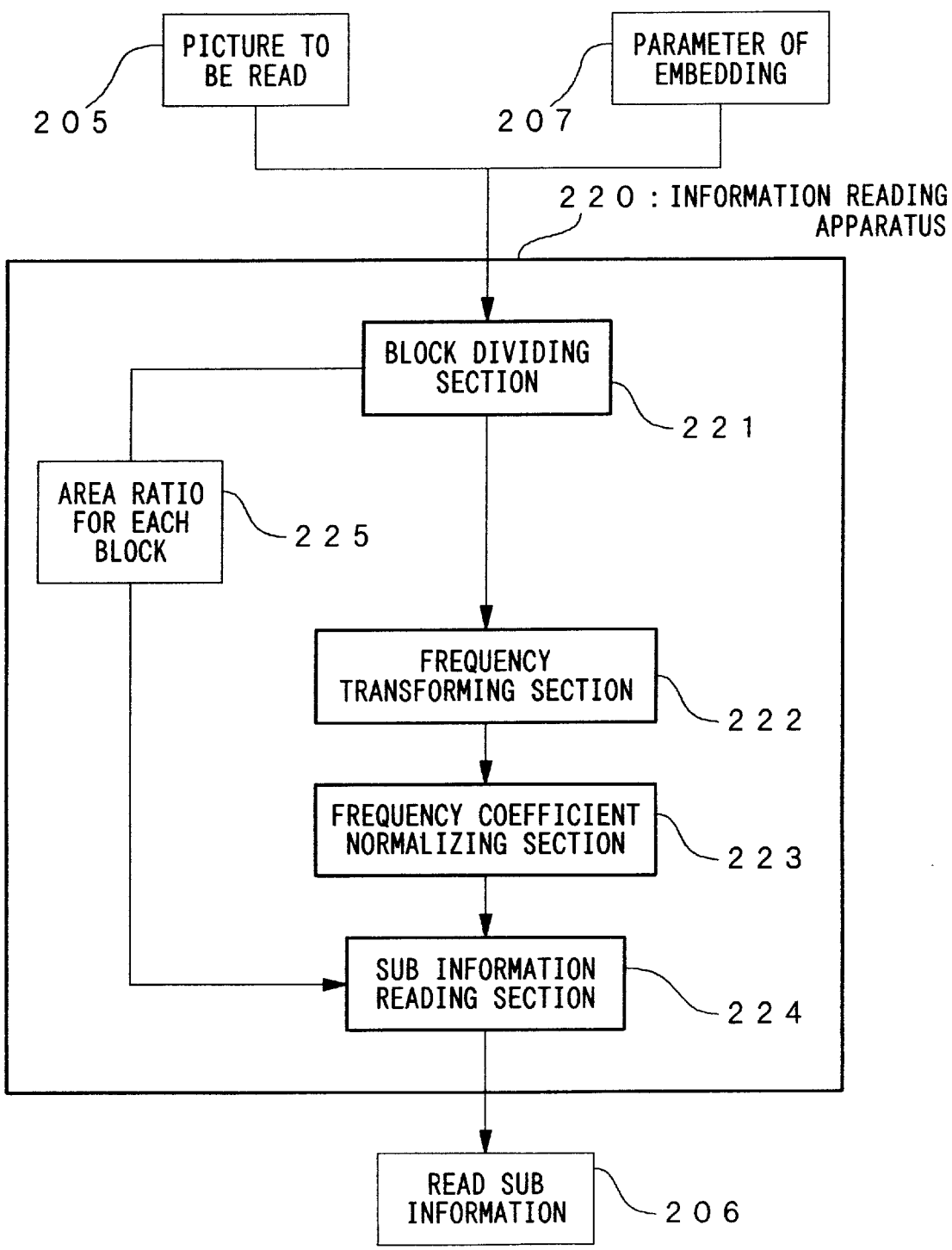
FIG. 10 is a diagram showing the structure and the processing flow of one example of an information-reading-apparatus according to the second embodiment.

FIG. 10 is a diagram showing the overall structure and the flow of the processing of one embodiment of the information reading apparatus according to the present invention. Comparing FIG. 3 and FIG. 10, the information-reading-apparatus 6, the embedded-data 5, the key-of-embedding-information 3 and the watermark-information 4 in FIG. 3 correspond to an information-reading-apparatus 220, a picture-to-be-read 205, parameter-of-embedding 207 and read-sub-information 206 in FIG. 10, respectively. Moreover, as to the correspondence of the apparatus, the blocking-section 21 in FIG. 3 corresponds to the block-dividing-section 221 in FIG. 10. The function of the embedding-coefficient-selecting-section 22 in FIG. 3 is included in a sub-information-reading-section 224. Moreover the section-for-computing-coefficient-to-be-processed 23 in FIG. 3 corresponds to a frequency-transforming-section 222 in FIG. 10, and the information-reading-section 24 in FIG. 3 corresponds to a frequency-coefficient-normalizing-section 223, and the sub-information-reading-section 224 in FIG. 10.

For reading the sub-information, the picture-to-be-read 205 such as the embedded information 203, and the parameter-of-embedding 207 are required. The structure of the parameter-of-embedding 207 is as shown in FIG. 11.

The information-reading-apparatus 220 first subdivides the picture-to-be-read 205 into blocks in the block-dividing-section 221, as in the information-embedding-apparatus 210 in FIG. 9. If a portion at the end of the picture-to-be-read 205 amongst the divided blocks is not big enough for the block size 271 in the parameter-of-embedding 207, the insufficient portion is filled to make one block. With the block-dividing-section 221, the area ratio of the portion of the picture-to-be-read 205 to the block size 271 is obtained for each block, and provided to the sub-information-reading-section 224 as an area-ratio-for-each-block 225. Naturally, when the subdivided block is completely contained in the picture-to-be-read 205, the value of the area-ratio-for-each-block 225 is 1. Then, with the frequency-transforming-section 222, each block is subjected to a Discrete Fourier Transform, to obtain the coefficient matrix. (Subsequently, with the frequency-coefficient-normalizing-section 223, each block is subjected to a Discrete Fourier Transform to obtain the coefficient matrix.) Then, with the frequency-coefficient-normalizing-section 223, the amplitude of the frequency coefficient is normalized to obtain a normalized coefficient matrix. In this frequency-coefficient-normalizing-section 223, there is no need to determine the change ratio, as in the frequency-coefficient-normalizing-section 213 in FIG. 9. With the sub-information-reading-section 224, the frequency coefficient to be read is determined using the key-of-embedding 273 in the parameter-of-embedding 207, as in the embedding-section 214 of FIG. 9, and the embedded information is taken out in a procedure reverse to the embedding processing. Then, the block weight representing the reliability of the information read from each block is computed, and the block weight is reflected on the information read from each block to obtain the read-sub-information 206.

Here, if the picture-to-be-read 205 is a picture in which the sub-information 202 is embedded with the information-embedding-apparatus 210 using the parameter-of-embedding 207, the read-sub-information 206 is consistent with the sub-information 202, and can be read correctly. If the picture-to-be-read 205 is not a picture embedded with the parameter-of-embedding 207, or if it is a greatly deteriorated embedded-picture 203, the read-sub-information 206 will not be consistent with the sub-information 202, and cannot be read correctly.

The structure example of each section in FIG. 9 and FIG. 10 and the contents of the processing will now be described in detail.

Figure 12:
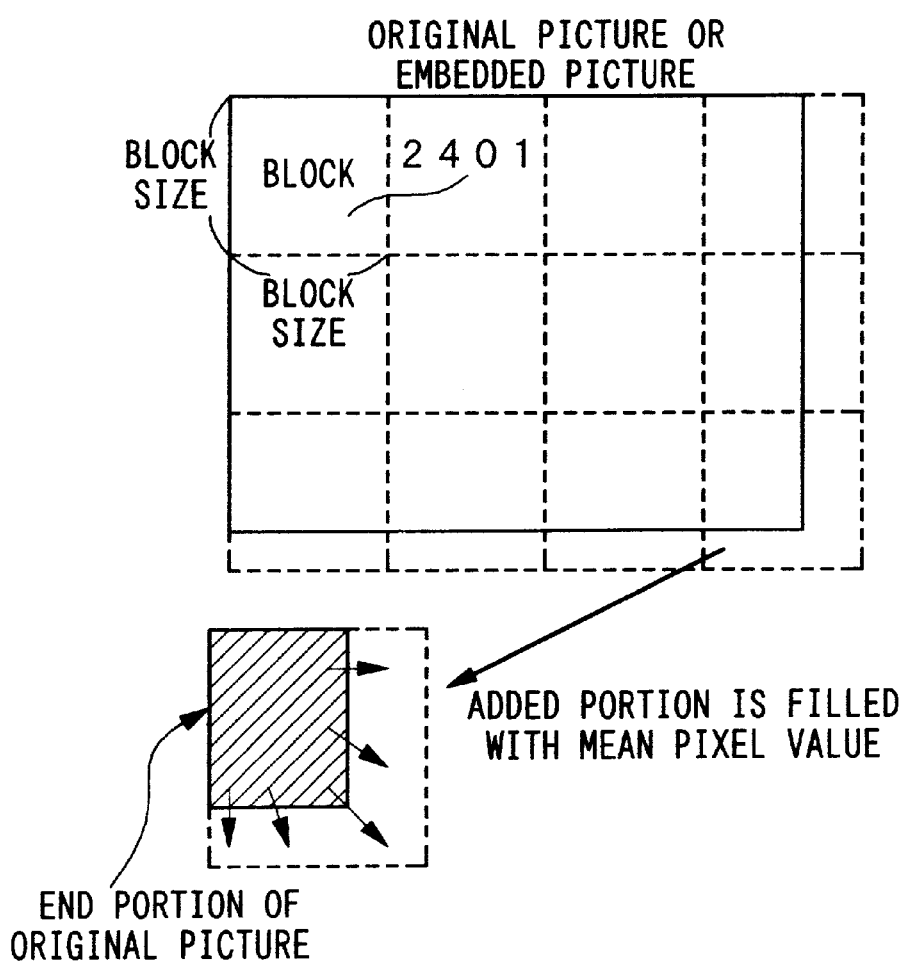
FIG. 12 is a diagram showing the contents of a first example of processing of a block-dividing-section.
Figure 13:
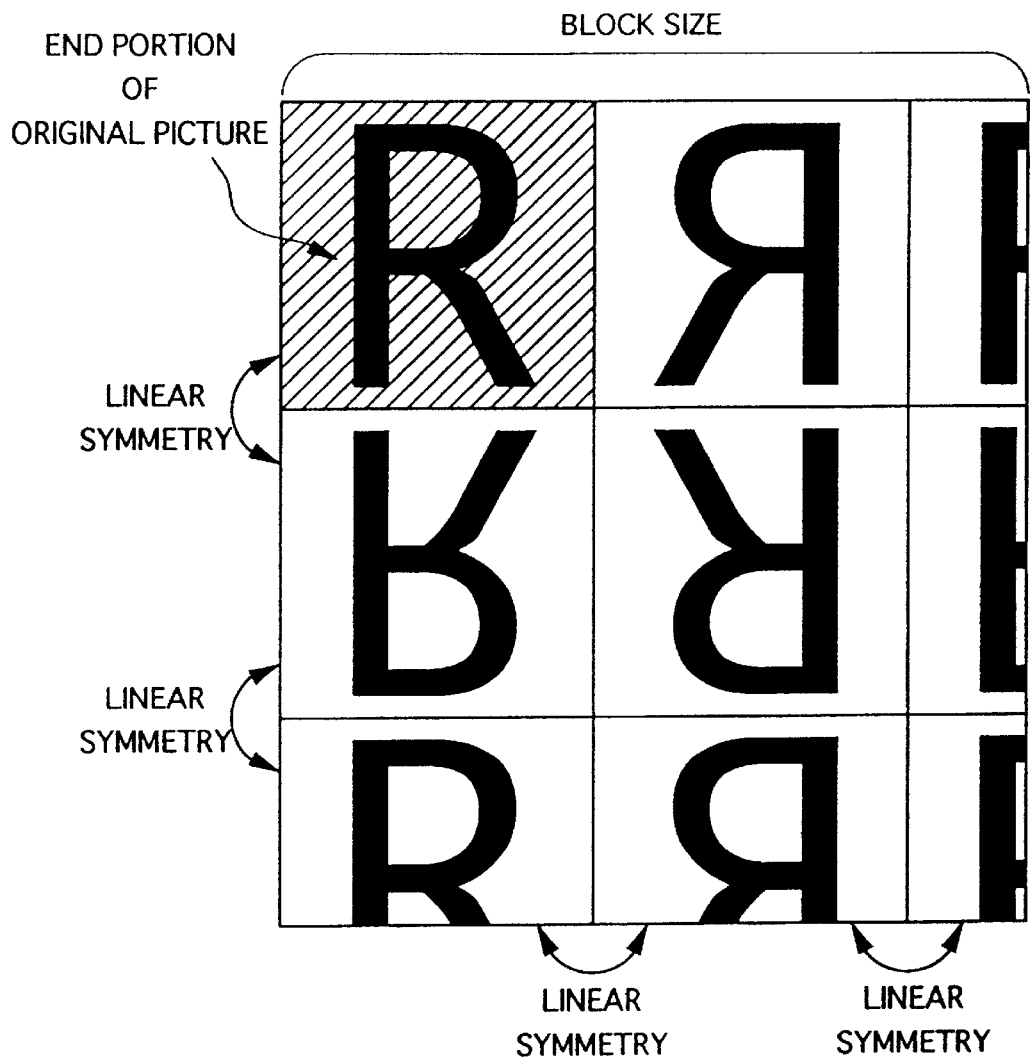
FIG. 13 is a diagram showing the contents of a second example of processing of the block-dividing-section.

FIG. 12 and FIG. 13 are diagrams showing the contents of processing of two embodiments in the block-dividing-section 211 of FIG. 9 and in the block-dividing-section 221 of FIG. 10. With the block dividing sections 211 and 221, the picture (the original-picture 201 or the picture-to-be-read 205) is subdivided into blocks 2401 having a size similar to the block size 271 in the parameter-of-embedding 207. At this time, with respect to the image area which is not sufficient for one block at the end of the picture, in the case of FIG. 12, the mean pixel value of the image area is computed, and the insufficient portion for one block is filled with the mean pixel value to give a block. Moreover, in the case of FIG. 13, the linearly symmetrical pattern of the image area is repeated to fill one block. With the block-dividing-section 221 on the information reading side, the occupancy proportion (area ratio) of the picture to be divided within one block is obtained for each block 2401, and designated as the area-ratio-for-each-block 225.

Figure 14:
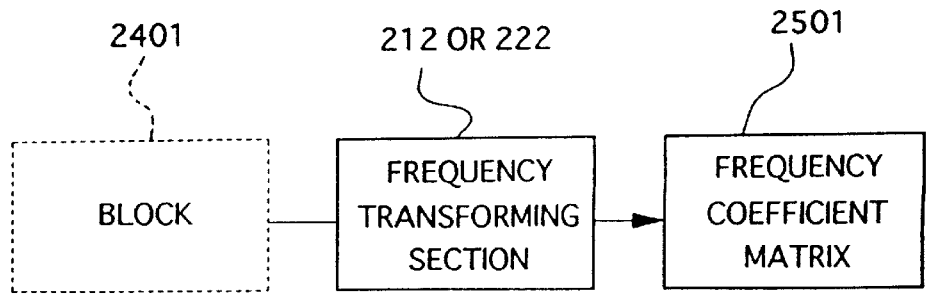
FIG. 14 is a diagram showing the processing of a frequency-transforming-section.

FIG. 14 is a diagram showing the processing of the frequency-transforming-section 212 in FIG. 9 and the frequency-transforming-section 222 in FIG. 10. The frequency transforming sections 212 and 222 perform a Discrete Fourier Transform using the picture block 2401 as an input, to obtain a coefficient matrix 2501. This is performed for each block subdivided by the block dividing sections 211 and 221.

Figure 15:
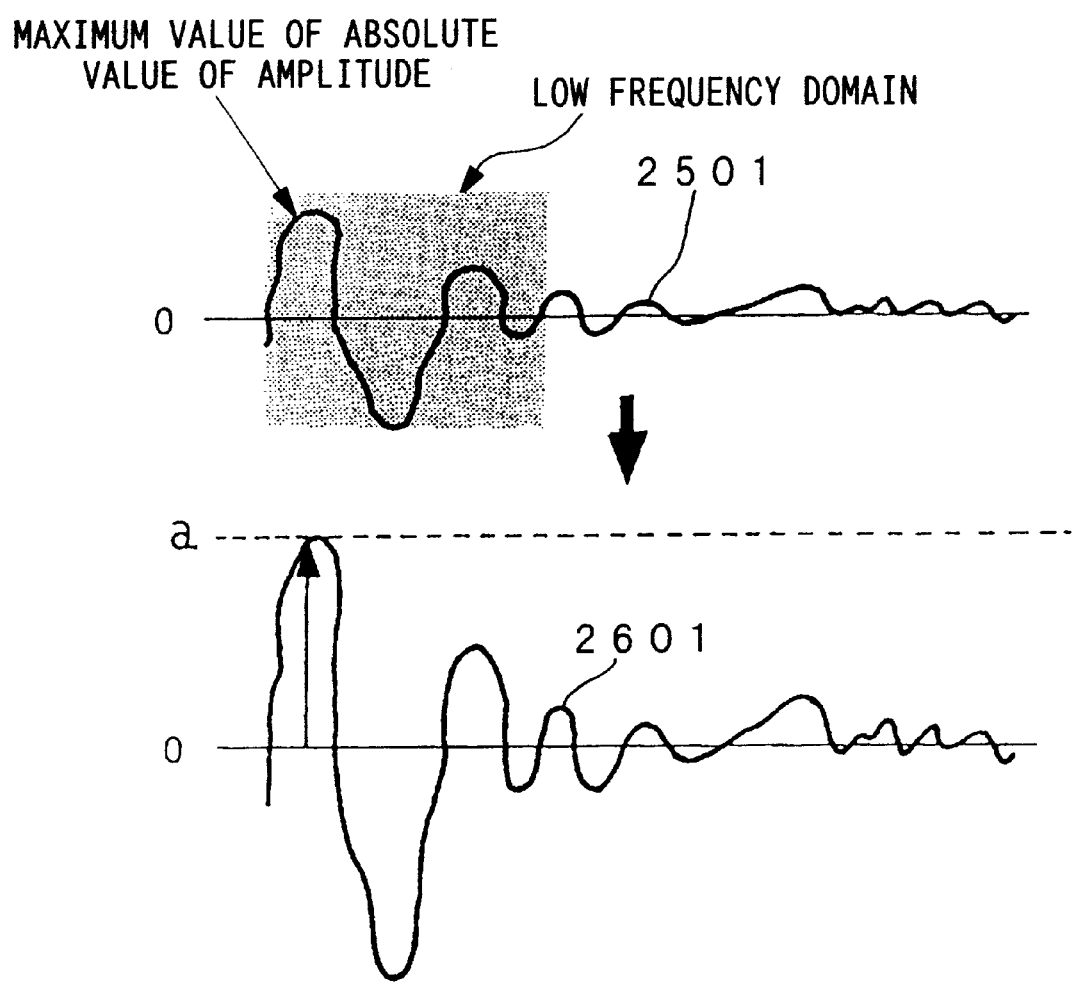
FIG. 15 is a diagram showing a first example of the processing of a frequency-coefficient-normalizing-section.
Figure 16:
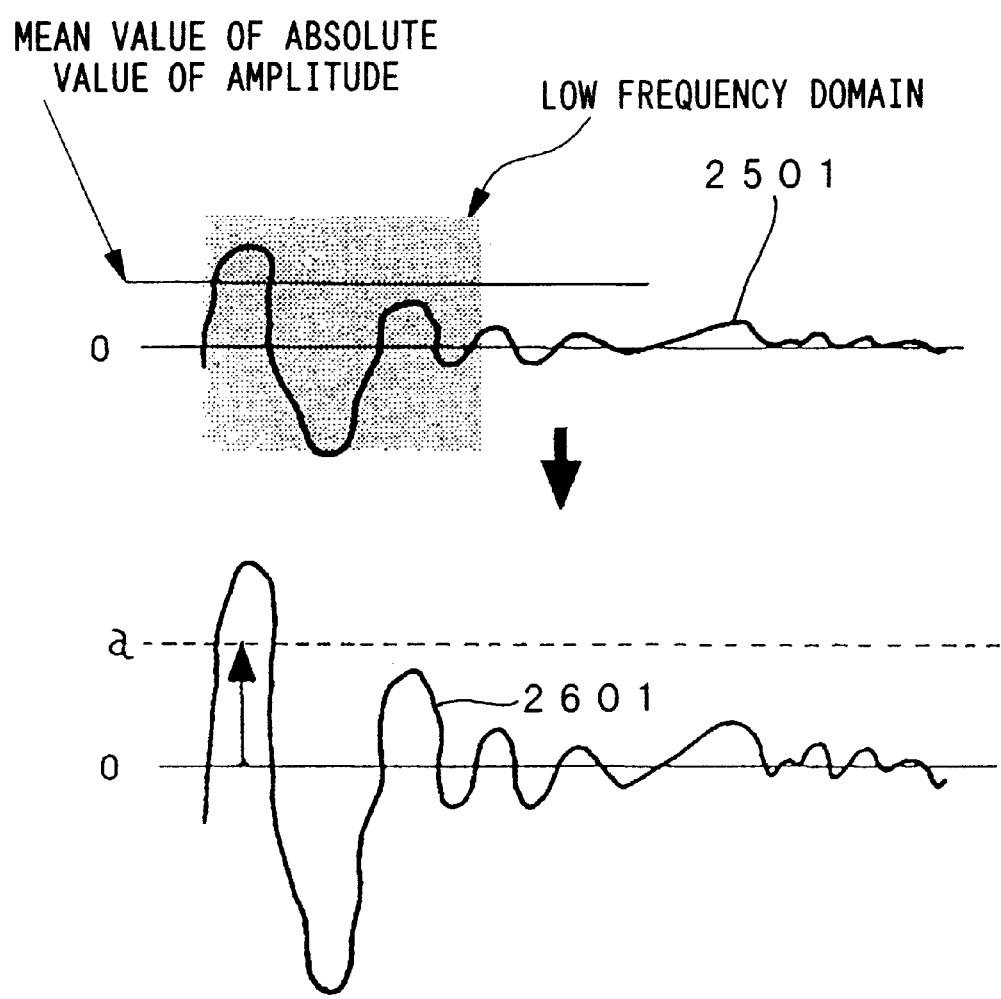
FIG. 16 is a diagram showing a second example of the processing of the frequency-coefficient-normalizing-section.

FIG. 15 and FIG. 16 are diagrams showing the contents of two processing examples of the frequency-coefficient-normalizing-section 213 in FIG. 9 and the frequency-coefficient-normalizing-section 223 in FIG. 10. FIG. 15 shows that all the coefficients of the frequency are expanded at such a ratio (designated as the change ratio) that the maximum coefficient value in the amplitude in the low frequency domain of the coefficient matrix 2501 (FIG. 14) is expanded to a normalized value "a" ("a" is a sufficiently large value, for example, the maximum value of the amplitude in the frequency coefficient), to obtain a normalized-coefficient-matrix 2601. Moreover, FIG. 16 shows that all the coefficients of the frequency are expanded at such a ratio (the change ratio) that the mean value of the amplitude value in a low frequency domain of the coefficient matrix 2501 is obtained and this mean value is expanded to the normalized value "a" ("a" is a sufficiently large value), to obtain the normalized-coefficient-matrix 2601. With the frequency-coefficient-normalizing-section 213 on the information embedding side, the change ratio at this time is sent to the inverse-transform-section 215. Incidentally, in FIG. 15 and FIG. 16, the coefficient matrix is shown in an analog waveform for easy understanding, but it is a matter of course that the coefficient matrix 2501 and 2601 are digital values. As described above, by normalizing the frequency coefficient by the method shown in FIG. 15 and FIG. 16, a coefficient matrix wherein the amplitude in the low frequency domain is uniformly small is expanded largely, and conversely is not so expanded when the amplitude is large.

Figure 17:
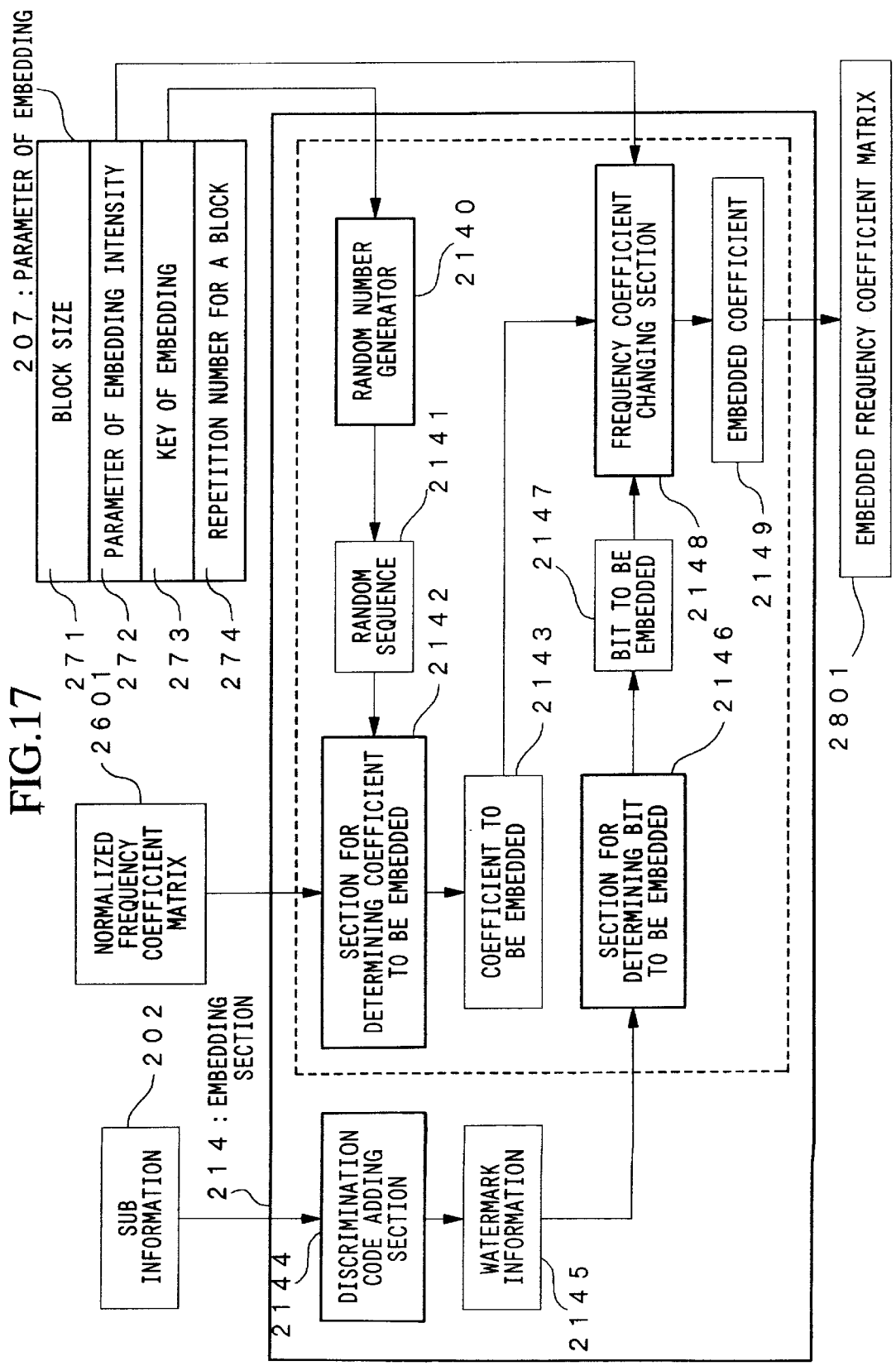
FIG. 17 is a diagram showing a structure example of an embedding-processing-section and the processing flow thereof.

FIG. 17 is a diagram showing the detailed structure and the processing flow of the embedding-section 214 of FIG. 9. In FIG. 17, a random-number-generator 2140 and a section-for-determining-coefficient-to-be-embedded 2142 correspond to the embedding-coefficient-selecting-section 13 in FIG. 1.

With the embedding-section 214, at first a discrimination-code-adding-section 2144 adds to the sub-information 202 discrimination code (Preferably this is a bit pattern in which bit 1 and bit 0 appear at the same frequency. For example, if this is an 8-bit discrimination code, it becomes 10101010.) indicating that the data has been embedded in the sub-information 202, and this information is designated as the embedding information 2145. As described above, by adding the discrimination code to the sub-information 202, it can be utilized for detecting an error in the read information, at the time of reading the embedded information. On the other hand, with the random-number-generator 2140, a random sequence 2141 is generated using the key-of-embedding 273 in the parameter-of-embedding 207. Then, in the section-for-determining-coefficient-to-be-embedded 2142, it is decided using the random sequence 2141, on which coefficient in the normalized-coefficient-matrix 2601 the embedding processing is to be performed, and the selected frequency coefficient is designated as a coefficient-to-be-embedded 2143. With a section-for-determining-bit-to-be-embedded 2146, 1 bit is taken out in turn from the top bit toward the lower bit of the watermark-information 2145, and designated as a bit-to-be-embedded 2147. When the lowest bit of the watermark-information 2145 is taken out, then it returns to the top bit. With a frequency-coefficient-changing-section 2148, a coefficient-to-be-embedded 2143, the bit-to-be-embedded 2147 and the parameter-of-embedding-intensity 272 in the parameter-of-embedding 207 are input, and the coefficient value of the coefficient-to-be-embedded 2143 is changed to obtain the value of an embedded coefficient 2149. That is, the coefficient-to-be-embedded 2143 in the normalized-coefficient-matrix 2601 is changed to the embedded coefficient 2149.

The above-mentioned processing is repeated (the bit length of the watermark-information 2145)×(the repetition number within the block 174) times. That is, with respect to one normalized-coefficient-matrix 2601, the processing is repeated by the repetition number within the block 273 to embed the watermark-information 2145. Thus, the normalized-coefficient-matrix 2601 to which the embedding of all bits has been completed is designated as an embedded-coefficient-matrix 2801. With the embedding-section 214, this processing is performed with respect to each block.

Figure 18:
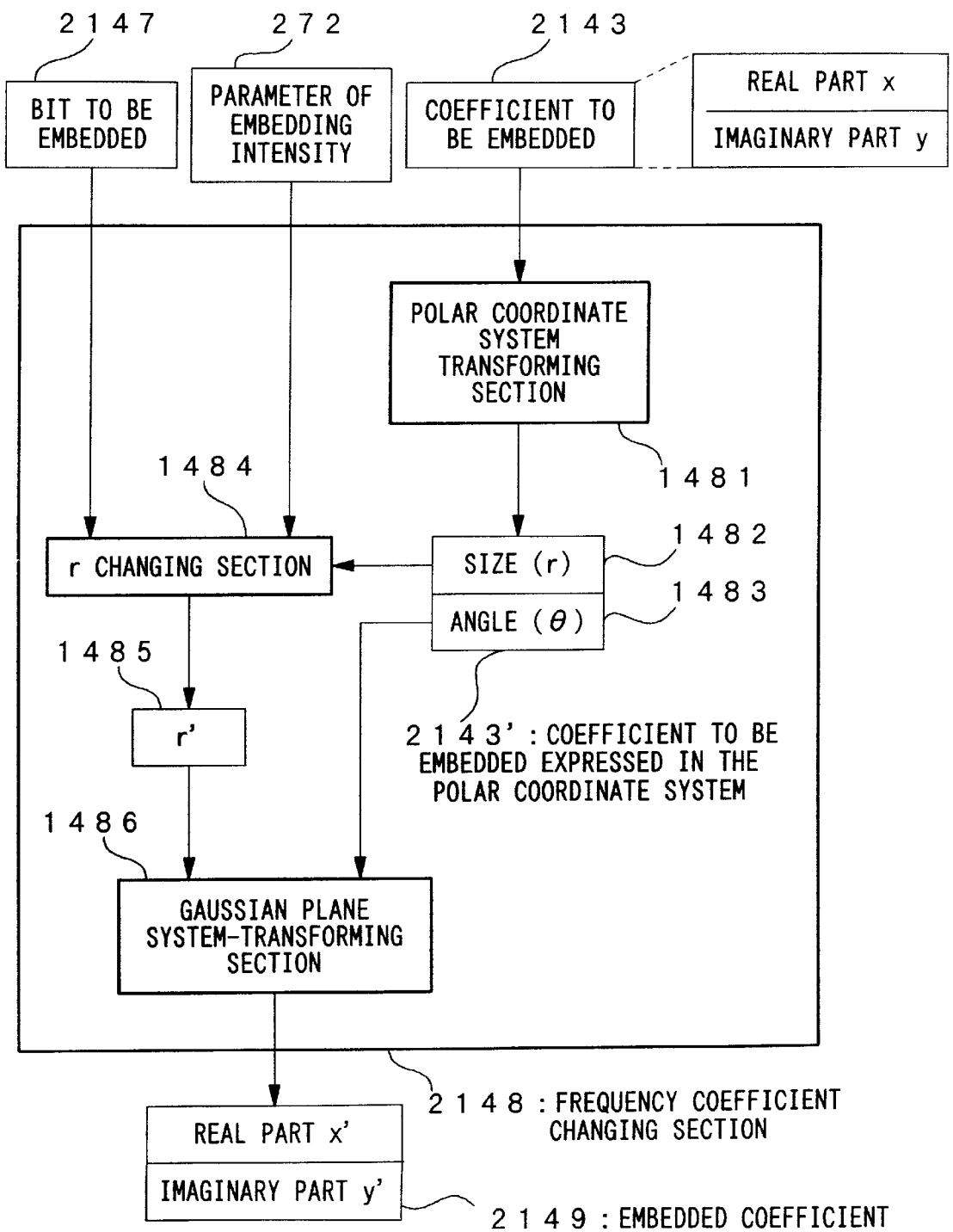
FIG. 18 is a diagram showing a detailed structure example of a frequency-coefficient-changing-section in FIG. 17, and a processing flow thereof.

FIG. 18 is a diagram showing the detailed structure and the processing flow of the frequency-coefficient-changing-section 2148 in FIG. 17. With the frequency-coefficient-changing-section 2148, first, the value of the coefficient-to-be-embedded 2143 which is a complex number expressed in a form of a+bi, is put into a polar coordinate system 2143' in a form of r·exp (iθ) with a size (r) 1482 and an angle (θ) 1483, in a r-changing-section polar-coordinate-system-transforming-section 1481. Then, in an r change processing section 1484, the size (r) 1482 of the polar coordinate system 2143', the parameter-of-embedding-intensity 272 and the bit-to-be-embedded 2147 are input, to change the size 1482 to a size (r') 1485. Lastly, a complex number in a form of r'·exp (iθ) is transformed into a form of x'+iy' in a Gaussian-plane-system-transforming-section 1486, and this is designated as the embedded coefficient 2149.

Figure 23:
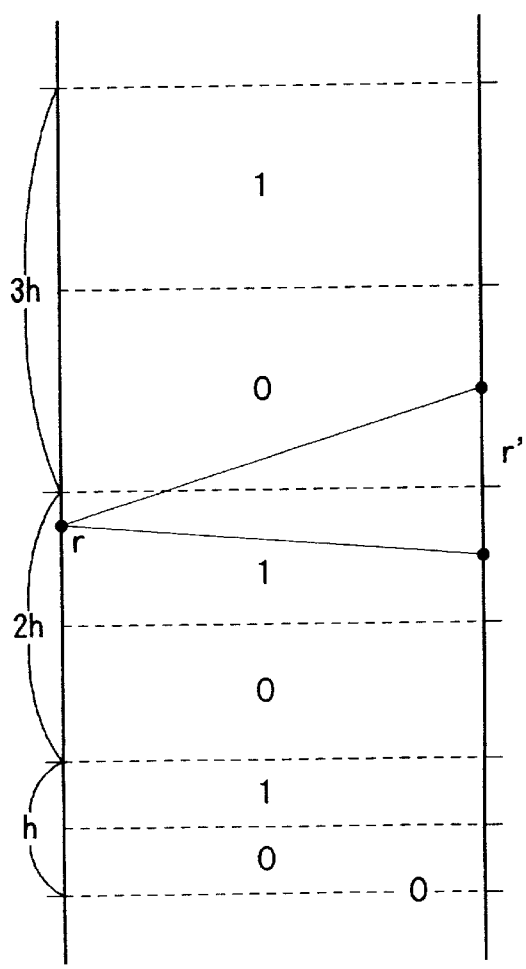
FIG. 23 is a diagram for explaining a method of changing and a method of reading the frequency coefficient, according to the present embodiment.

Next, the processing of the r change processing section 1484 will be described in detail. The r change processing section 1484 takes the input of the bit-to-be-embedded 2147, the parameter-of-embedding-intensity 272 and the size (r) 1482 of the coefficient-to-be-embedded 2143' expressed in the polar coordinate system, and changes the size (r) into a size (r') 1485. Specifically, as shown in FIG. 23, the coefficient value of the frequency is divided into widths h, 2h, 3h . . . successively from 0, using the parameter-of-embedding-intensity 272 (in FIG. 23, the size of the parameter-of-embedding-intensity 272 is indicated by "h") so that if the value of r is large, the change amount becomes large, and a rule is used for each width, that a coefficient value of the frequency residing in less than half of the width expresses bit 0, and a coefficient value of the frequency residing in larger than half of the width expresses bit 1. Here, the size (r') obtained by embedding the bit to be embedded in the size (r) can be obtained by changing the size (r) into a middle value of an area indicating a bit value of the bit to be embedded, in which the amount to be changed of the size (r) is made minimum.

Figure 19:
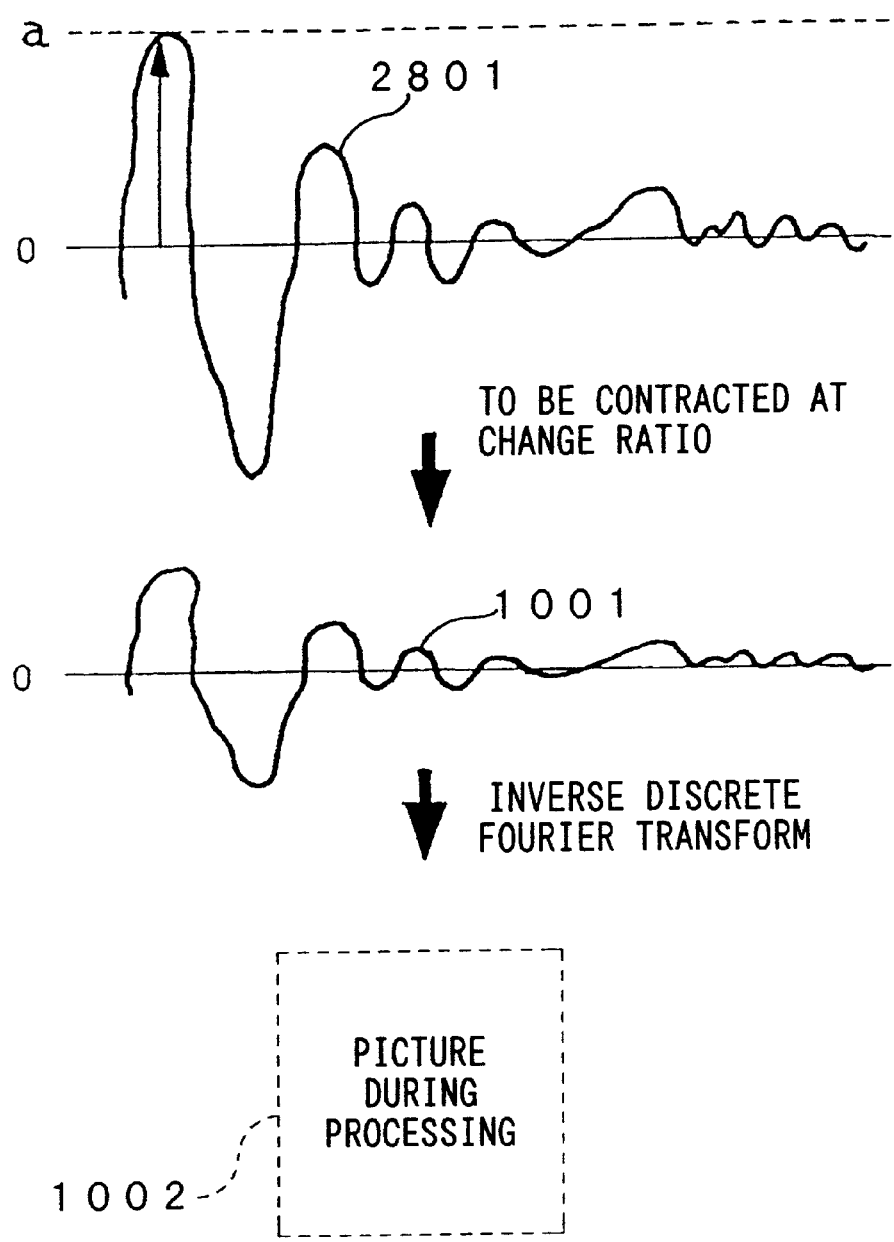
FIG. 19 is a diagram showing the processing of an inverse-transform-section.

FIG. 19 is a diagram showing the contents of the processing of the inverse-transform-section 215 of FIG. 9. In FIG. 19, this is shown in an analog waveform for easy understanding, however in actuality, this is a digital value. With the inverse-transform-section 215, the embedded coefficient-matrix 2801 obtained by the embedding-section 214 is contracted at a change ratio 218 provided from the frequency-coefficient-normalizing-section 213, to obtain a coefficient matrix 1001 having an amplitude almost the same as that of the original coefficient matrix 2501 (FIG. 14) generated by the frequency-transforming-section 212. This is then subjected to an inverse Fourier transform to obtain a picture during processing 1002.

With the image-contrast-adjusting-section 216 of FIG. 9, if the pixel value in the picture during processing 1002 obtained by the inverse-transform-section 215 exceeds the domain of the pixel value (if it is an 8-bit shading image, from 0~255), the contrast of the pixel value of the picture during the processing 1002 is dropped at a ratio where the most protruding pixel value becomes precisely the minimum value (or the maximum value) of the defined area, so that all the pixel values are altered to be in the domain, to obtain the picture to be embedded 203. Hence, a processing is performed using the picture during processing 1002 which is the obtained data from the inverse orthogonal transform, so that the pixel value after the change does not exceed the domain.

Figure 20:
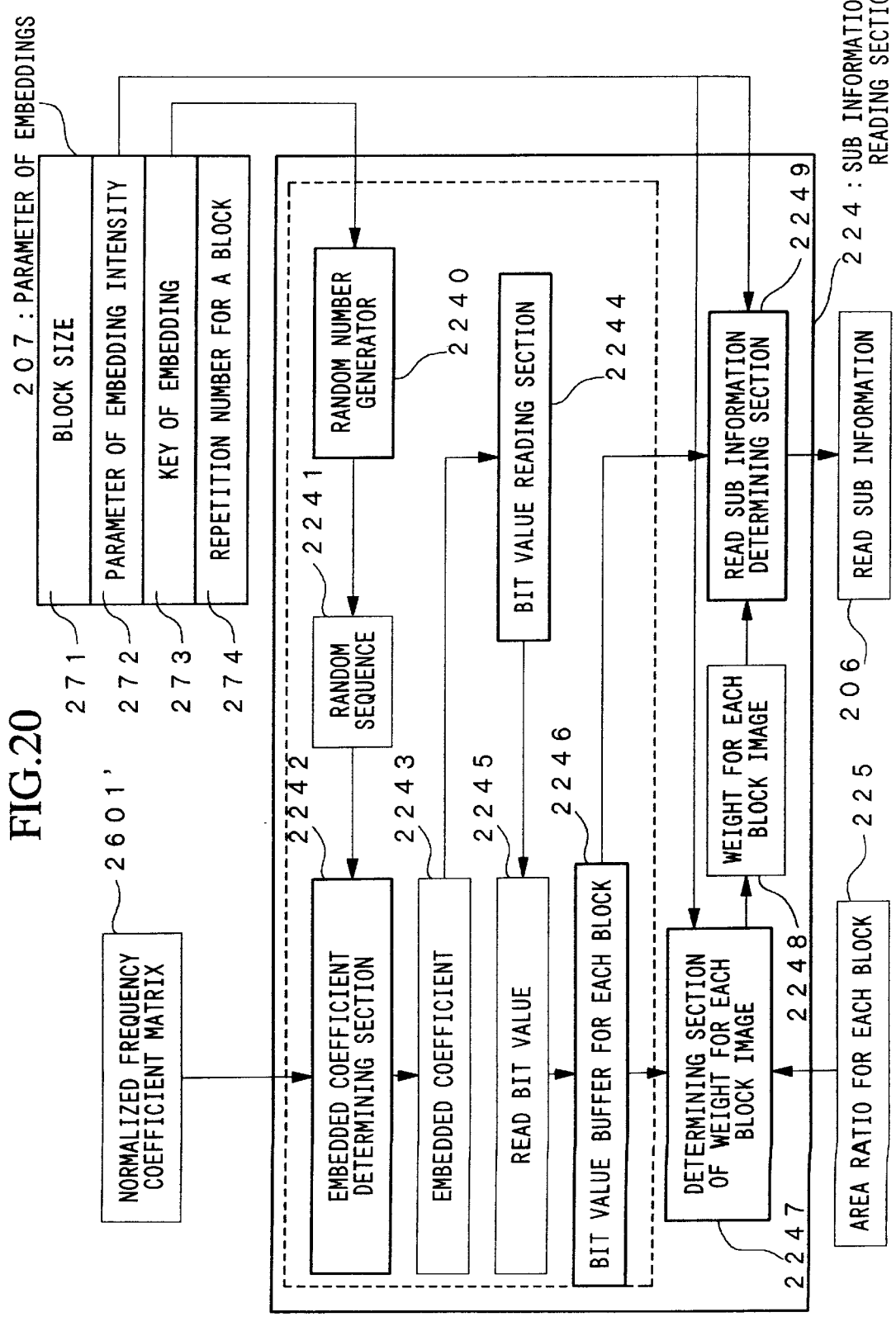
FIG. 20 is a diagram showing a structure example of a sub-information-read-processing section and a processing flow thereof.

FIG. 20 is a diagram showing the detailed structure and the processing flow of the sub-information-reading-section 224 of FIG. 10. In FIG. 20, a random-number-generator 2240 and an embedded-coefficient-determining-section 2242 correspond to the embedding-coefficient-selecting-section 22 in FIG. 3.

With the sub-information-reading-section 224, first in the random-number-generator 2240, a random sequence 2241 is generated using the key-of-embedding 273 in the parameter-of-embedding 207. Then, in the embedded-coefficient-determining-section 2242, it is decided using the random sequence 2241, on which coefficient in a normalized-coefficient-matrix 2601' of the embedded information the embedding processing is to be performed, and the selected frequency coefficient is designated as an embedded-coefficient 2243. With an embedding bit reading section 2244, the value of the bit to be embedded is read out from the parameter-of-embedding-intensity 272 in the parameter-of-embedding 207 and the embedded-coefficient 2243, to obtain a read-bit-value 2245. This processing is repeated by the repetition number within the block 274 in the parameter-of-embedding 207, and all the bit values embedded in one of the normalized coefficient matrixes 2601' are read. This activity is performed for all the normalized coefficient matrixes 2601', and the read bit values 2245 taken out for each normalized-coefficient-matrix 2601' are stored in a bit-value-buffer-for-a-block 2246.

After all the bit values are read, and all the read bit values 2245 in all the blocks are stored in the bit-value-buffer-for-a-block 2246, a weight-for-each-block-image 2248 representing the reliability of the read bit values read from each block is determined in a determining-section-of-weight-for-each-block-image 2247 from the contents of the bit-value-buffer-for-a-block 2246. Thereafter, in a read-sub-information-determining-section 2249, the read-sub-information 206 from the whole picture-to-be-read 205 (embedded-picture 203) is formed from the contents of the bit-value-buffer-for-a-block 2246 and the weight-for-each-block-image 2248, and the read processing of the sub-information is completed.

Here, the bit-value-reading-section 2244, takes the input of the embedded-coefficient 2243 and the parameter-of-embedding-intensity 272 and determines the read-bit-value 2245. With this bit-value-reading-section 2244, as in the r change processing section 1484 in FIG. 18, the embedded-coefficient 2243 is transformed into a coefficient to be embedded expressed in a polar coordinate system in a form of a size (r) and an angle (θ), and from this size (r), the information of one bit is read according to the rule of FIG. 23.

Figure 21:
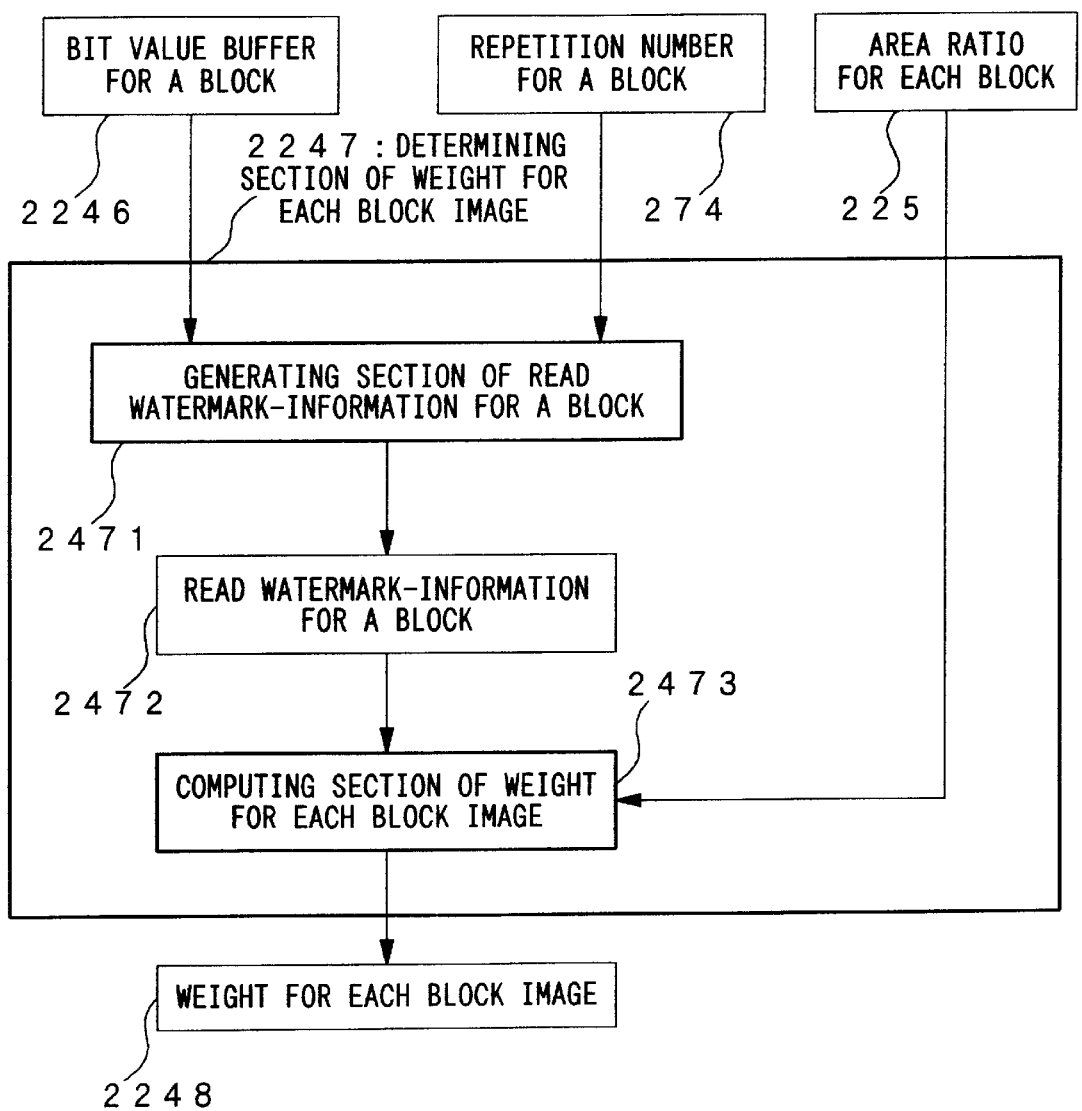
FIG. 21 is a diagram showing an example of the detailed structure of a block-weight-determining-section in FIG. 20, and a processing flow thereof.
Figure 22:
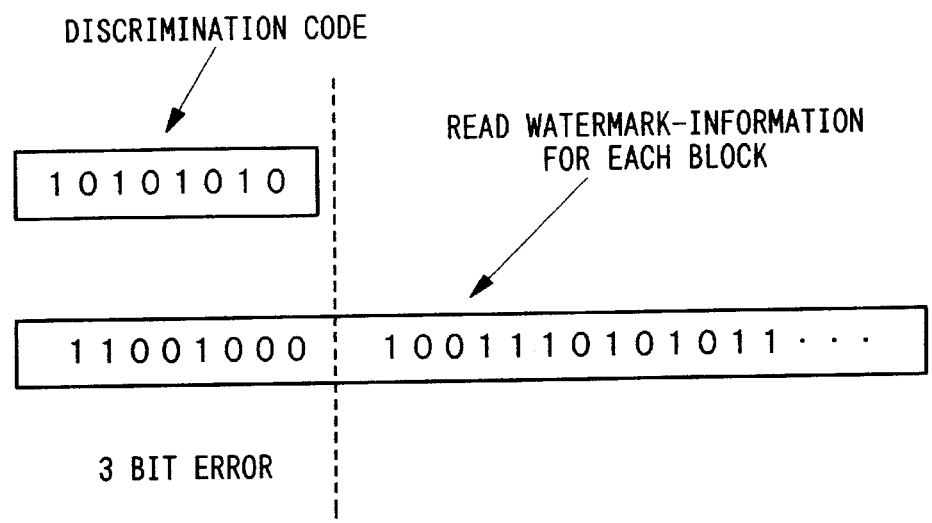
FIG. 22 is a diagram showing how to obtain a bit number d which differs for a discrimination code and a discrimination code of a read watermark-information per block.

FIG. 21 is a diagram showing the detailed structure and the processing flow of the determining-section-of-weight-for-each-block-image 2247 in FIG. 20. With the determining-section-of-weight-for-each-block-image 2247, first, in a generating-section-of-read-watermark-information-for-a-block 2471, read-watermark-information-for-a-block 2472 having the same bit length as that of the watermark-information is generated from the bit sequence of the read-bit-value 2245 stored in the bit-value-buffer-for-a-block 2246, and the repetition number within the block 274 in the parameter-of-embedding 207. Specifically it is determined using a majority vote decision method or the like for each bit. With a computing-section-of-weight-for-each-block-image 2473, the reliability of the read-watermark-information-for-a-block 2472 is computed. The original watermark-information comprises the sub-information and the discrimination code. If the discrimination code is assumed to be always a bit sequence having a fixed length, a different bit number "d" is obtained by comparing the discrimination code and a portion corresponding to the discrimination code of the watermark-information to be read per block, as shown in FIG. 22. Here, it is considered that as "d" increases, the reliability of the read-watermark-information-for-a-block 2472 decreases. Furthermore, the area-ratio-for-each-block 225 has a value smaller than 1 for a block which is filled with, for example, the mean pixel value in the block-dividing-section 221 of FIG. 10. Therefore, it is considered that if the block area ratio is smaller than 1, the reliability of the watermark-information to be read per block is low.

As described above, the weight-for-each-block-image 2248 is determined for every block, for example by simply using the weight computing formula described below:

$$\text{weighting} = \begin{cases} 0 & (d = 0) \\ \dfrac{2^l - \sum_{k=0}^{ad+b} {}_l C_k}{2^l} & (d \neq 0) \end{cases}$$

wherein, l denotes a bit length of the discrimination code, a and b denote real numbers (for example, a=1, b=0), and ${}_l C_k$ denotes a number of a different combination of selecting k from 1.

With the read-sub-information-determining-section 2249 in FIG. 20, the read-sub-information 206 is determined from all the bit values to be read, by adding a corresponding block weight 2428 to the sequence of the read-bit-value 2245 stored in the bit-value-buffer-for-a-block 2246. For example, by using the weighted majority vote decision method with respect to each bit position of the sub-information to be read, the read-sub-information 206 can be determined in a form reflecting the weight-for-each-block-image 2248. In addition, the read-sub-information 206 may be formed by error correction using the majority vote decision method. In this way, since the read-sub-information 206 is determined mainly from the information in the block where it is considered that the watermark-information remains relatively correct, and not from the block where the watermark-information is damaged, the influence of the portion where the watermark-information is easily damaged due to the partial compilation or the lossy compression of the flat area of the image can be controlled to the minimum level. Moreover, by using the area-ratio-for-each-block 225, the embedding processing can be performed for all the image area.

Furthermore, with this embodiment, an example using a Discrete Fourier Transform for the orthogonal transform has been described. However processing using other orthogonal transform is possible.

As described above, according to this embodiment, even in a case where the partial compilation of an image and the lossy compression of an image with lots of flat areas are performed, the correctly embedded sub-information can be read using the block weight. Moreover, with respect to an image area which is not sufficient to form one block at the end of the picture, by filling the insufficient portion with a mean pixel value or by the repetition of a linearly symmetrical pattern, and reflecting the area ratio on the block weight, the embedding processing can be performed for all the image area. Furthermore, by performing the embedding after normalizing the frequency coefficient to a fixed value, the robustness against the contrast change of the picture is increased and the image deterioration due to the embedding is reduced.

Moreover, the sub-information is embedded in a closed form per image block. Therefore, with regard to the partial cutting of the picture, if the cut area contains more than one block, it is possible to take out the sub-information from the cut area by searching for the block starting point. Moreover, the present invention can also be applied to a color image by performing the procedure for each component of the color image, and is similarly also applicable to motion pictures.

By using the present invention for a copyright protection system and the like, it is possible to make the sub-information difficult to delete at a higher accuracy than with the conventional method, even if partial compilation and lossy compression of the image are performed. Hence the deterioration of the image quality due to the embedding can be made less than with the conventional method.

Third Embodiment

With this embodiment, when the information is embedded in the motion picture, then by performing information embedding on the coefficients of the comparatively low frequency domain using orthogonal transform, and performing such things as information embedding by orthogonal transform at a larger block size than the block size used in information compression, and a size which is applicable for a high speed orthogonal transform algorithm, then an information embedding apparatus with high processing speed and robustness with respect to information compression is obtained.

More specifically, in the case where different sub-information is to be embedded in a digital motion picture, the motion picture and information embedding parameters are input, the motion picture is resolved into its respective still images, and the still images are resolved into images of n×n size (where n is an exponent of 2). Then with the respective n×n size images, their image value information is subjected to an n×n orthogonal transformation, the orthogonal transformation coefficient value which is selected so that there is no conflict in the orthogonal transform matrix from the random number generated using an initial value of the random number being one part of the information embedding parameters, is then changed using a quantizer-scale-of-coefficient being one part of the information embedding parameters, and the sub-information being one part of the information embedding parameters is then embedded. The orthogonal transform matrix which has been subjected to the above information embedding is then subjected to an n×n inverse orthogonal transformation, and the motion picture reconstructed from the respective n×n size images.

Moreover, with an information reading apparatus for the case where sub-information is read from the information-embedded motion picture, then similarly the information-embedded motion picture is resolved into respective still images, and the respective still images are resolved into n×n size images. Then with the n×n size images, the pixel information is subjected to an n×n orthogonal transformation, information is read from the orthogonal transformation coefficient value which is selected so that the selected coefficients in the orthogonal transform coefficient matrix do no conflict with each other from the random number generated using a number the same as the first value of the random number used at the time of information embedding, using the quantizer-scale-of-coefficient used at the time of information embedding, and the embedded sub-information is read and reconstructed.

Figure 24:
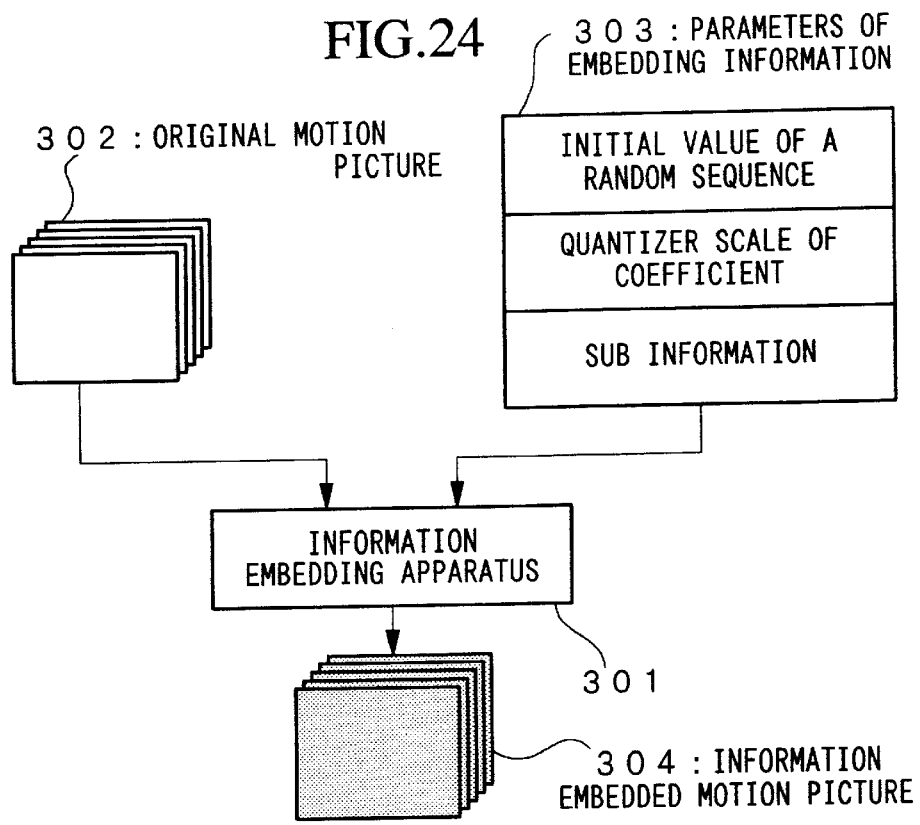
FIG. 24 is a schematic diagram showing the input/output relationship of an information-embedding-apparatus according to a third embodiment.

The third embodiment will now be described with reference to the accompanying drawings. First is a discussion of the processing for embedding information in pictures. FIG. 24 is a schematic diagram of the input/output relationship of the information embedding apparatus according to this embodiment. An information-embedding-apparatus 301 takes the input of original-motion-picture (primary information) 302 of the motion picture, and parameters-of-embedding-information 303 and outputs information-embedded-motion-picture 304. The parameters-of-embedding-information 303 comprise the initial-value-of-a-random-sequence, the quantizer-scale-of-coefficient information, and information to be embedded (sub-information). Comparing FIG. 1 and FIG. 24, the information-embedding-apparatus 1, the original-data 2, the watermark-information 4, the key-of-embedding-information 3 and the embedded-data 5 in FIG. 1 correspond to the information-embedding-apparatus 301, the original-motion-picture 302, the sub-information in the parameters-of-embedding-information 303, the parameters-of-embedding-information 303 excluding the sub-information, and the information-embedded-motion-picture 304 in FIG. 24, respectively. Moreover, the initial-value-of-a-random-sequence 31 and the quantizer-scale-of-coefficient 32 in FIG. 1 correspond to the initial-value-of-a-random-sequence and the quantizer-scale-of-coefficient in the parameters-of-embedding-information 303 in FIG. 24, respectively.

Figure 25:
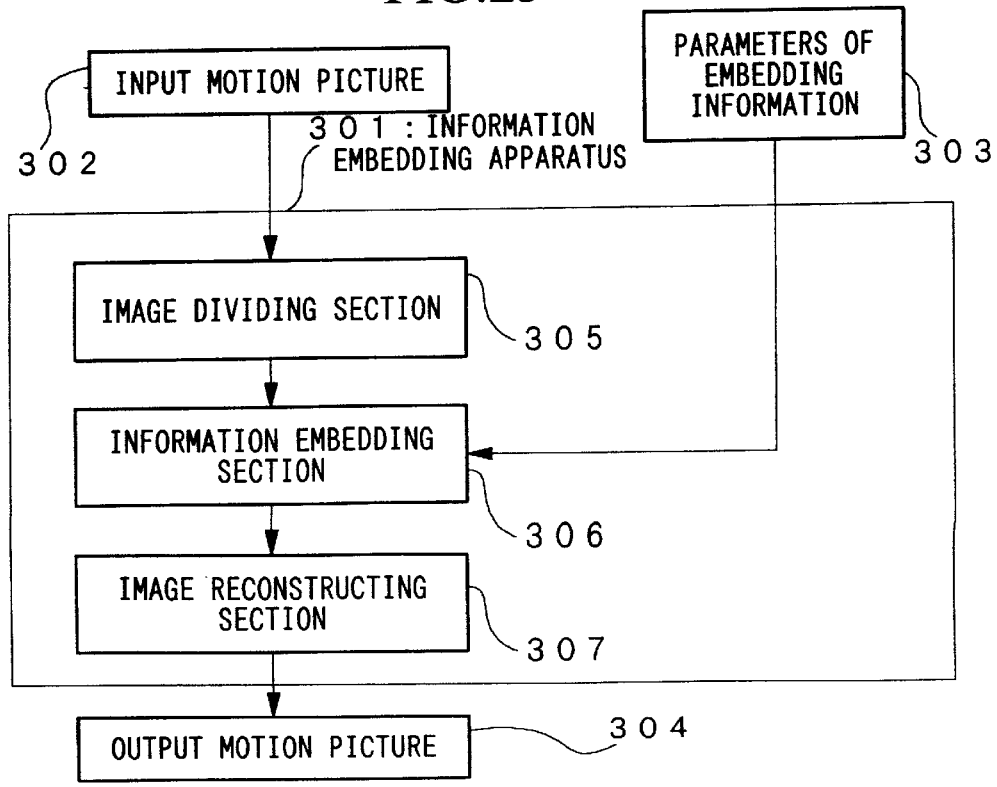
FIG. 25 is a diagram showing the overall structure of the information-embedding-apparatus.

FIG. 25 is a diagram showing the overall structure of the information-embedding-apparatus 301. The information-embedding-apparatus 301 comprises an image-dividing-section 305, an information-embedding-section 306, and an image-reconstructing-section 307. The correspondence between FIG. 1 and FIG. 25 is as follows. The blocking-section 11 in FIG. 1 corresponds to the image-dividing-section 305 in FIG. 25, and the functions of the orthogonal-transform-section 12, the embedding-coefficient-selecting-section 13 and the information-embedding-section 14 in FIG. 1 are included in the information-embedding-section 306. Furthermore, the function of the inverse-orthogonal-transform-section 15 in FIG. 1 corresponds to a part of the function of the information-embedding-section 306 and to the image-reconstructing-section 307. As follows is a sequential description of the respective processing sections.
(Image-dividing-section 305)

Figure 26:
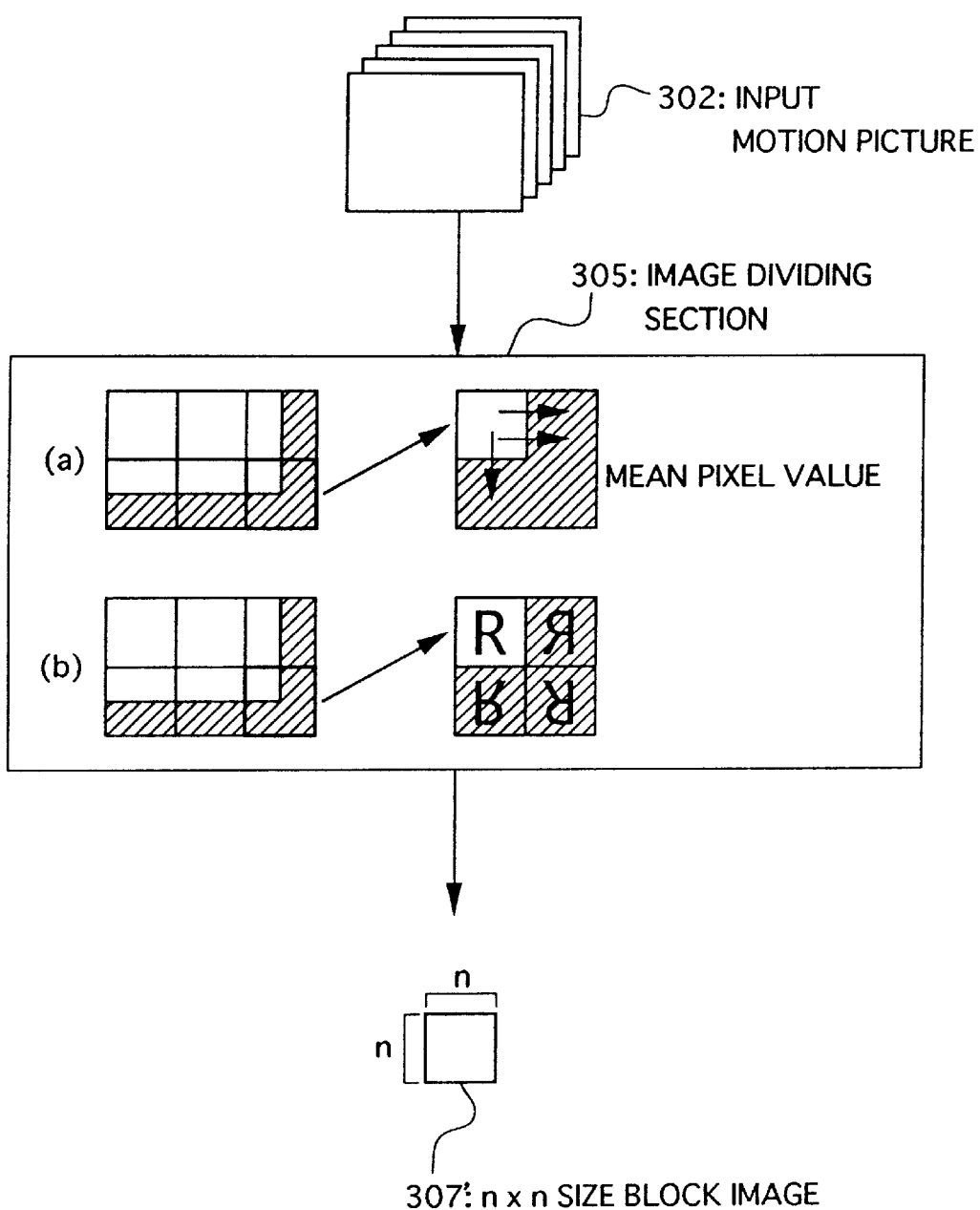
FIG. 26 is a diagram showing an outline of the processing of an image-dividing-section.

FIG. 26 is a diagram showing an outline of the processing of the image-dividing-section 305. The image-dividing-section 305 resolves the input original-motion-picture 302 into still images for each frame, and then resolves the respective still images into an n×n (where n is an exponent of 2) block image 307', and sequentially sends this to the information-embedding-section 306.

Depending on the size of the image, there is the case where an end portion does not become the n×n size. In this case the remaining incomplete size of the n×n size outside of the image will not be filled. Therefore, an n×n image is created by interpolating the insufficient portion with a mean pixel value, and sent to the information-embedding-section 306 ((a) of FIG. 26). As a different method, an n×n image can be created by repeating symmetrical images ((b) of FIG. 26).
(Information-embedding-section 306)

Figure 27:
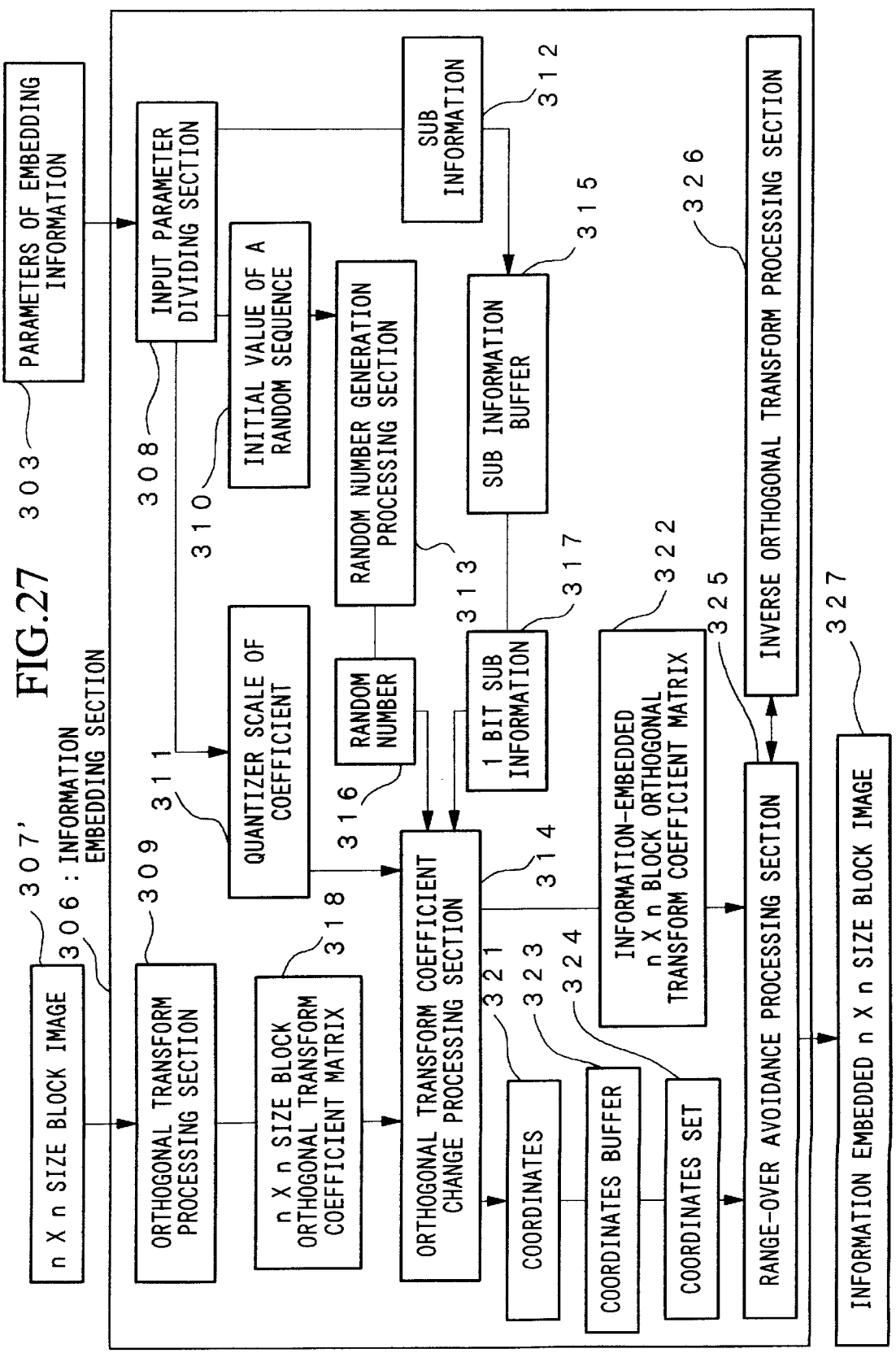
FIG. 27 is a detailed structure diagram of an information-embedding-section.

FIG. 27 is a detailed structure diagram of the information-embedding-section 306. The information-embedding-section 306 takes the input of the parameters-of-embedding-information 303 and the n×n-size-block-image 307', and outputs an information-embedded-n×n-size-block-image 327 which is sent to the image-reconstructing-section 307. Comparing FIG. 27 and FIG. 1, the orthogonal-transform-section 12 in FIG. 1 corresponds to an orthogonal-transform-processing-section 309 in FIG. 27, and the function of the embedding-coefficient-selecting-section 13 in FIG. 1 is realized by a random-number-generation-processing-section 313 and a part of the function of an orthogonal-transform-coefficient-change-processing-section 314 in FIG. 27. Moreover the function of the information-embedding-section 14 in FIG. 1 is included in the orthogonal-transform-coefficient-change-processing-section 314 in FIG. 27. Furthermore, a part of the function of the inverse-orthogonal-transform-section 15 in FIG. 1 corresponds to an inverse-orthogonal-transform-processing-section 326 and a range-over-avoidance-processing-section 325 in FIG. 27. The operation of the information-embedding-section 306 will now be described.

The parameters-of-embedding-information 303 are sent to an input-parameter-dividing-section 308. The input-parameter-dividing-section 308 resolves the input parameters-of-embedding-information 303 and respectively recreates; an initial-value-of-a-random-sequence 310, a quantizer-scale-of-coefficient 311, and sub-information 312, and outputs these. The initial-value-of-a-random-sequence 310 is sent to the random-number-generation-processing-section 313, the quantizer-scale-of-coefficient 311 is sent to the orthogonal-transform-coefficient-change-processing-section 314, and the sub-information 312 is sent to a sub-information buffer 315.

The random-number-generation-processing-section 313 reads the initial-value-of-a-random-sequence 310, and based on this, successively creates and outputs a random number 316 for each processing of the respective 1 bit information embedding.

Figure 28:
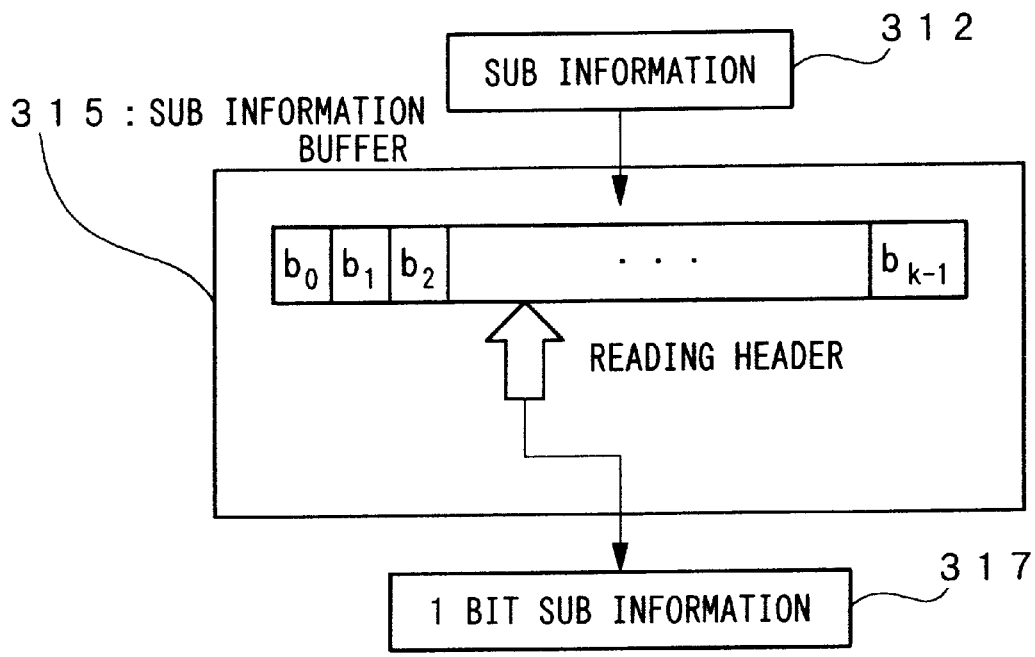
FIG. 28 is a conceptual diagram of a sub-information-buffer.

The sub-information buffer 315 stores the sub-information 312 in an internal buffer, and reads out information one bit at a time by means of an internal information readout header, and outputs 1 bit sub-information 317. FIG. 28 shows a conceptual diagram of the sub-information buffer 315.

For the control method of the header inside the sub-information buffer, various methods can be considered such as a method which is activated for each processing of the respective one bit information embedding, or a method which is activated for each processing of the information embedding to the respective block images. However these depend on the packaging system for the information embedding apparatus. With the control method for the header which performs information reading/writing of the sub-information buffer, packaging must be carried out with the same method in the information embedding apparatus and in the information reading apparatus.

Figure 29:
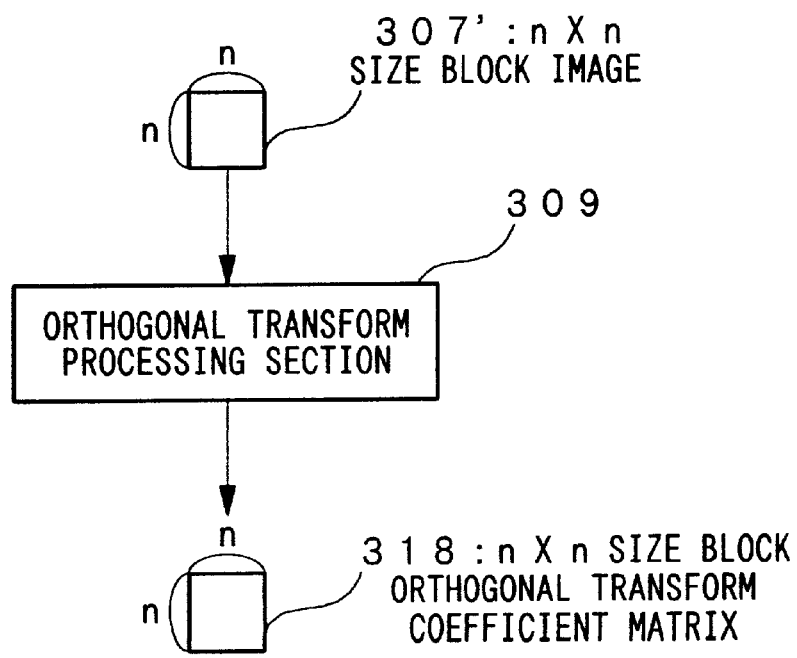
FIG. 29 is a conceptual diagram of an orthogonal-transform-processing-section.

Considering now the n×n-size-block-image 307', this is sent to the orthogonal-transform-processing-section 309. The orthogonal-transform-processing-section 309 subjects the n×n-size-block-image 307' to an n×n orthogonal transformation to create an n×n block orthogonal transformation coefficient matrix 318, and sends this to the orthogonal-transform-coefficient-change-processing-section 314. FIG. 29 shows a conceptual diagram of the orthogonal-transform-processing-section 309. Since the orthogonal transform processing itself is known, details thereof are omitted.

Figure 30:
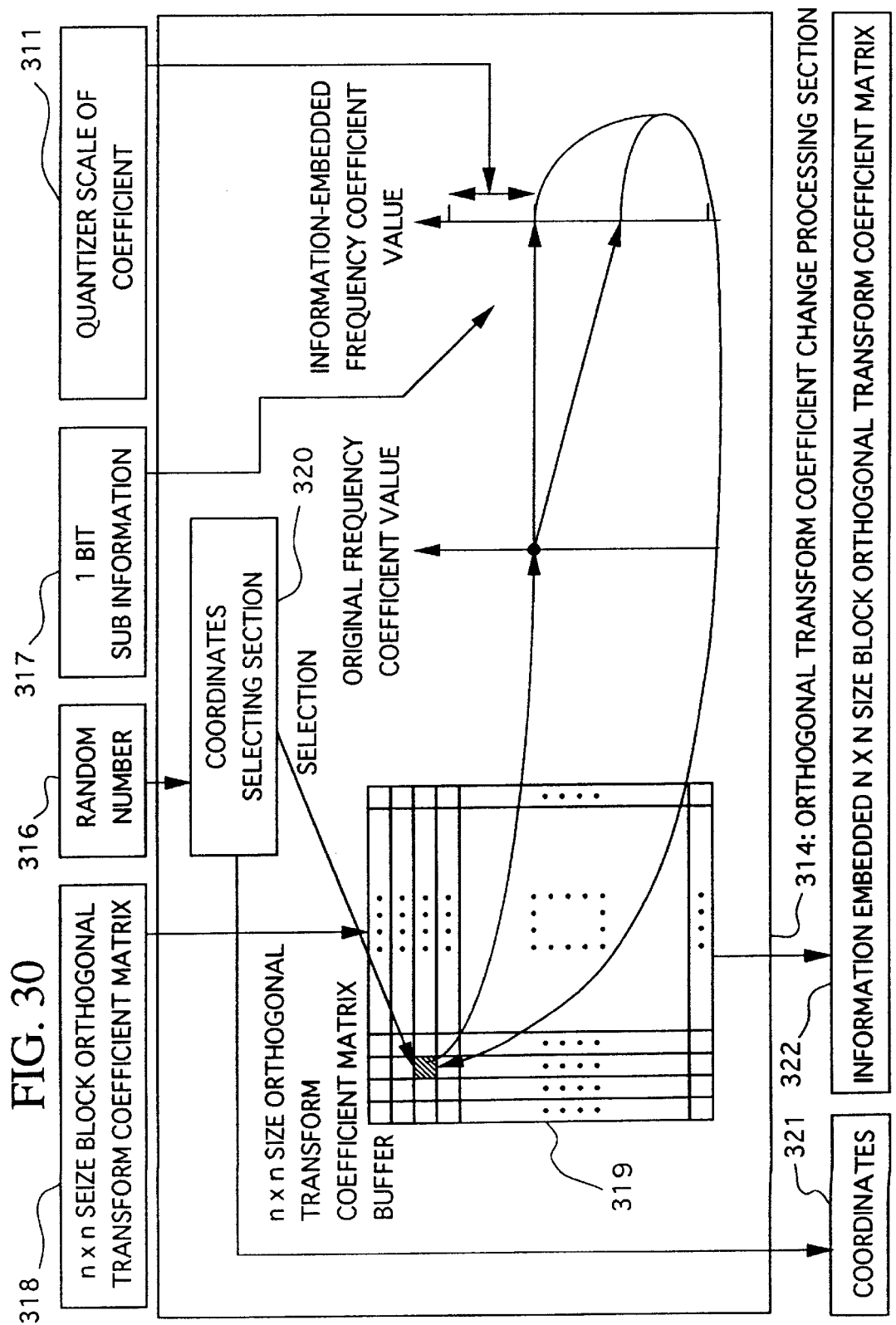
FIG. 30 is a conceptual diagram of an orthogonal-transform-coefficient-changing-section.

FIG. 30 is a conceptual diagram showing an outline structure and the processing of the orthogonal-transform-coefficient-change-processing-section 314. A coordinates-selecting-section 320 in FIG. 30 realizes a part of the function of the embedding-coefficient-selecting-section 13 in FIG. 1. The n×n-size-block-orthogonal-transform-coefficient-matrix 318 is stored in an n×n orthogonal transform coefficient matrix buffer 319. The random number 316 is input to the coordinates-selecting-section 320.

Figure 31:
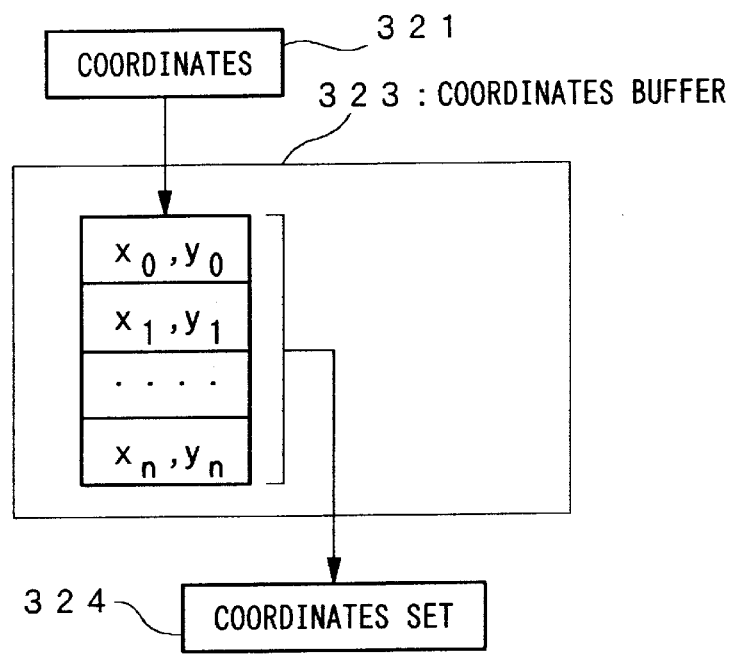
FIG. 31 is a schematic diagram of a coordinates-buffer.

The coordinates-selecting-section 320 selects one coefficient from the n×n orthogonal transform coefficient matrix using the input random number 316, so that there is no conflict in the orthogonal transform coefficient matrix, and outputs corresponding coordinates 321. These coordinates 321 are stored in a Coordinates-buffer 323. All of the coordinates for each of the respective block embedding processing are saved in the Coordinates-buffer 323, and after the respective block embedding processing, a stored Coordinates-set 324 is output to the range-over-avoidance-processing-section 325. FIG. 31 is a schematic diagram of the Coordinates-buffer 323.

The orthogonal-transform-coefficient-change-processing-section 314, information embeds the 1 bit sub-information 317 in the coefficient corresponding to the selected coordinates 321 using the quantizer-scale-of-coefficient 311. The information embedding processing is performed j times (where j is an integer of 1 or more, being a parameter which is determined when the information embedding apparatus carries out packaging. The information reading apparatus must also carry out packaging using the same method) for one block of the orthogonal transform coefficient matrix. Then once all have been completed, an information-embedded-n×n-size-block-orthogonal-transform-coefficient-matrix 322 is output.

Next is a more specific description of the processing for embedding 1 bit information in an (h, v)i block, when the upper left still image in the i-th frame of the input original-motion-picture 302 is made [0, 0]i block.

The 1 bit sub-information 317 for embedding is made $b_o b_1 \ldots b_{k-1}$ (where the bit length is k), the sub-information 312 for embedding in the block [h, v]i is made $b\alpha \in \{0,1\}$, $0 \leq \alpha \leq k-1$, the random number used in the embedding is made $$r^j_{[h,v]_i},$$

the quantizer-scale-of-coefficient is made range, and the n×n block orthogonal transform coefficient matrix is made $[c_{(x,y)}]$.

The coordinates-selecting-section 320, selects the coordinates $$\left(x^j_{r[h,v]_i}, y^j_{r[h,v]_i}\right)$$

from the random number $$r^j_{[h,v]_i}.$$

The orthogonal-transform-coefficient-change-processing-section 314 then changes the value for the orthogonal transform coefficient $$c_{\left(x^j_{r[h,v]_i}, y^j_{r[h,v]_i}\right)_i}$$

in the n×n block orthogonal transform coefficient matrix buffer 319 which matches the coordinates, to:

$$\left\lfloor \frac{c_{\left(x^j_{r[h,v]_i}, y^j_{r[h,v]_i}\right)_i}}{range} + \frac{1}{2} \right\rfloor \times range$$

when the information to be embedded bα is equal to:

$$\left\lfloor \frac{c_{\left(x^j_{r(h,v)_i}, y^j_{r(h,v)_i}\right)_i}}{range} + \frac{1}{2} \right\rfloor \mod 2$$

to:
$$\left\lfloor \frac{c_{\left(x^j_{r(h,v)_i}, y^j_{r(h,v)_i}\right)_i}}{range} \right\rfloor \times range$$

when the information to be embedded bα is not equal to:

$$\left\lfloor \frac{c_{\left(x^j_{r(h,v)_i}, y^j_{r(h,v)_i}\right)_i}}{range} + \frac{1}{2} \right\rfloor \mod 2$$

and $\left\lfloor \frac{c_{\left(x^j_{r(h,v)_i}, y^j_{r(h,v)_i}\right)_i}}{range} + \frac{1}{2} \right\rfloor$ is equal to $\left\lfloor \frac{c_{\left(x^j_{r(h,v)_i}, y^j_{r(h,v)_i}\right)_i}}{range} \right\rfloor$ and to: $\left\lfloor \frac{c_{\left(x^j_{r(h,v)_i}, y^j_{r(h,v)_i}\right)_i}}{range} + \frac{1}{2} \right\rfloor \times range$ when the information to be embedded bα is not equal to:

$$\left\lfloor \frac{c_{\left(x^j_{r(h,v)_i}, y^j_{r(h,v)_i}\right)_i}}{range} + \frac{1}{2} \right\rfloor \mod 2$$

and $\left\lfloor \frac{c_{\left(x^j_{r(h,v)_i}, y^j_{r(h,v)_i}\right)_i}}{range} + \frac{1}{2} \right\rfloor$ is not equal to $\left\lfloor \frac{c_{\left(x^j_{r(h,v)_i}, y^j_{r(h,v)_i}\right)_i}}{range} \right\rfloor$ to thereby embed the 1 bit sub-information 317. The coordinates $$\left(x^j_{r[h,v]_i}, y^j_{r[h,v]_i}\right)$$

of the coefficient which has been subjected to embedding are then sent to the Coordinates-buffer 323 and stored.

Then while controlling the sub-information readout header of the sub-information buffer 315 by a predetermined method, the above-mentioned embedding processing is repeated j times being the bit number for embedding therein (this need not be a sub-information bit number), with respect to one block of the orthogonal transform coefficient matrix, to thereby complete the embedding processing of one block of the orthogonal transform coefficient matrix.

After the embedding processing, the information-embedded-n×n-size-block-orthogonal-transform-coefficient-matrix 322 (made $[c'_{(x,y)}]$i) and the Coordinates-set 324 (FIG. 31), are sent to the range-over-avoidance-processing-section 325 in order to avoid poor reproduction of the information-embedded image while retaining the value of the orthogonal transform coefficient which has been subjected to information embedding and the quality and structure of the image of the motion picture which has been subjected to information embedding.

Figure 32:
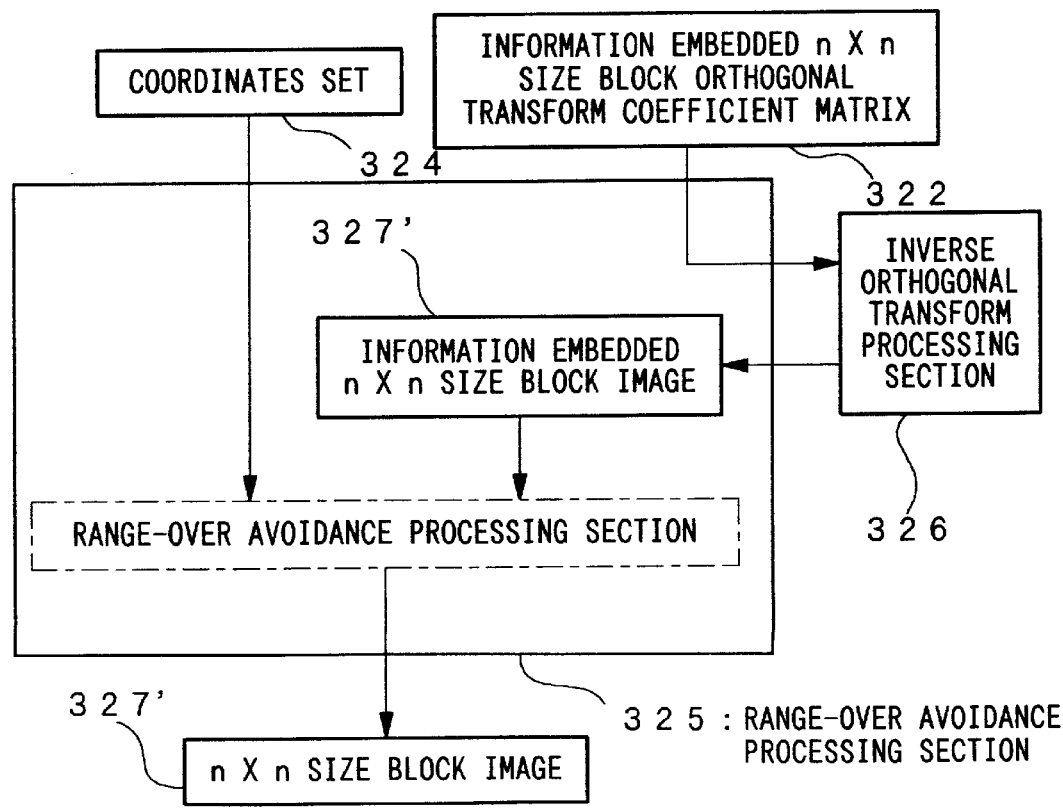
FIG. 32 is a conceptual diagram of a range-over-avoidance-processing-section.
Figure 33:
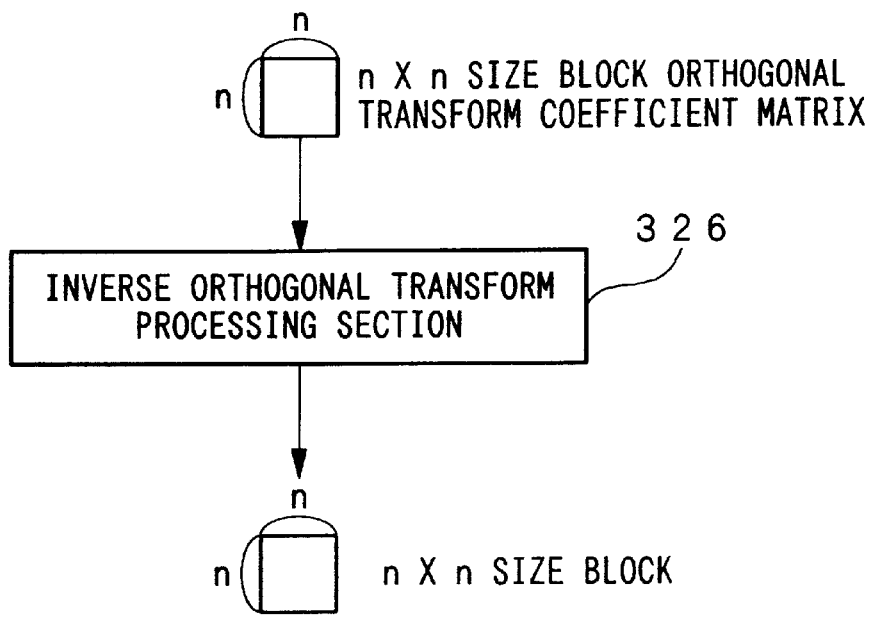
FIG. 33 is a conceptual diagram of an inverse-orthogonal-transform-processing-section.

FIG. 32 is a conceptual diagram of the range-over-avoidance-processing-section 325, while FIG. 33 is a conceptual diagram of the inverse-orthogonal-transform-processing-section 326. The range-over-avoidance-processing-section 325 refers to the Coordinates-set 324 to perform range-over avoidance processing on the information-embedded-n×n-size-block-image 327 which is inverse transformed using the input information-embedded-n×n-size-block-orthogonal-transform-coefficient-matrix 322, corrects this so that all of the pixel values can be kept in the domain of the pixel value (for example from 0~255 for an 8-bit gray scale image), and then outputs the information-embedded-n×n-size-block-image 327. The inverse-orthogonal-transform-processing-section 326, as shown in FIG. 33 performs an n×n inverse orthogonal transform of the same size as the block orthogonal transform coefficient matrix to be allocated, and then successively outputs the n×n block images.

Here the $[c'_{(x,y)}]$i being the information-embedded-n×n-size-block-orthogonal-transform-coefficient-matrix 322 which is input to the range-over-avoidance-processing-section 325 is inverse orthogonally transformed using the inverse-orthogonal-transform-processing-section 326 so that the n×n block image 327' becomes $[p'_{(x,y)}]i$.

Furthermore, with the coefficient matrix[c'(x, y)]i input to the range-over-avoidance-processing-section 325, with one, the (0,0) component being the DC component, is changed to the minimum value of the values which can be taken by the DC component in the definition of the n×n orthogonal transform (for example assuming the orthogonal transform is DCT, then that value is –Lm×n (where Lm is a central value of luminance), and the component values of all the coordinates of the input Coordinates-set 324 are all made 0, and the n×n image which has been inverse orthogonally transformed using the inverse-orthogonal-transform-processing-section 326 is made $[p1_{(x,y)}]i$. With another, the (0,0) components values and the values apart from the component values of all the coordinates of the input Coordinates-set 324 are all changed to 0, and the n×n image which has been inverse orthogonally transformed using the inverse-orthogonal-transform-processing-section 326 is made $[p2_{(x,y)}]i$.

With the range-over-avoidance-processing-section 325, with the set $Ai=\{(s, t)|p'_{(s, t)_i}<Lmin \text{ or } p'_{(s, t)_i}>Lmax\}$, provided that Ai is not an empty set, then by performing the following computation;

$$\forall x \forall y \; p''_{(x,y)_i} = \lfloor const_{f_i} \cdot p1_{(x,y)_i} + p2_{(x,y)_i} + const_{g_i} \rfloor$$

$$const_{f_i} = \min(s, t) \in Ai\left\{\frac{f(s, t)}{p1_{((s,t))_i}}\right\}$$

$$const_{g_i} = \begin{cases} \max(s, t) \in Ai\{|p2_{s,t} - Lm| - Lm\} \cdot \frac{Lm - p2_{s,t}}{|Lm - p2_{s,t}|} \\ \text{if } \{(x, y) \mid p''_{(x,y)_i} < L\min, p2_{(x,y)_i} < L\min \text{ or } p''_{(x,y)_i} > L\max, p2_{(x,y)_i} > L\max\} \neq \Phi \\ 0 \\ \text{if } \{(x, y) \mid p''_{(x,y)_i} < L\min, p2_{(x,y)_i} < L\min \text{ or } p''_{(x,y)_i} > L\max, p2_{(x,y)_i} > L\max\} = \Phi \end{cases}$$

$$f(s, t) = \begin{cases} L\min - p2_{(s,t)_i} (\text{if } p''_{(s,t)_i} < L\min, p2_{(s,t)_i} > L\min) \\ L\max - p2_{(s,t)_i} (\text{if } p''_{(s,t)_i} > L\max, p2_{(s,t)_i} < L\max) \end{cases}$$

where Φ is an empty set, $L_{min}$ is the minimum value of the pixel values and $L_{max}$ is the maximum value of the pixel values;

using $[p1_{(x,y)}]i$, $[p2_{(x,y)}]i$, the information-embedded-n×n-size-block-image 327 $[p''_{(x,y)}]i$ is obtained. The processing as discussed above so that the value after the inverse orthogonal transform does not exceed the domain of pixel value is performed using the orthogonal transform coefficient. However, in the pixel value matrix $[p2_{(h, v, t)}]i$, when a pixel value smaller than $L_{min}$ and a pixel value larger than $L_{max}$ exist together, this range-over avoidance processing is not applicable. Therefore when the information embedding is performed it is necessary to take care that the value of the range is not an excessively large value.

The information-embedding-section 306 performs the above processing for all of the block images of all of the still images, and outputs the information-embedded n×n block images 327 to the image-reconstructing-section 307.

(Image-reconstructing-section 307)

Figure 34:
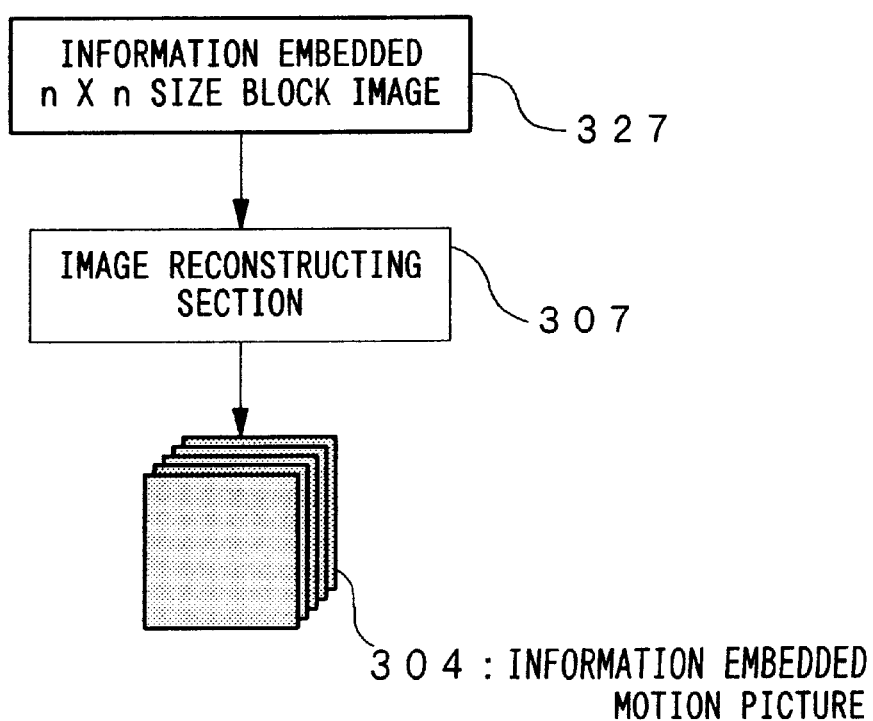
FIG. 34 is a conceptual diagram of an image-reconstructing-section.

FIG. 34 is a conceptual diagram for the input and output images of the image-reconstructing-section 307. The image-reconstructing-section 307 links together the input respective information-embedded n×n block images 327, and reconstructs these to the still images and the motion pictures, to thereby obtain the information-embedded-motion-picture 304.

Figure 35:
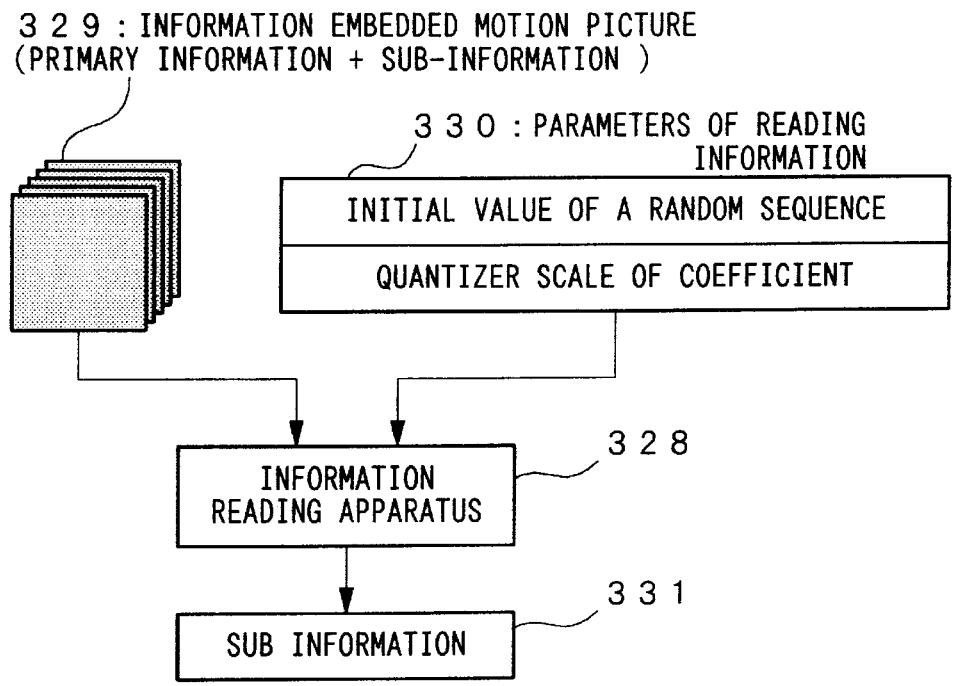
FIG. 35 is a schematic diagram showing an input/output relationship of the information-reading-apparatus according to the third embodiment.

Next is a description of the process for reading information from the information-embedded images. FIG. 35 is a conceptual diagram of the input and output relationship of the information reading apparatus according to the present invention. An information-reading-apparatus 328 takes the input of information-embedded-motion-picture (primary information+sub-information) 329 and parameters-of-reading-information 330, and outputs sub-information 331 which has been embedded in the pictures 329. The parameters-of-reading-information 330 comprise the initial-value-of-a-random-sequence of the information embedding key used at the time of creating the information-embedded-motion-picture 329, and the quantizer-scale-of-coefficient. Comparing FIG. 3 and FIG. 35, the information-reading-apparatus 6, the embedded-data 5, the key-of-embedding-information 3, and the watermark-information 4 in FIG. 3 correspond to the information-reading-apparatus 328, the information-embedded-motion-picture 329, the parameters-of-reading-information 330 and the sub-information 331 in FIG. 35, respectively.

Figure 36:
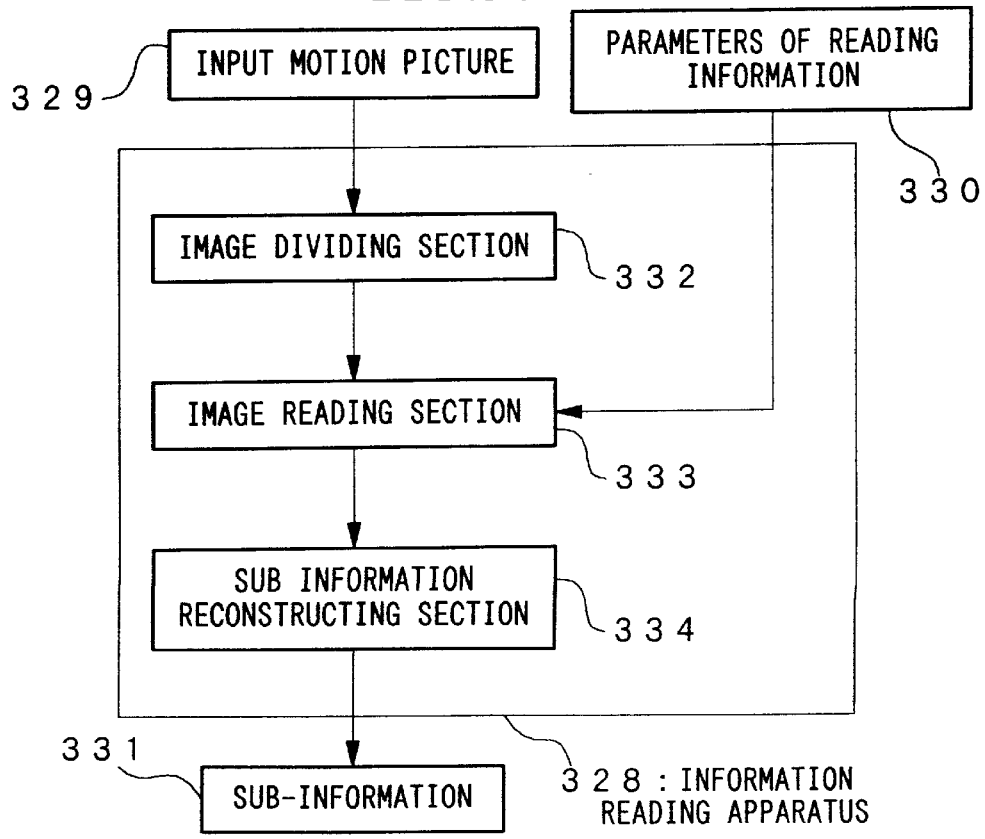
FIG. 36 is a diagram showing the overall structure of an information-reading-apparatus.

FIG. 36 is an overall structure diagram of the information-reading-apparatus 328. The information-reading-apparatus 328 comprises an image-dividing-section 332, an image-reading-section 333, and a sub-information-reconstructing-section 334. The correspondence with FIG. 3 is given hereunder. The block portion 21 in FIG. 3 corresponds to the image-dividing-section 332 in FIG. 36. Furthermore, the function of the embedding-coefficient-selecting-section 22 and the section-for-computing-coefficient-to-be-processed 23 in FIG. 3 is included in the image-reading-section 333 in FIG. 36. Moreover, the function of the information-reading-section 24 in FIG. 3 is divided into a part of the function of the image-reading-section 333, and the sub-information-reconstructing-section 334. As follows is a sequential description of the respective processing sections.

(Image-dividing-section 332)

The processing of the image-dividing-section 332 is basically the same as for the image-dividing-section 305 used in the information-embedding-apparatus 301. The information-embedded-motion-picture 329 is resolved into still images for each frame. The respective still images are then resolved into n×n (where n is an exponent of 2) block images, which are sequentially sent to the image-reading-section 333.

With the image-dividing-section 332, in order to resolve the image at the same size as the image-dividing-section 305 of the information-embedding-apparatus 301, then packaging is necessary. Moreover, also with the incomplete portion at the end of the image, the processing as shown in FIG. 26 is necessary.

(Image-reading-section 333)

Figure 37:
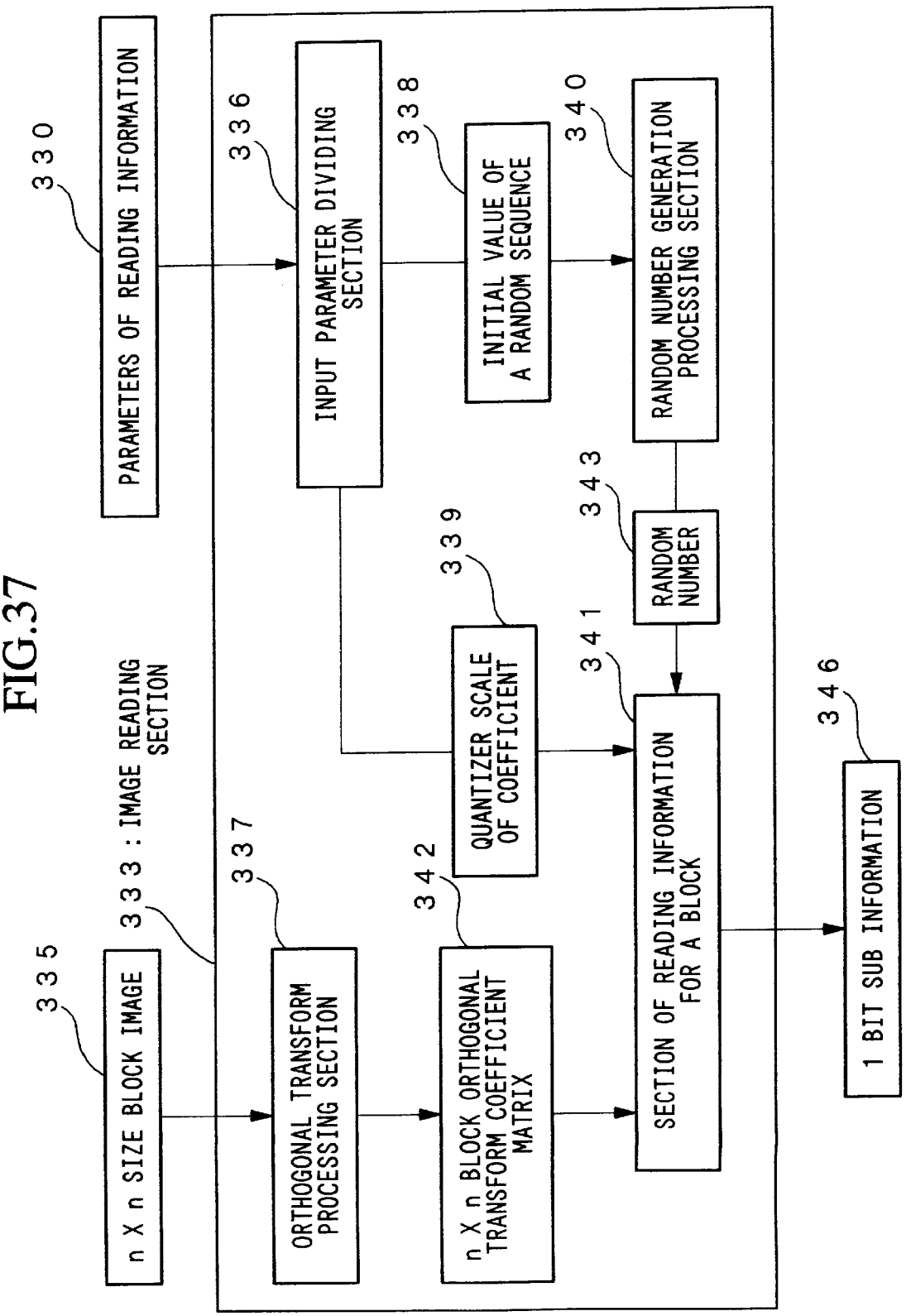
FIG. 37 is a detailed structure diagram of an image-reading-section.

FIG. 37 is a detailed structure diagram of the image-reading-section 333. The image-reading-section 333 takes the input of the parameters-of-reading-information 330 and information-embedded block images 335, and reads one bit at a time the sub-information which has been embedded in the respective block images. This 1 bit sub-information 346 is sent successively to the sub-information-reconstructing-section 334. Here the function of the embedding-coefficient-selecting-section 22 in FIG. 3 is realized by a part of the function of an section-of-reading-information-for-a-block 341 and by a random-number-generation-processing-section 340, while the function of the section-for-computing-coefficient-to-be-processed 23 in FIG. 3 is realized by an orthogonal-transform-processing-section 337. The operation of the image-reading-section 333 is detailed below.

The parameters-of-reading-information 330 are sent to an input-parameter-dividing-section 336. The input-parameter-dividing-section 336 resolves the input parameters-of-reading-information 330 and respectively constructs and outputs an initial-value-of-a-random-sequence 338 and a quantizer-scale-of-coefficient 339. The initial-value-of-a-random-sequence 338 is output to the random-number-generation-processing-section 340, while the quantizer-scale-of-coefficient 339 is output to the section-of-reading-information-for-a-block 341.

Moreover, with the information-embedded n×n-size-block-image 335, these are sent to the orthogonal-transform-processing-section 337. The orthogonal-transform-processing-section 337 performs processing the same as for the orthogonal-transform-processing-section 309 which uses the information-embedding-section 306 of the information-embedding-apparatus 301. The n×n-size-block-image 335 are n×n orthogonally transformed, and a created n×n-size-block-orthogonal-transform-coefficient-matrix 342 is sent to the section-of-reading-information-for-a-block 341.

The random-number-generation-processing-section 340 reads the initial-value-of-a-random-sequence 338, and based on this, successively creates and outputs a random number 343 for each processing of the respective 1 bit information reading. With the random-number-generation-processing-section 340 on the information read processing side and the random-number-generation-processing-section 313 on the information embedding processing side, when the same initial value for the random number is input, then packaging is necessary so that the same random numbers are output in the same order.

Figure 38:
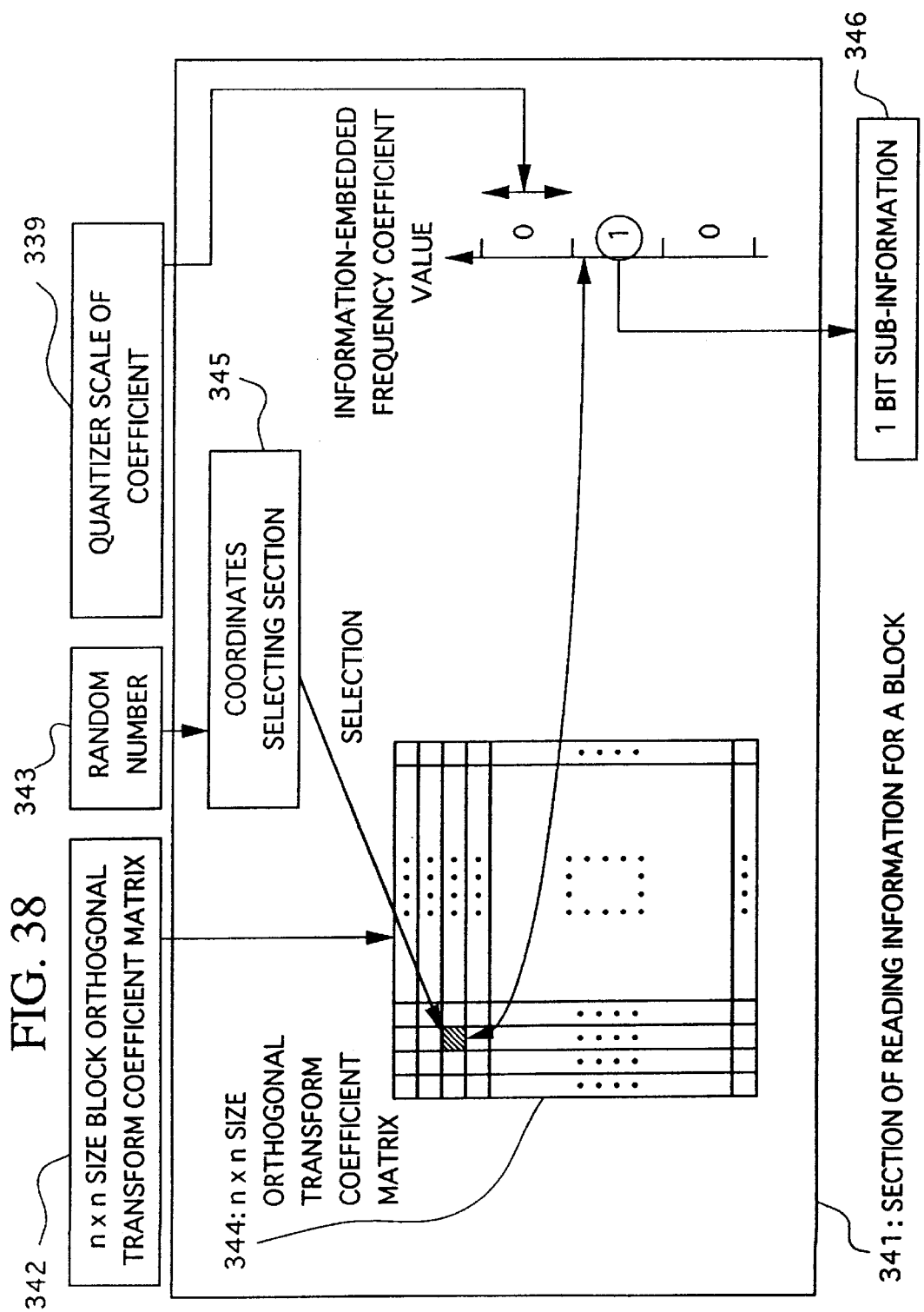
FIG. 38 is a conceptual diagram of a section-of-reading-information-for-a-block.

FIG. 38 is a conceptual diagram showing an outline structure and the processing of the section-of-reading-information-for-a-block 341. A part of the function of the embedding-coefficient-selecting-section 22 in FIG. 3 is realized by a coordinates-selecting-section 345 in FIG. 38. The n×n-size-block-orthogonal-transform coefficient-matrix 342 is stored in an n×n-size-orthogonal-transform coefficient-matrix 344. The random number 343 is input to the coordinates-selecting-section 345. The coordinates-selecting-section 345 performs processing the same as for the coordinates-selecting-section 320 which uses the orthogonal-transform-coefficient-change-processing-section 314 of the information-embedding-section 306. That is to say, with the coordinates-selecting-section 345 on the information read processing side and the coordinates-selecting-section 320 on the information embedding processing side, when the same random number is input, packaging is necessary so that the same coordinate is output.

With the section-of-reading-information-for-a-block 341, the coefficient inside the n×n orthogonal transform coefficient matrix 344 corresponding to the coordinate selected by the coordinates-selecting-section 345 is quantized using the quantizer-scale-f coefficient 339, and the 1 bit sub-information 346 then output by checking if the quotient when the quantized value is divided by the quantizer-scale-of-coefficient 339 is an odd number or an even number. The information read processing is performed j times (where j is a number packaged in the information embedding processing, being the same as the bit number j for embedding in the respective block orthogonal transform coefficient matrix) for one block orthogonal transform coefficient matrix, and the embedded 1 bit sub-information 346 is then output sequentially.

With the number of times of information read processing, the number of times that the respective bits of the embedded sub-information are read is increased, and in accordance with this by carrying out majority vote processing or the like on these, the reliability of the read sub-information can also be improved.

As follows is a more specific description of the processing for reading 1 bit information from the [h, v]i block, when in the i-th frame of the information-embedded-motion-picture 329, the upper left is made [0,0]i block.

The sub-information 331 embedded in the picture 329 is made $b_o b_1 \ldots b_{k-1}$ (where bit length is k), one of the sub-information (1 bit sub-information 346) embedded in the [h, v]i block is made b $\alpha \in \{0,1\}, 0 \leq \alpha \leq k-1$, the random number 343 used in the information reading is made $$r^j_{[h,v]_i},$$

the quantizer-scale-of-coefficient 339 is made range, and the n×n-size-block-orthogonal-transform-coefficient-matrix 342 is made $[c_{(x, y)}]i$.

The coordinates-selecting-section 345 creates coordinates $$\left( {}^x r^j_{[h,v]_i}, {}^y r^j_{[h,v]_i} \right)$$

from random number $$r^j_{[h,v]_i}.$$

The section-of-reading-information-for-a-block 341 then obtains the 1 bit sub-information 346 bα of those which are embedded in the [h, v]i block, by computing $$b\alpha = \left[ \frac{c_{\left( {}^x r^j_{[h,v]_i}, {}^y r^j_{[h,v]_i} \right)_i}}{\text{range}} + \frac{1}{2} \right] \mod 2$$

with respect to the orthogonal transform coefficient $$c_{\left( {}^x r^j_{[h,v]_i}, {}^y r^j_{[h,v]_i} \right)_i},$$

being the coordinates inside the n×n-size-orthogonal-transform-coefficient-matrix 344. This read 1 bit sub-information 346 is then sent to the sub-information-reconstructing-section 334.

(Sub-information-reconstructing-section 334)

Figure 39:
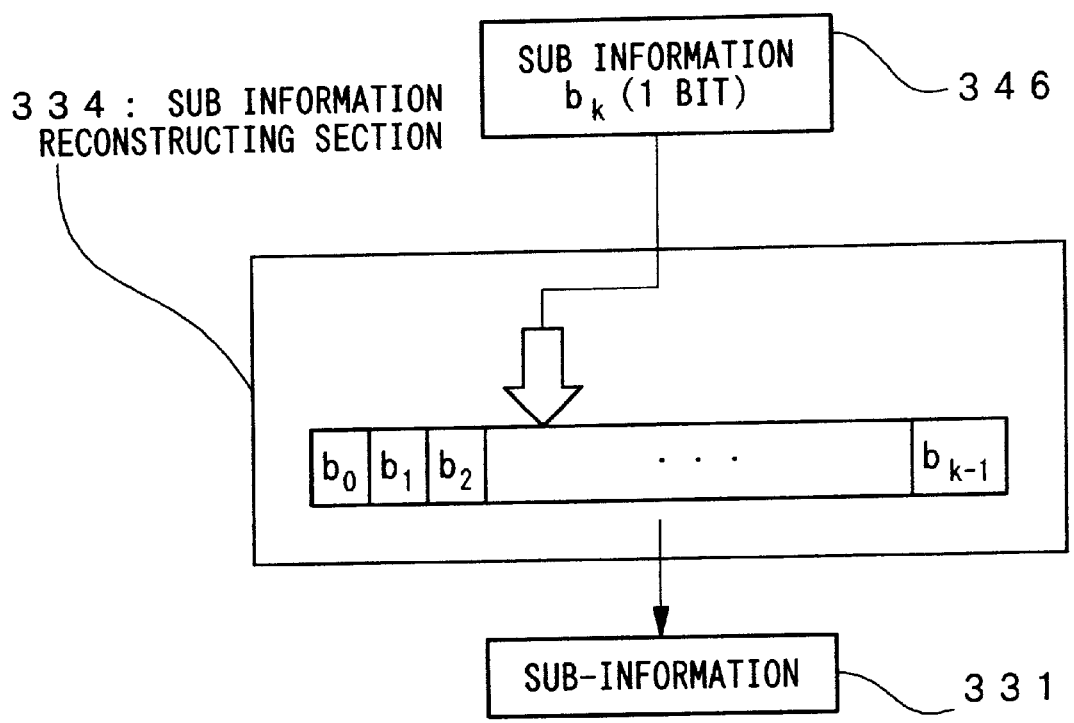
FIG. 39 is a conceptual diagram of a sub-information-reconstructing-section.

FIG. 39 is a conceptual view of the processing of the sub-information-reconstructing-section 334. The subinformation-reconstructing-section 334 takes the input of the sub-information embedded in the block image successively 1 bit at a time, determines the respective sub-information bits input over several times using an error correcting code technique such as majority vote, and reconstructs the original sub-information 331. The sub-information-reconstructing-section 334 receives the 1 bit sub-information 346 and controls the sub-information write header by a previously determined method.

The sub-information read processing from one block of the orthogonal transform coefficient matrix is completed by read processing repetitively with respect to one block of the orthogonal transform coefficient matrix, j times being the number of bits embedded therein.

The above processing is performed for all of the block images for all of the still images, and each time the sub-information 331 is obtained, or after the processing in all of the frames is completed, then the sub-information 331 read from the information-embedded-motion-picture 329 is output.

Next is a description of a method for improving the information read speed in the information read processing. With the image-reading-section 333 in the information-reading-apparatus 328, as shown in FIG. 37, the n×n block image 335 to be input is temporarily transformed to the n×n-size-block-orthogonal-transform-coefficient-matrix 342 using the orthogonal-transform-processing-section 337. However, by not performing this transformation processing and directly computing from the n×n block image only the orthogonal transform coefficient which has been subjected to information embedding, then the computation load can be reduced.

Figure 40:
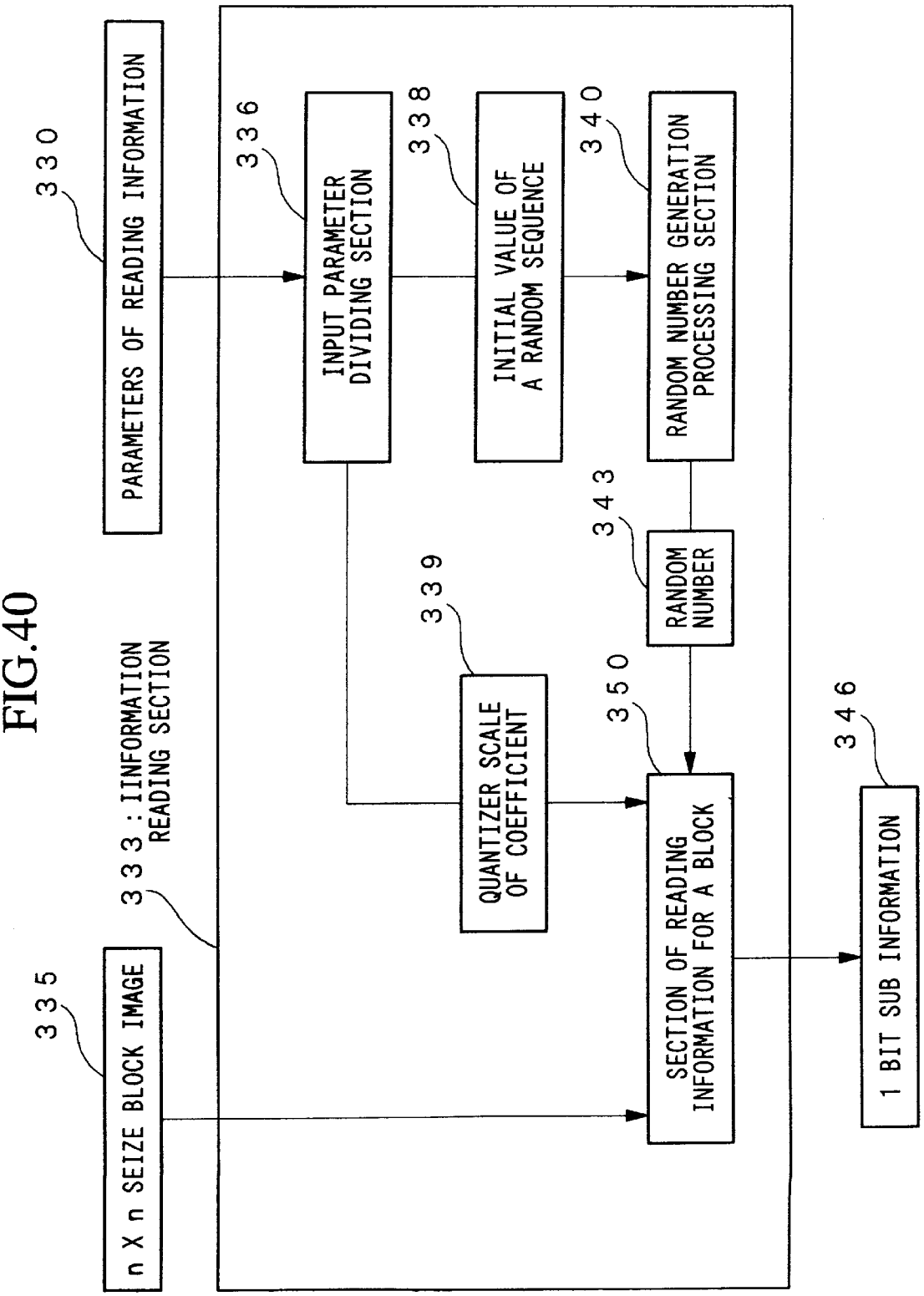
FIG. 40 is a conceptual diagram of a high-speed information read processing section.

FIG. 40 shows a structural diagram of a high-speed image-reading-section 333.

This construction is practically the same as that of FIG. 37, the difference being that there is no orthogonal-transform-processing-section 337, and the input to the section-of-reading-information-for-a-block 350 is changed from being the n×n block orthogonal transform coefficient matrix to being directly from the n×n block image 335. Consequently the description hereunder is only of the section-of-reading-information-for-a-block 350. In this case the function of the section-for-computing coefficient-to-be-processed 23 in FIG. 3 is included in the section-of-reading-information-for-a-block 350 in FIG. 40.

Figure 41:
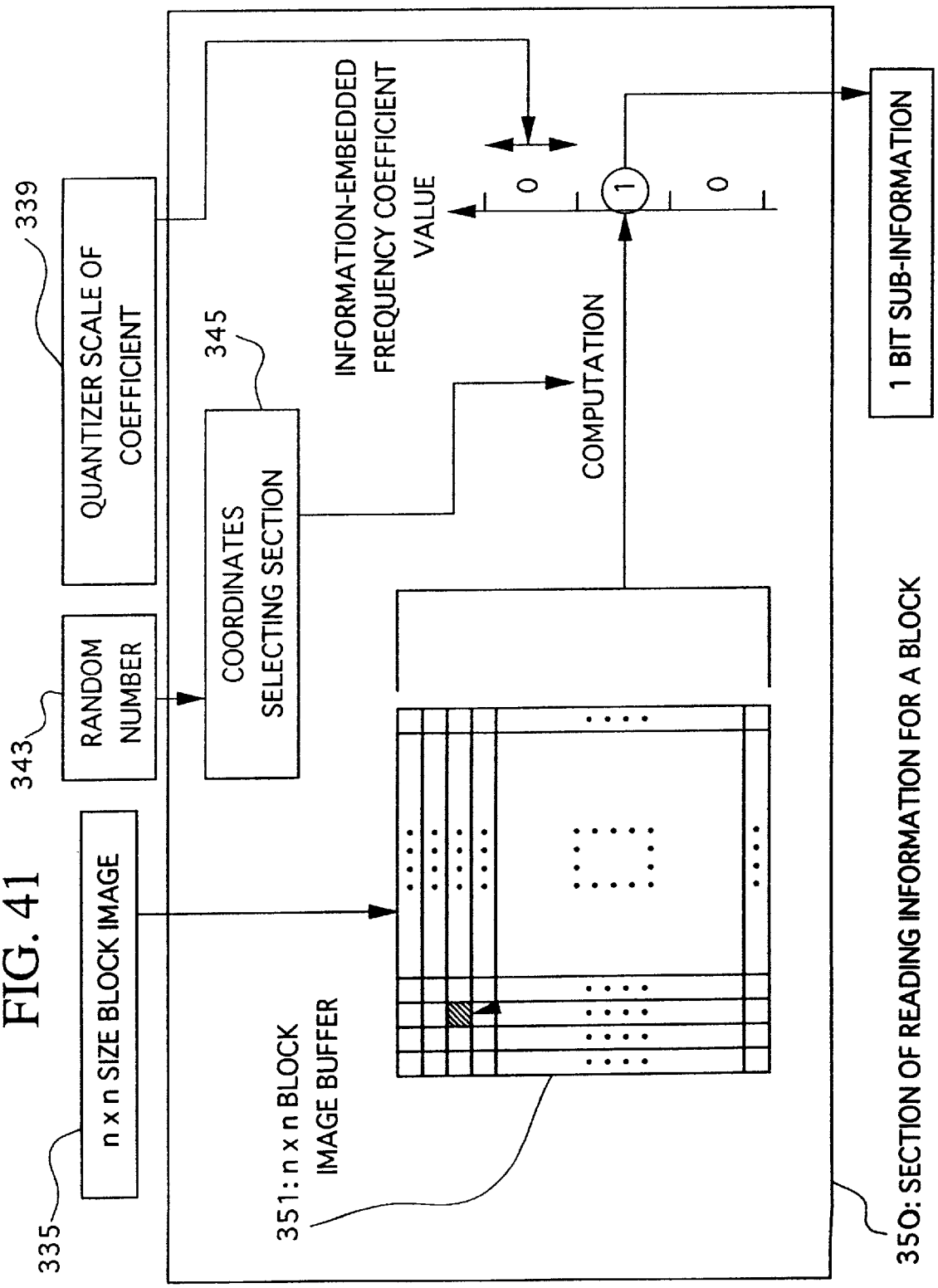
FIG. 41 is a conceptual diagram of a high-speed section-of-reading-information-for-a-block.

FIG. 41 shows a conceptual diagram of a schematic structure and processing of the high speed section-of-reading-information-for-a-block 350. The information read processing itself is the same as the operation for the previous section-of-reading-information-for-a-block 341. The only different part is that the input n×n block image 335 is stored in an n×n block image buffer 351, and the image value for this block image is used to compute only the orthogonal transform coefficient matching the coordinates selected by the coordinates-selecting-section 345. The method such as where the 1 bit sub-information is read by computing the coefficient value is the same.

Embodiments of the present invention have been described above, however regarding the sub-information of the j bit portion embedded in the respective n×n block images in the present invention, when the number is a certain quantity, then by using one part thereof as a watermark-information discriminating label, it is possible to also obtain reliability of the read information. For example, the label information is made $a_0 a_1 \ldots a_{k-1}$ (the 1 (L) bit portion in bit number j of the sub-information to be embedded in the respective n×n block image is used as the label information), and information read performed, and the hamming distance between the obtained label information part and the original label information is made m (m<1). At this time, the reliability S of the sub-information of the remaining j−1 bit read simultaneous with the label information, can be computed from:

(i) when=0 S=1

(ii) when $m \leq \dfrac{1}{2}$    $S = 0$ (iii) at other times, $S = \dfrac{2^l - \sum_{k=0}^{2m} {}_l C_k}{2^l}$ By reconstructing the sub-information for the read bits which have been weighted, based on this equation, then the information read accuracy can be further improved.

Moreover, the presence of dishonest alteration of the motion picture being the main information can be detected by examining the label reading accuracy, and information reading is possible even with a picture which has one portion taken out, by initialization of the random number the initial value of which has been used.

Furthermore, the range used at the time of information embedding can be changed for each individual block by considering the characteristics of the block image. For example this may involve computing the entropy of the pixel value of the block image and changing the range depending on the computed value (the quantizer-scale-of-coefficient used for quantization is changed using the entropy). In this way, by devising the change frequency coefficient position in which the sub-information is embedded and the quantizer-scale-of-coefficient, then information embedding can be performed in a manner that cannot be perceived by a person. Furthermore, the strength can be controlled to counter degradation of the sub-information (watermark-information) due to degradation of the primary information (picture). Moreover, if there is no key information used at the time of information embedding, it is not possible to take out the sub-information.

By using the method and apparatus of the present invention, then for example by using this in a copyright protection system, the quality of the digital information contents can be improved over the conventional system. Furthermore with the strengthening of the copyright protection counter measures, it becomes possible to raise the borderline between the quality of the watermark-information and the rate of continuation of the watermark-information, which are in a relation of trade-off being a difficult subject. That is to say, since information embedding is performed in a way that is unlikely to be influenced by quantization, by using recently used image compression techniques, and information embedding is performed by orthogonal transforming at a block size larger than the block size used in information compression, then influence on the picture (image quality degradation) can be suppressed. Moreover, when the picture is resolved into an n×n size, the high speed orthogonal transform algorithm can be made appropriate by making n an exponent of 2, so that it is also possible to read sub-information during regeneration of the motion picture.

With the present embodiment, only the luminance component when the image is YUV format has been considered.

However the present invention can also be applied to where the equivalent algorithm is a coloring component. Moreover, this is the same for where the image format is RGB, and the equivalent algorithm can be applied to the respective R, G, B components. If these methods are applied, it is possible to embed an even larger amount of information. Moreover, by making the information for embedding in the respective components the same, then this can also be used in detecting the presence of dishonest alteration of the picture and the embedding information.

Fourth Embodiment

With this embodiment, a description is given of the information embedding which also includes the methods differing from the above embodiments. Moreover, in the reading of the embedded information, a description is also given of a method using the original picture.

The fourth embodiment will now be described with reference to the accompanying drawings.

First is a discussion of the processing for embedding information in pictures. FIG. 42 is a schematic diagram of the input/output relationship of an information-embedding-apparatus 401 of this embodiment. The information-embedding-apparatus 401 takes the input of original-motion-picture (primary information) 402 of a digital motion picture, and parameters-of-embedding-information 403, and outputs information-embedded-motion-picture 404. The parameters-of-embedding-information 403 comprise the initial-value-of-a-random-sequence, the quantizer-scale-of-coefficient, and information to be embedded (sub-information). Comparing FIG. 1 and FIG. 42, the information-embedding-apparatus 1, the original-data 2, the watermark-information 4, the key-of-embedding-information 3 and the embedded-data 5 in FIG. 1 correspond to the information-embedding-apparatus 401, the original-motion-picture 402, the sub-information in the parameters-of-embedding-information 403, the parameters-of-embedding-information 403 excluding the sub-information, and the information-embedded-motion-picture 404 in FIG. 42, respectively. Moreover, the initial-value-of-a-random-sequence 31 and the quantizer-scale-of-coefficient 32 in FIG. 1 correspond to the initial-value-of-a-random-sequence and the quantizer-scale-of-coefficient in the parameters-of-embedding-information 403 in FIG. 43, respectively.

FIG. 43 is a diagram showing the overall structure of the information-embedding-apparatus 401. The information-embedding-apparatus 401 comprises an image-dividing-section 405, an information-embedding-section 406, and an image-reconstructing-section 407. The correspondence between FIG. 1 and FIG. 43 is as follows. The blocking-section 11 in FIG. 1 corresponds to the image-dividing-section 405 in FIG. 43, and the functions of the orthogonal-transform-section 12, the embedding-coefficient-selecting-section 13 and the information-embedding-section 14 in FIG. 1 are included in the information-embedding-section 406. Furthermore, the function of the inverse-orthogonal-transform-section 15 in FIG. 1 is realized by a part of the function of the information-embedding-section 406 and by the image-reconstructing-section 407. As follows is a sequential description of the respective processing sections.

(Image-dividing-section 405)

Figure 44:
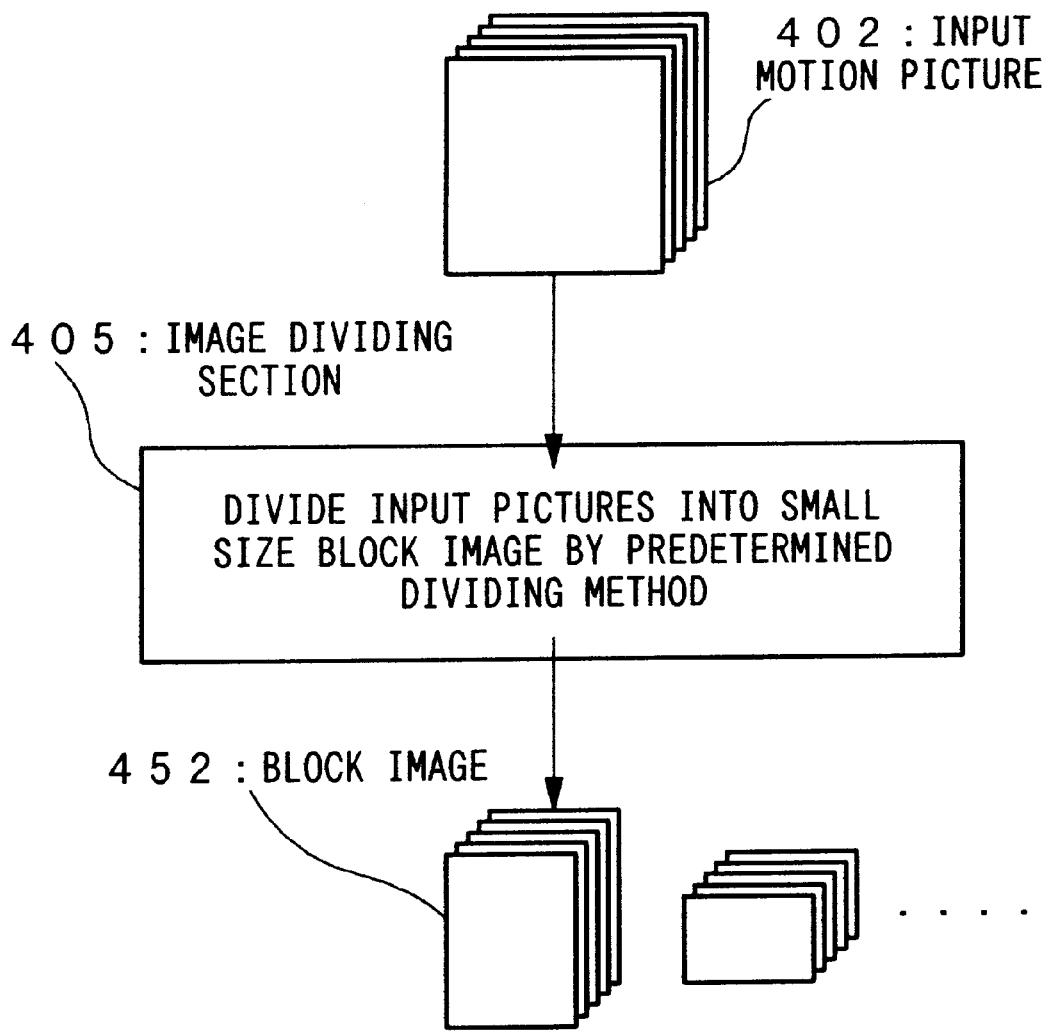
FIG. 44 is a conceptual diagram of an image-dividing-section.

FIG. 44 is a conceptual diagram of the image-dividing-section 405. The image-dividing-section 405 resolves the input original-motion-picture (motion pictures) 402 into block images 452, by a previously determined resolving method, and sequentially sends these to the information-embedding-section 406. Here the previously determined resolving method is for example a method which makes the size of the original picture M×N, and a time space image M×N×T where a fixed time interval is made T, is resolved into w optional size rectangular blocks, block$_0$ (size M$_0$×N$_0$×T$_0$), block$_1$ (size M$_1$×N$_1$×T$_1$), . . . block$_w$ (size M$_{w-1}$×N$_{w-1}$×T$_{w-1}$). The respective blocks do not have common parts, and the sum aggregate of the respective blocks becomes an M×N×T size time space image.

(Information-embedding-section 406)

Figure 45:
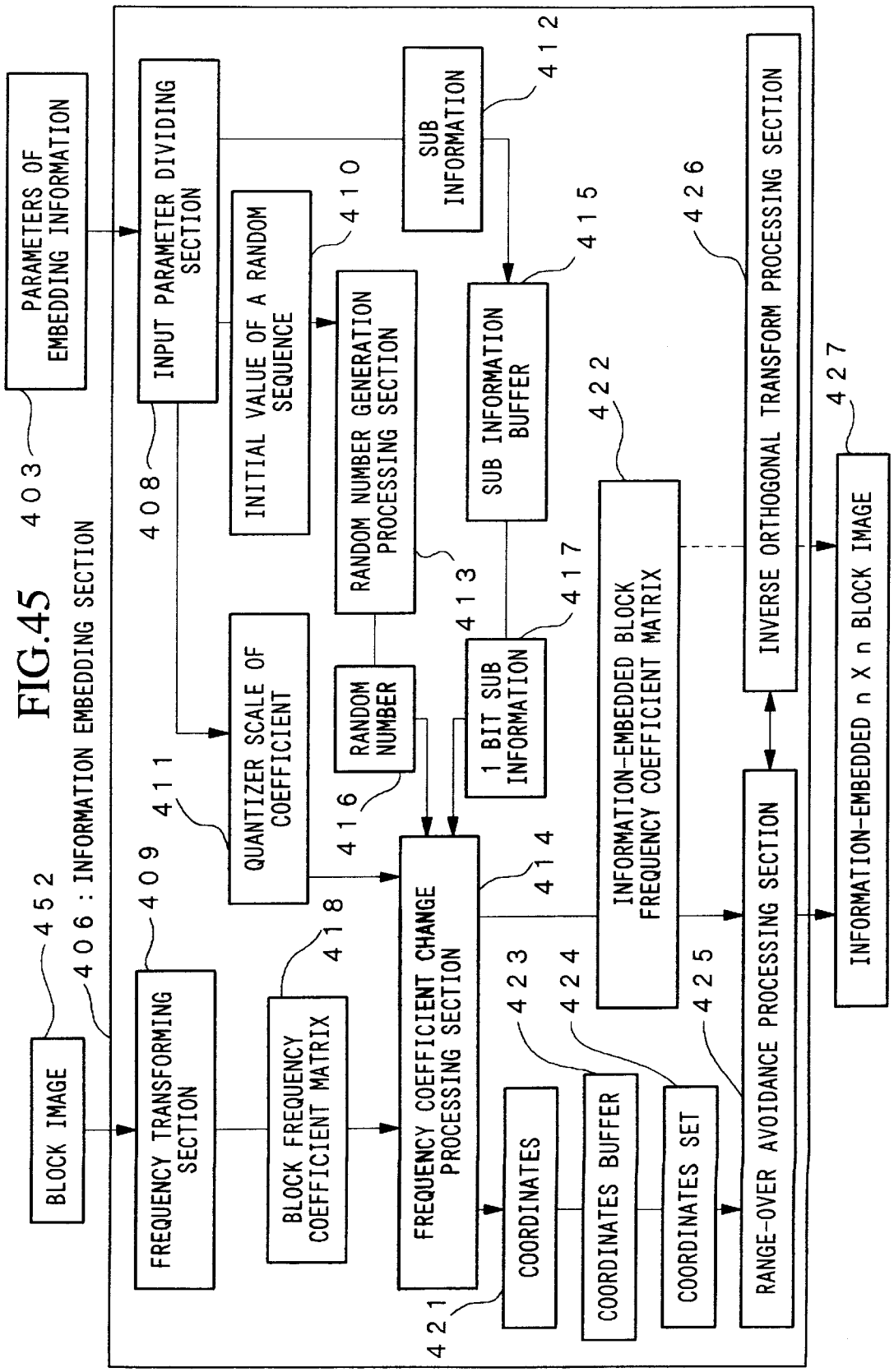
FIG. 45 is a detailed structure diagram of an information-embedding-section.

FIG. 45 shows a detailed structure diagram of the information-embedding-section 406. The information-embedding-section 406 takes the input of the parameters-of-embedding-information 403 and the Mu×Nu×Tu ($0 \leq u \leq w-1$) size block images 452 (block), and outputs an Mu×Nu×Tu size block-images-of-information-embedded 427 which is sent to the image-reconstructing-section 407. Comparing FIG. 45 and FIG. 1, the orthogonal-transform-section 12 in FIG. 1 corresponds to a frequency-transforming-section 409 in FIG. 45, and the function of the embedding-coefficient-selecting-section 13 in FIG. 1 corresponds to a random-number-generation-processing-section 413 and a part of the function of a frequency-coefficient-change-processing-section 414 in FIG. 45. Moreover the function of the information-embedding-section 14 in FIG. 1 is included in the frequency-coefficient-change-processing-section 414 in FIG. 45. Furthermore, a part of the function of the inverse-orthogonal-transform-section 15 in FIG. 1 corresponds to a section-of-inverse-frequency-transforming 426 and a range-over-avoidance-processing-section 425 in FIG. 45. The operation of the information-embedding-section 406 will now be described with reference to FIG. 45.

The parameters-of-embedding-information 403 are sent to an input-parameter-dividing-section 408, while the block images 452 are sent to the frequency-transforming-section 409.

The input-parameter-dividing-section 408 resolves the input parameters-of-embedding-information 403 and respectively recreates; an initial-value-of-a-random-sequence 410, a quantizer-scale-of-coefficient 411, and sub-information 412, and outputs these. The initial-value-of-a-random-sequence 410 is sent to the random-number-generation-processing-section 413, the quantizer-scale-of-coefficient 411 is sent to the frequency-coefficient-change-processing-section 414, and the sub-information 412 is sent to a sub-information buffer 415.

Figure 46:
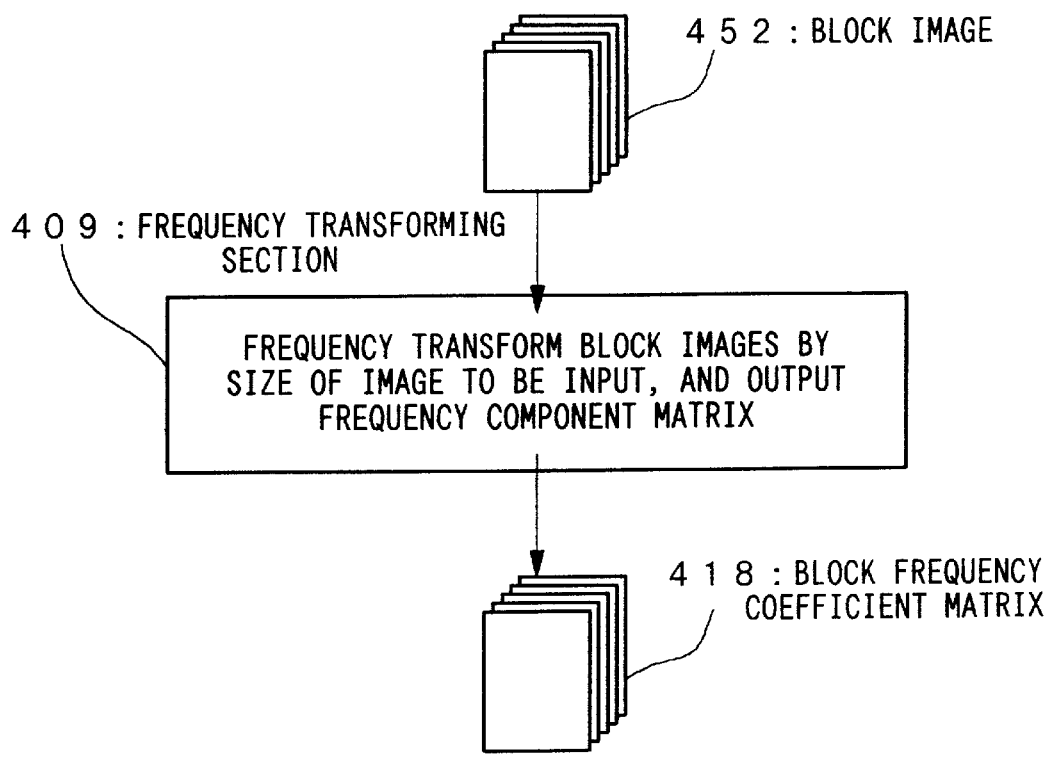
FIG. 46 is a conceptual diagram of a frequency-transforming-section.

The frequency-transforming-section 409, performs an Mu×Nu×Tu frequency transform on the input Mu×Nu×Tu size block image 452, and outputs an Mu×Nu×Tu size block-coefficient-matrix 418, and sends this to the frequency-coefficient-change-processing-section 414. FIG. 46 shows a conceptual diagram of the frequency-transforming-section 409. Since frequency transforming processing itself is common knowledge, details of this are omitted.

The random-number-generation-processing-section 413 reads the initial-value-of-a-random-sequence 410, and based on this, successively creates and outputs a random number 416 for each processing of the respective 1 bit information embedding. Here the random-number-generation-processing-section 413 generates random numbers 416 at intervals which are sufficiently large compared to the image block size. The random numbers 416 are then sent to the frequency-coefficient-change-processing-section 414.

Figure 47:
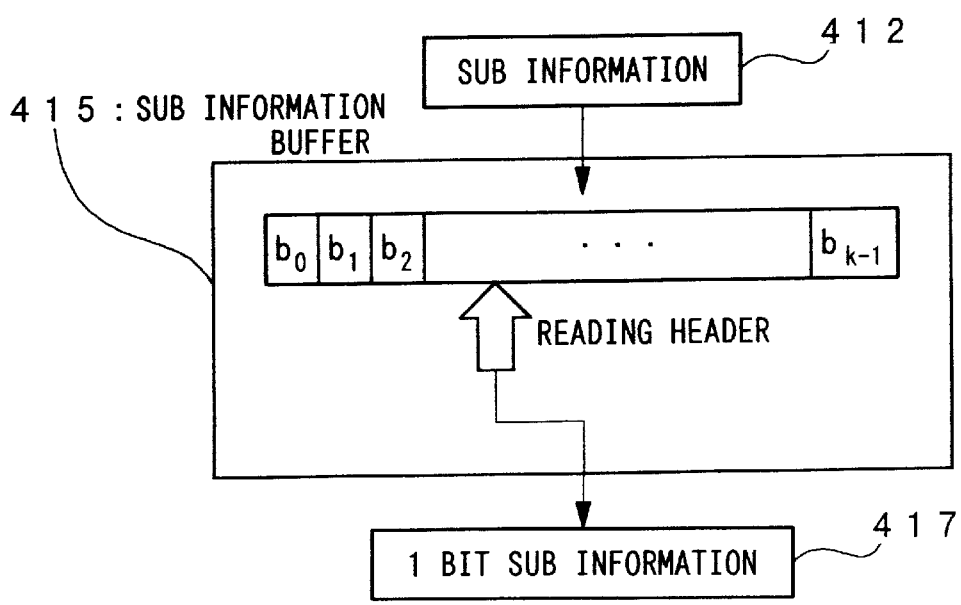
FIG. 47 is a schematic diagram of a sub-information-buffer.

The sub-information buffer 415 stores the sub-information 412 in an internal buffer, and reads out information one bit at a time by means of an internal information readout header, and outputs 1 bit sub-information 417, and sends this to the frequency-coefficient-change-processing-section 414. FIG. 47 shows a conceptual diagram of the sub-information buffer is 415.

For the control method of the information read/write header inside the sub-information buffer, various methods can be considered such as a method which is activated for each processing of the respective 1 bit information embedding and reading, or a method which is activated for each processing of the information embedding to and reading from the respective block images. However these depend on the packaging system for the information embedding apparatus. With the control method for the header which performs information read out/writing of the sub-information buffer, packaging must be carried out with the same method in the information embedding apparatus and in an information reading apparatus to be described later.

The frequency-coefficient-change-processing-section 414 takes the input of the Mu×Nu×Tu size block-coefficient-matrix 418, the random number 416, the 1 bit sub-information 417, and the quantizer-scale-of-coefficient 411, and changes the frequency coefficients of the Mu×Nu×Tu optional coordinates, and outputs coordinates 421 and an information-embedded block coefficient matrix 422.

Figure 48:
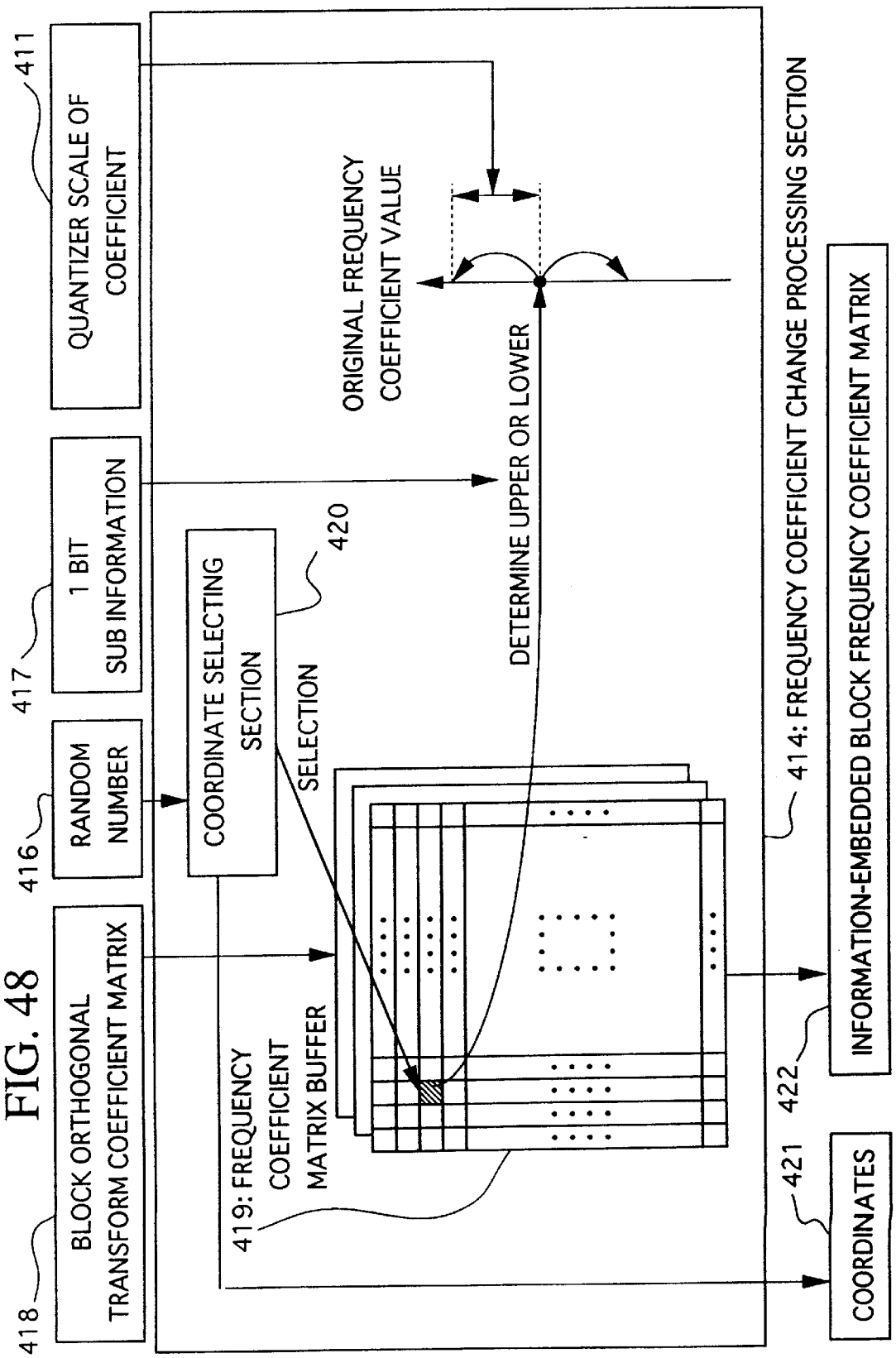
FIG. 48 is a conceptual diagram of a frequency-coefficient-change-processing-section.

FIG. 48 is a conceptual diagram showing an outline structure and the processing of the frequency-coefficient-change-processing-section 414. A coordinate-selecting-section 420 in FIG. 48 realizes a part of the function of the embedding-coefficient-selecting-section 13 in FIG. 1.

Figure 49:
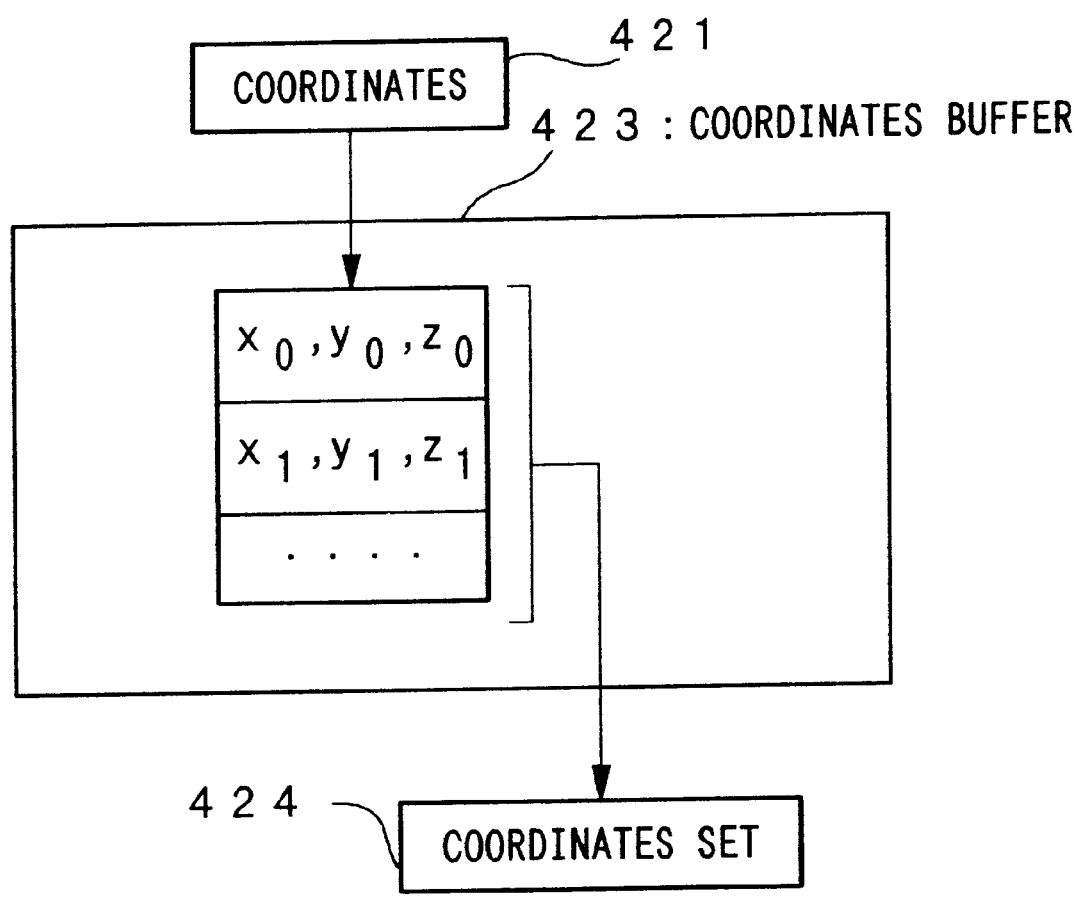
FIG. 49 is a schematic diagram of a coordinates-buffer.

The Mu×Nu×Tu size block-coefficient-matrix 418 is stored in a coefficient-matrix-buffer 419. The random number 416 is input to the coordinate-selecting-section 420. The coordinate-selecting-section 420 selects one coefficient from the Mu×Nu×Tu coefficient matrix using the random number 416, so that there is no conflict in the coefficient matrix, and outputs corresponding coordinates 421. The output coordinates 421 are all saved in a coordinates-buffer 423 as shown in FIG. 49 for each block embedding processing, and after the respective block embedding processing, are output as a coordinates-set 424.

The frequency-coefficient-change-processing-section 414 information embeds the 1 bit sub-information 417 in the frequency component (coefficient) corresponding to the coordinate 421 using the quantizer-scale-of-coefficient 411. The information embedding processing is performed $n_u$ times (where $n_u$ is the number of embedded information in a block, an integer of 1 or more, and may be a different number for each block. It is also necessary for the information reading device to package with the same method) on one block of the Mu×Nu×Tu size coefficient matrix. After all have been done, the information-embedded Mu×Nu×Tu size block coefficient matrix 422 is output.

Next is a more specific description of the processing for embedding j ($0 \leq j \leq n_u$) individual bit information in the u-th block picture "block" of the i-th M×N×T size time space picture of the input original-motion-picture 402. Provided that the quantizer-scale-of-coefficient is made "range", and the sub-information 412 for embedding is made $b_o b_1 \ldots b_{k-1}$ (where the bit length is k, $b_j \in \{0, 1\}$, $0 \leq j \leq k-1$).

With the frequency coefficient-change-processing-section 414, the frequency coefficient value $c_{i, u, j}$ of the coordinates selected by the coordinate-selecting-section 420 are changed; in the case where the bit information to be embedded is 1, to $C_{i, u, j}$+range, and in the case where bit information to be embedded is 0, to $C_{i, u, j}$−range, to thereby embed the 1 bit sub-information 417 (FIG. 48). Now since the information is embedded by addition or subtraction of the value for range, then even if the addition or subtraction is reversed, the same results can be gotten.

As an embedding method so that information reading is possible irrespective of the presence of the original picture, it has also been considered to change the frequency coefficient value $c_{i, u, j}$ of the coordinates selected by the coordinate-selecting-section 420 according to the following equations:

$$\left\lfloor \frac{c_{i,u,j}}{\text{range}} + \frac{1}{2} \right\rfloor \times \text{range}$$

where the bit information to be embedded is 1

$$\left\lfloor \frac{c_{i,u,j}}{\text{range}} + \frac{1}{2} \right\rfloor \bmod 2 \text{ is 1 and the value of}$$

$$\left\lfloor \frac{c_{i,u,j}}{\text{range}} + \frac{1}{2} \right\rfloor \times \text{range is greater than } c_{i,u,j}$$

$$\left( \left\lfloor \frac{c_{i,u,j}}{\text{range}} + \frac{1}{2} \right\rfloor + 2 \right) \times \text{range}$$

where the bit information to be embedded is 1

$$\left\lfloor \frac{c_{i,u,j}}{\text{range}} + \frac{1}{2} \right\rfloor \bmod 2 \text{ is 1 and the value of}$$

$$\left\lfloor \frac{c_{i,u,j}}{\text{range}} + \frac{1}{2} \right\rfloor \times \text{range is smaller than } c_{i,u,j}$$

$$\left( \left\lfloor \frac{c_{i,u,j}}{\text{range}} + \frac{1}{2} \right\rfloor + 1 \right) \times \text{range}$$

where the bit information to be embedded is 1 and $$\left\lfloor \frac{c_{i,u,j}}{\text{range}} + \frac{1}{2} \right\rfloor \bmod 2 \text{ is 0}$$

$$\left( \left\lfloor \frac{c_{i,u,j}}{\text{range}} + \frac{1}{2} \right\rfloor - 1 \right) \times \text{range}$$

where the bit information to be embedded is 0 and $$\left\lfloor \frac{c_{i,u,j}}{\text{range}} + \frac{1}{2} \right\rfloor \bmod 2 \text{ is 1}$$

$$\left\lfloor \frac{c_{i,u,j}}{\text{range}} + \frac{1}{2} \right\rfloor \times \text{range}$$

where the bit information to be embedded is 0

$$\left\lfloor \frac{c_{i,u,j}}{\text{range}} + \frac{1}{2} \right\rfloor \bmod 2 \text{ is 0 and the value of}$$

$$\left\lfloor \frac{c_{i,u,j}}{\text{range}} + \frac{1}{2} \right\rfloor \times \text{range is smaller than } c_{i,u,j}$$

$$\left( \left\lfloor \frac{c_{i,u,j}}{\text{range}} + \frac{1}{2} \right\rfloor - 2 \right) \times \text{range}$$

where the bit information to be embedded is 0

$$\left\lfloor \frac{c_{i,u,j}}{\text{range}} + \frac{1}{2} \right\rfloor \bmod 2 \text{ is 0 and the value of}$$

-continued $$\left\lfloor \frac{c_{i,u,j}}{\text{range}} + \frac{1}{2} \right\rfloor \times \text{range is greater than } c_{i,u,j}$$

where in the equations $\lfloor X \rfloor$ indicates a maximum integer not exceeding x, and x mod y indicates the remainder after dividing x by y. These definitions are common for all embodiments.

In this way, a quantization value which is larger or smaller than the frequency coefficient which becomes the information embedding object, is selected in accordance with the rule that; information embedding is dependant on the embedding bit value.

Now in the frequency-coefficient-change-processing-section 414, the sub-information read out header of the sub-information buffer 415 is controlled by a previously determined method for each execution of the respective 1 bit information embedding. While this is happening, the coordinate of the coefficient which has been subjected to embedding, is sent to the coordinates-buffer 423 and stored therein.

In the above manner, by repetitive embedding processing of one block of the Mu×Nu×Tu size coefficient matrix $n_u$ times, $n_u$ being the bit number for embedding therein, then the embedding processing of one coefficient matrix is completed.

After the embedding processing, the coordinates-set 424 and the information-embedded block coefficient matrix 422 are sent to the range-over-avoidance-processing-section 425. With the range-over-avoidance-processing-section 425, in order to avoid poor reproduction of the information-embedded image, the block coefficient matrix 422 which has been subjected to information embedding is inverse frequency transformed by the section-of-inverse-frequency-transforming 426. The coordinates-set 424 is then referred to, and range-over avoidance processing is carried out on this block image which has been inverse frequency transformed.

Figure 50:
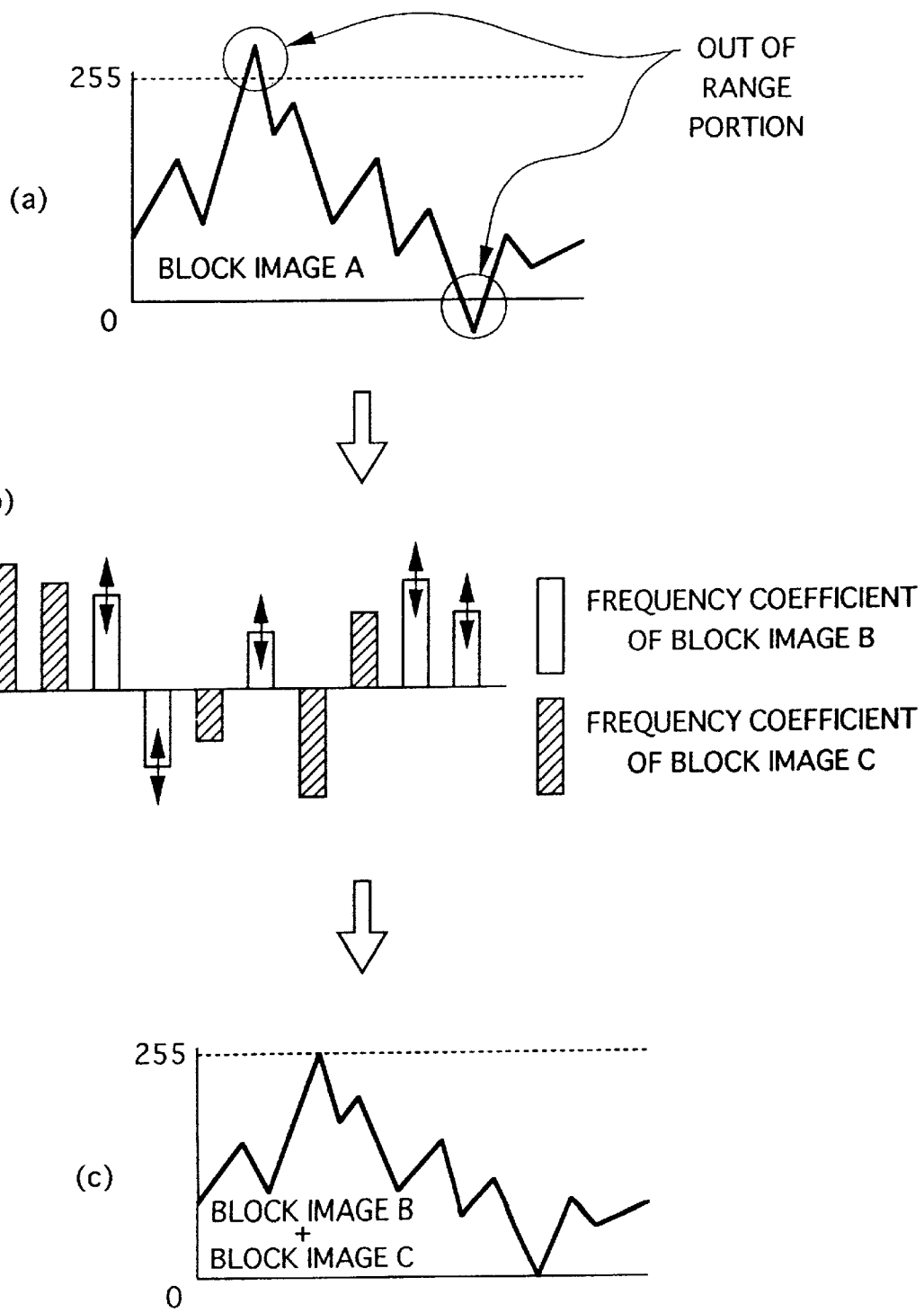
FIG. 50 is a diagram illustrating the processing of a range-over-avoidance-processing-section.

FIG. 50 shows a conceptual diagram of the processing for the range-over-avoidance-processing-section 425. In FIG. 50, an 8-bit gray scale image is assumed, with the domain of the pixel value (luminance value) made 0~255.

Figure 51:
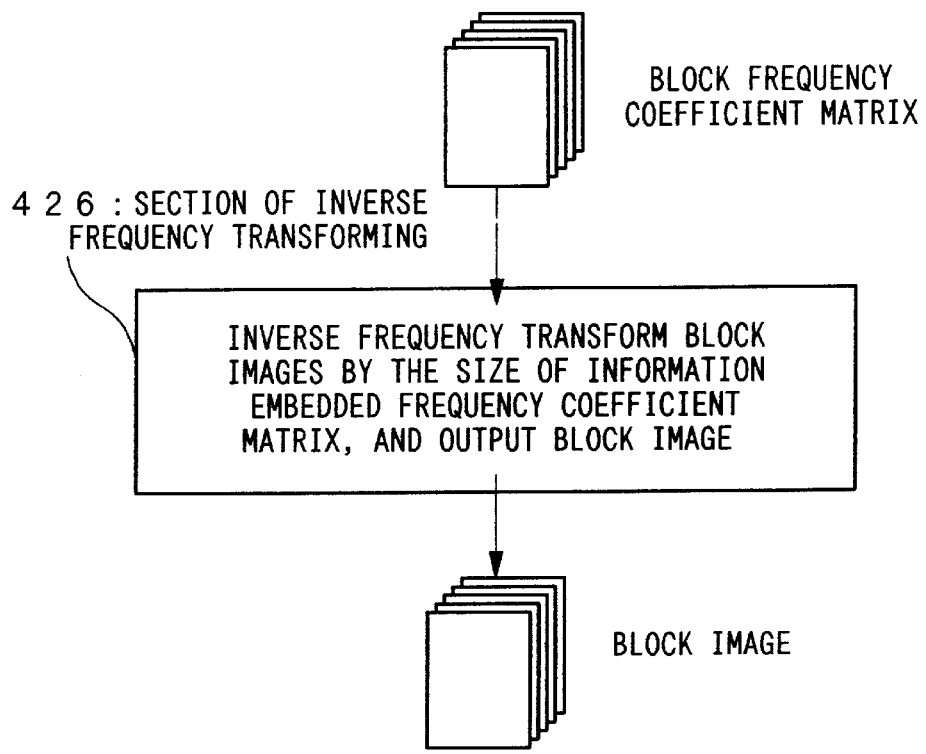
FIG. 51 is a conceptual diagram of a section-of-inverse-frequency-transforming.

The block image for which the coefficient matrix input to the range-over-avoidance-processing-section 425 has been inverse frequency transformed using the section-of-inverse-frequency-transforming 426, is designated as block image A. FIG. 50, (a) illustrates this, showing a case where for example, a out-of-range portion shown by the portion enclosed in a circle is produced. Here the section-of-inverse-frequency-transforming 426, as shown in FIG. 51 Mu×Nu× Tu inverse frequency transforms the Mu×Nu×Tu size block coefficient matrix and outputs Mu×Nu×Tu size block pictures.

With the coefficient matrix input to the range-over-avoidance-processing-section 425, then with one which is obtained by changing the DC component to the minimum value of the value which the DC value in the definition of the Mu×Nu×Tu frequency coefficient can take (for example assuming the frequency transform is a DCT (Discrete Cosine Transform), then in the block this value is −Lm× (Mu×Nu×Tu) (where Lm is the mean value of luminance)) and making all the values of the coefficients of the input coordinates-set 424 to 0, the Mu×Nu×Tu size block image which has been inverse frequency transformed using the section-of-inverse-frequency-transforming 426 is designated as block image B. Moreover with the other which is obtained by changing to 0 all the values other than all the coefficient values or the coordinates of the input coordinates-set 424 to which the DC component values are input, the Mu×Nu×Tu size block image which has been inverse frequency transformed using the section-of-inverse-frequency-transforming 426 is designated as block image C. FIG. 50(b) shows this.

With the range-over-avoidance-processing-section 425, as long as there is a pixel value larger than the maximum pixel value or smaller than the minimum pixel value in the image of the block image A, then an information embedded image 427 which has been subjected to range-over avoidance processing is obtained by reduction/expansion of the pixel values of the block image B such that the values of the pixel values corresponding to the block image B and the block image C are respectively settled at values between the minimum pixel value and the maximum pixel value of all the pixel values of the matching images. FIG. 50(c) shows this. The processing so that the value after inverse frequency transform as described above does not exceed the domain of the pixel values is carried out using the frequency coefficients.

However, in block C, when a pixel value smaller than the minimum pixel value and a pixel value larger than the maximum pixel value exist together, the above-mentioned range-over avoidance is not applicable. Therefore at the time of information embedding, the value of the range must not be made excessively large.

In the case where range-over processing is not carried out, it is not necessary to prepare the coordinates-buffer 423. Furthermore, in FIG. 45, the information-embedded block coefficient matrix 422 output from the frequency-coefficient-change-processing-section 414 is inverse frequency transformed by the section-of-inverse-frequency-transforming 426 as is, and the block-images-of-information-embedded 427 is output.

The information-embedding-section 406, performs the above-mentioned processing on all of the block images (block $_0$, bloc $_1$, ... block $k_{w-1}$), and successively sends the information-embedded block images 427 to the image-reconstructing-section 407.

(Image-reconstructing-section 407)

Figure 52:
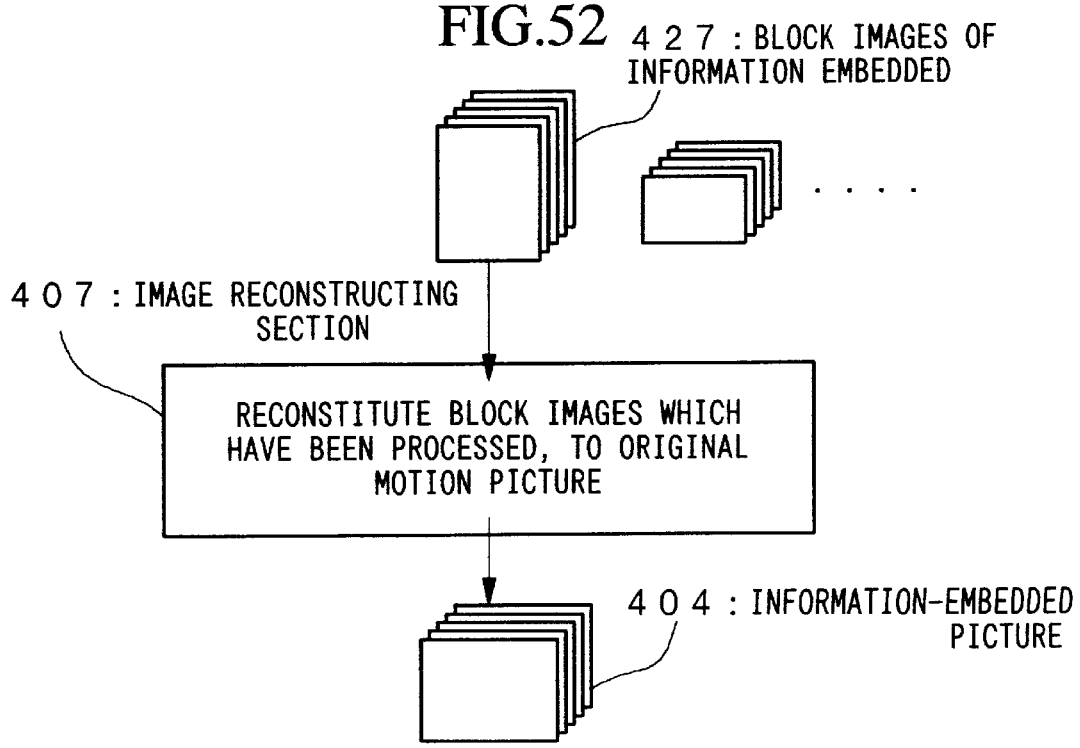
FIG. 52 is a conceptual diagram of an image-reconstructing-section.

FIG. 52 is a conceptual diagram of the image-reconstructing-section 407. The image-reconstructing-section 407 links together the input respective information-embedded block images 427, and restores these to the M×N×T time space images and the motion pictures, to thereby obtain the information-embedded-motion-picture 404.

Figure 53:
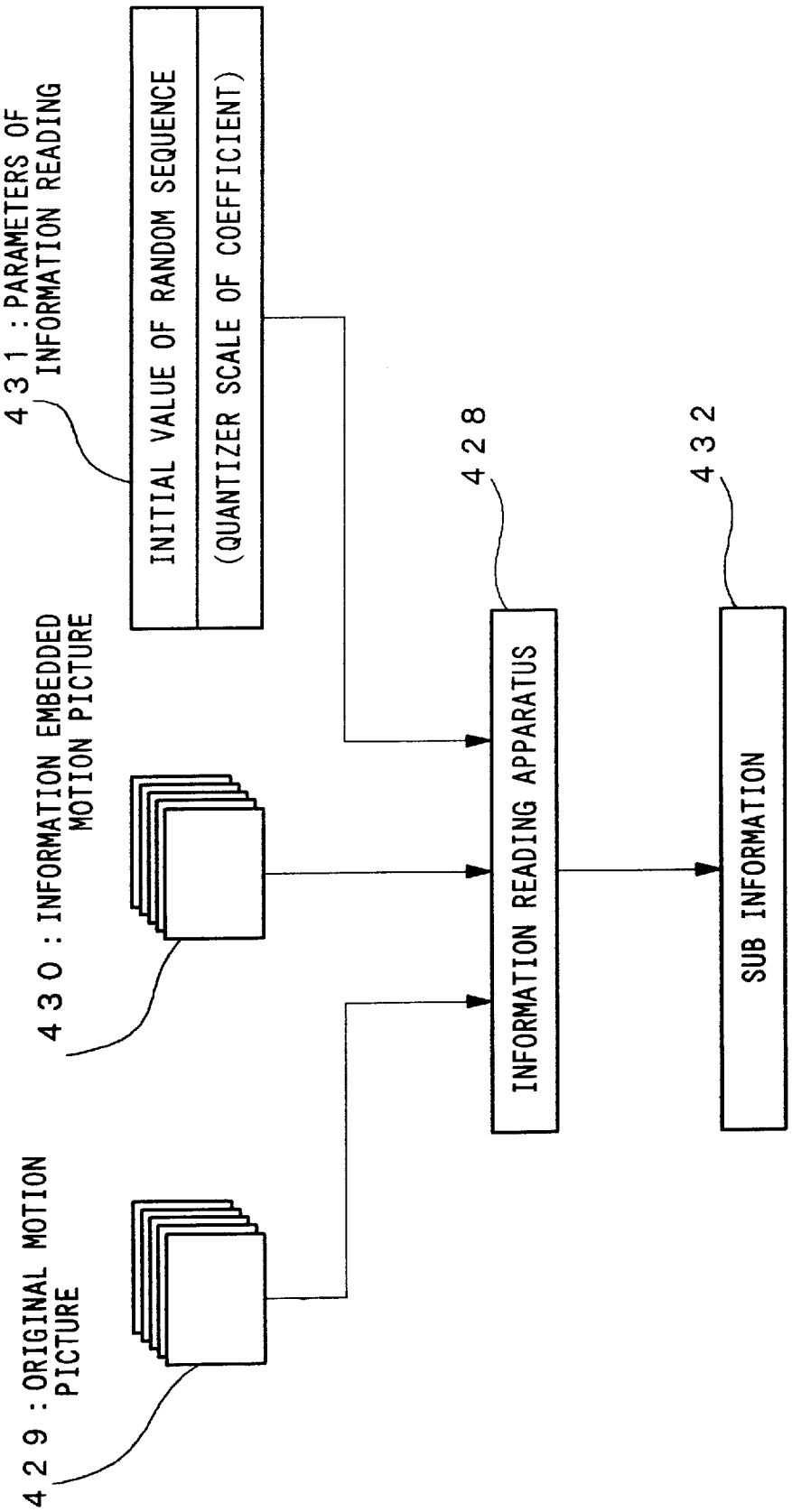
FIG. 53 is a schematic diagram showing the input/output relationship of an information-reading-apparatus according to the fourth embodiment.

Next is a description of the process for reading information from the information-embedded images. FIG. 53 is a conceptual diagram of the input and output relationship of an information-reading-apparatus 428 according to the present invention. The information-reading-apparatus 428 takes the input of original-motion-picture 429 (primary information), information-embedded pictures (primary information+sub-information) 430 and parameters-of-information-reading 431, and outputs sub-information 432 which has been embedded in the pictures 430. The parameters-of-information-reading 431 comprise the initial value of the random number of the information embedding key used at the time of creating the information-embedded-motion-picture 430, and the frequency component change width. Comparing FIG. 3 and FIG. 53, the information-reading-apparatus 6, the embedded-data 5, the key-of-embedding-information 3, and the watermark-information 4 in FIG. 3 correspond to the information-reading-apparatus 428, the information-embedded-motion-picture 430, the parameters-of-information-reading 431 and the sub-information 432 in FIG. 53, respectively. The original-motion-picture 429 in FIG. 53 corresponds to the original-data 2 in FIG. 1. Hereunder is a description of a method of reading information which has been embedded using the original-motion-picture 429.

Figure 54:
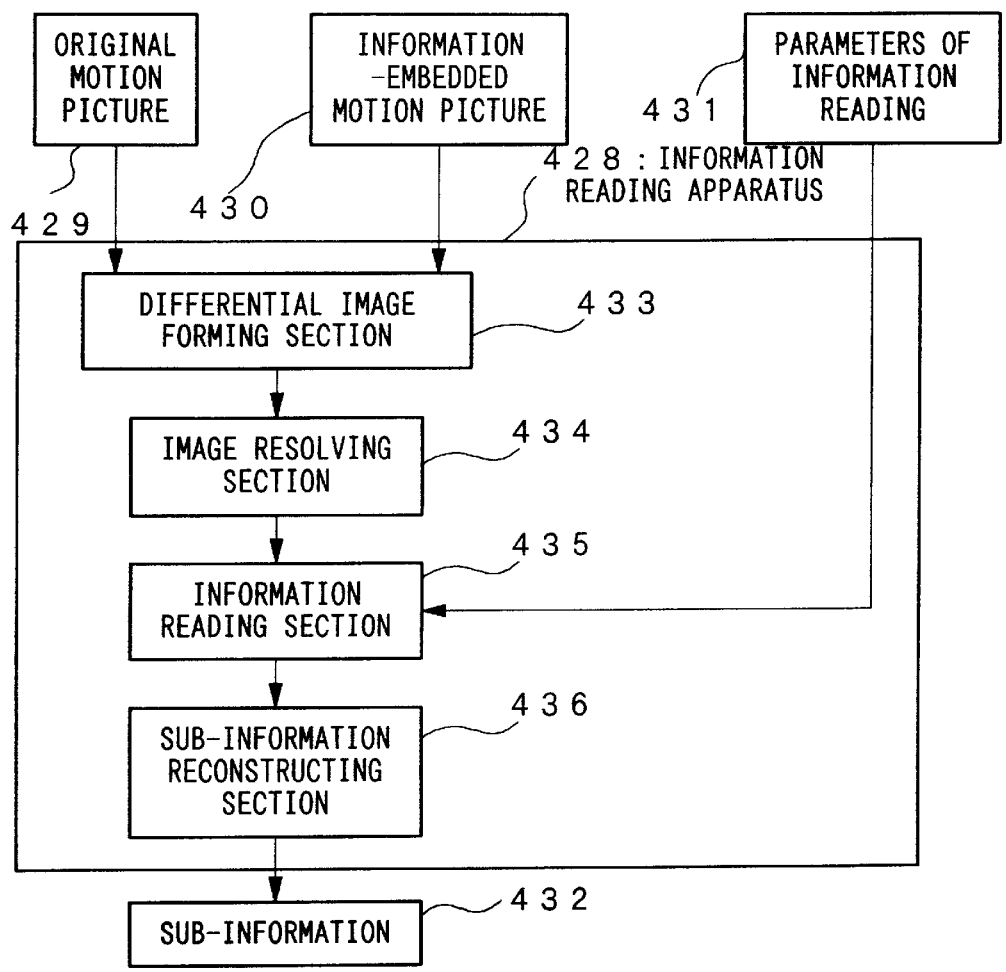
FIG. 54 is an overall structure diagram of one example of the information-reading-apparatus according to the fourth embodiment.

FIG. 54 is an overall structure diagram of one example of the information-reading-apparatus 428. The information-reading-apparatus 428 comprises a differential-image-forming-section 433, an image-resolving-section 434, an information-reading-section 435, and a sub-information-reconstructing-section 436. The blocking-section 21 in FIG. 3 corresponds to the image-resolving-section 434 in FIG. 54. Furthermore, the function of the embedding-coefficient-selecting-section 22 and the section-for-computing-coefficient-to-be-processed 23 in FIG. 3 is included in the information-reading-section 435 and the differential-image-forming-section 433 in FIG. 54. Moreover, the function of the information-reading-section 24 in FIG. 3 is divided into a part of the function of the information-reading-section 435, and the sub-information-reconstructing-section 436. In the case where information embedding is performed with only input of the information embedded image without using the original picture, then the differential-image-forming-section 433 is not required. As follows is a description of the respective processing sections.

(Differential-image-forming-section 433)

Figure 55:
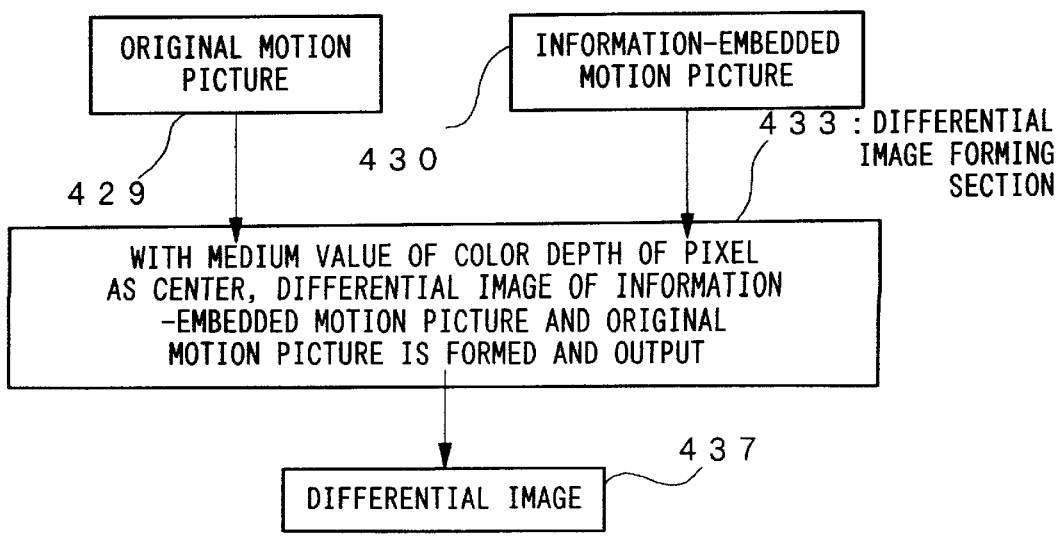
FIG. 55 is a conceptual diagram of a differential-image-forming-section.

FIG. 55 is a conceptual diagram of the differential-image-forming-section 433. The differential-image-forming-section 433 takes the input of the original-motion-picture 429 ($[p1_{x,y,z}]$) and the information-embedded-motion-picture 430 ($[p2_{x,y,z}]$), centralizes the central value (Lm) of the pixel value, and then outputs differential images 437 ($[p2_{x,y,z}-p1_{x,y,z}-Lm]$). In this way, the embedded information reading in the information-reading-section 435 is carried out using the differential value of the frequency coefficient which is the object of the information reading and the frequency coefficient of the corresponding position in the original image (the data prior to information embedding).

(Image-resolving-section 434)

Figure 56:
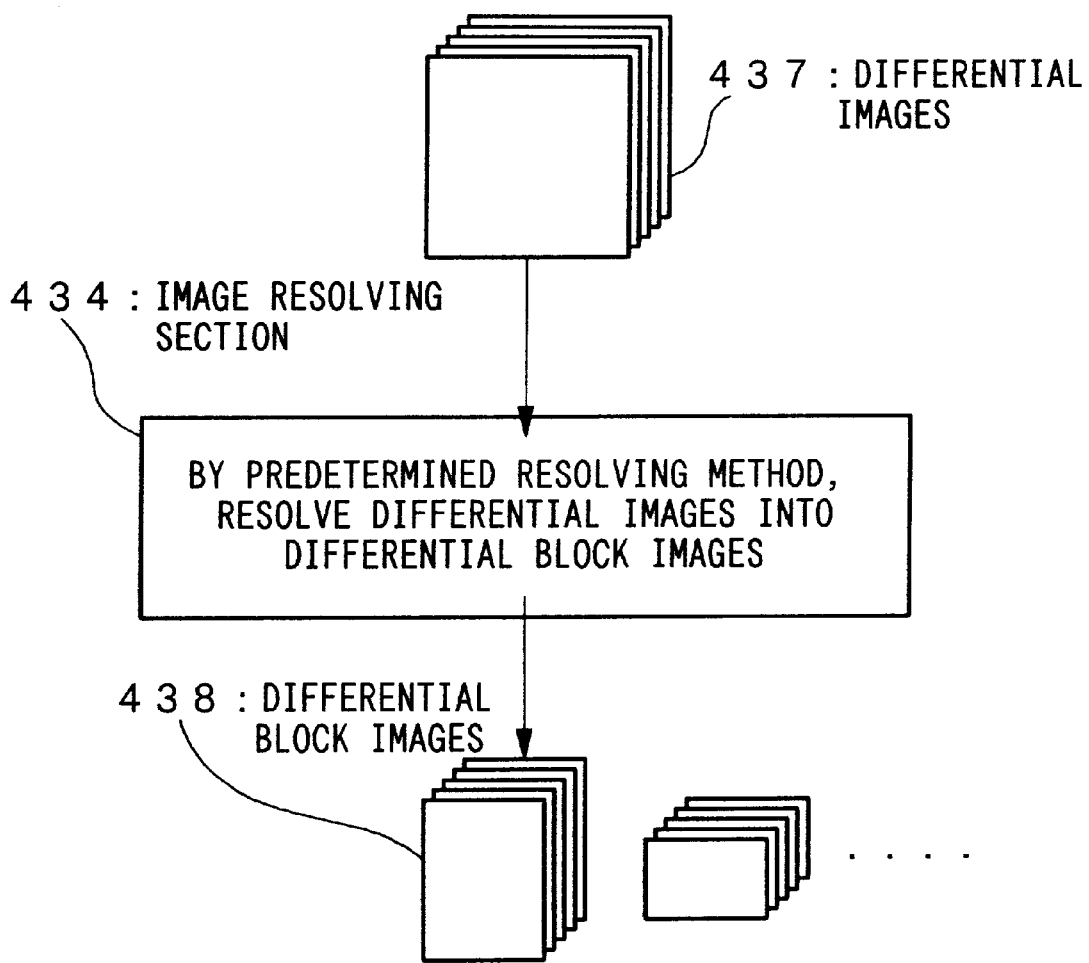
FIG. 56 is a conceptual diagram of an image-resolving-section.

FIG. 56 is a conceptual diagram of an image-resolving-section 434. The image-resolving-section 434 takes the input of the differential images 437, performs the same process of the image-dividing-section 405 used in the previous information-embedding-apparatus 401, and outputs differential-block-images 438 of size Mu×Nu×Tu ($0 \leq u \leq w-1$). Here the image-resolving-section 434 must resolve the image with the same method as a previously determined resolving method by which the image was packaged by the image-<dividing-section 405.

(Information-reading-section 435)

Figure 57:
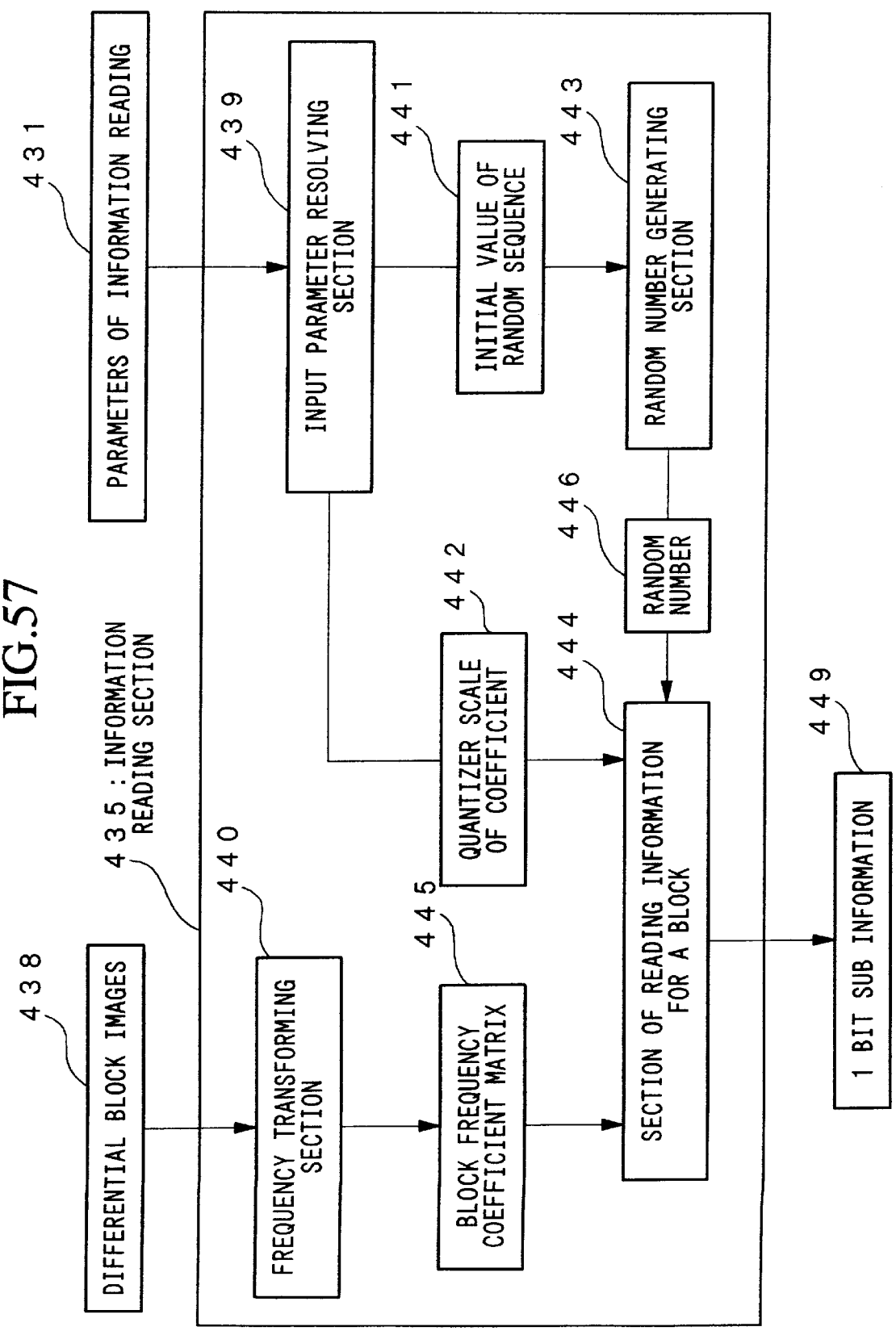
FIG. 57 is a detailed structure diagram of an information-reading-section.

FIG. 57 shows a detailed structure diagram of the information-reading-section 435. The information-reading-section 435 takes the input of the parameters-of-information-reading 431 and differential-block-images 438, and reads one bit at a time the sub-information from the respective block images, and successively sends this to the sub-information-reconstructing-section 436. Here the function of the embedding-coefficient-selecting-section 22 in FIG. 3 is realized by a part of the function of an section-of-reading-information-for-a-block 444 and by a random-number-generating-section 443, while the function of the section-for-computing-coefficient-to-be-processed 23 in FIG. 3 is realized by a frequency transform processing section 440. The operation of the information-reading-section 435 is detailed below.

The parameters-of-information-reading 431 are sent to an input-parameter-resolving-section 439, while the differential-block-images 438 are sent to the frequency transform processing section 440.

The input-parameter-resolving-section 439 resolves the parameters-of-information-reading 431 and reconstructs and outputs an initial-value-of-a-random-sequence 441 and a quantizer-scale-of-coefficient 442. The initial-value-of-a-random-sequence 441 is output to the random-number-generating-section 443, while the quantizer-scale-of-coefficient 442 is output to the information read processing section within a block 44.

In the case where the information processing is carried out using the original picture, then the parameters-of-information-reading 431 is the initial value of the random number only Hence in this case it is not necessary to prepare the input-parameter-resolving-section 439, and the initial value of the random number is sent directly to the random-number-generating-section 443.

The frequency transform processing section 440 performs the same process of the frequency transform processing section 409 used in the information-embedding-section 406 (refer to FIG. 46), and Mu×Nu×Tu frequency transforms the Mu×Nu×Tu size differential-block-images 438 and outputs a resultant Mu×Nu×Tu size block-coefficient-matrix 445 to the section-of-reading-information-for-a-block 444.

The random-number-generating-section 443 reads the initial-value-of-a-random-sequence 441, and based on this, successively creates and outputs a random number 446 for each processing of the respective 1 bit information reading. With the random-number-generating-section 443 and the random-number-generation-processing-section 413 used in the information-embedding-section 406, when the same initial value for the random number is input, then packaging is necessary so that the same random numbers are output in the same order.

The section-of-reading-information-for-a-block 444 takes the input of the Mu×Nu×Tu size block-coefficient-matrix 445, the random number 446, and the quantizer-scale-of-coefficient 442, and reads and outputs 1 bit sub-information 449. The block-coefficient-matrix 445 is stored in a coefficient-matrix-buffer 447.

Figure 58:
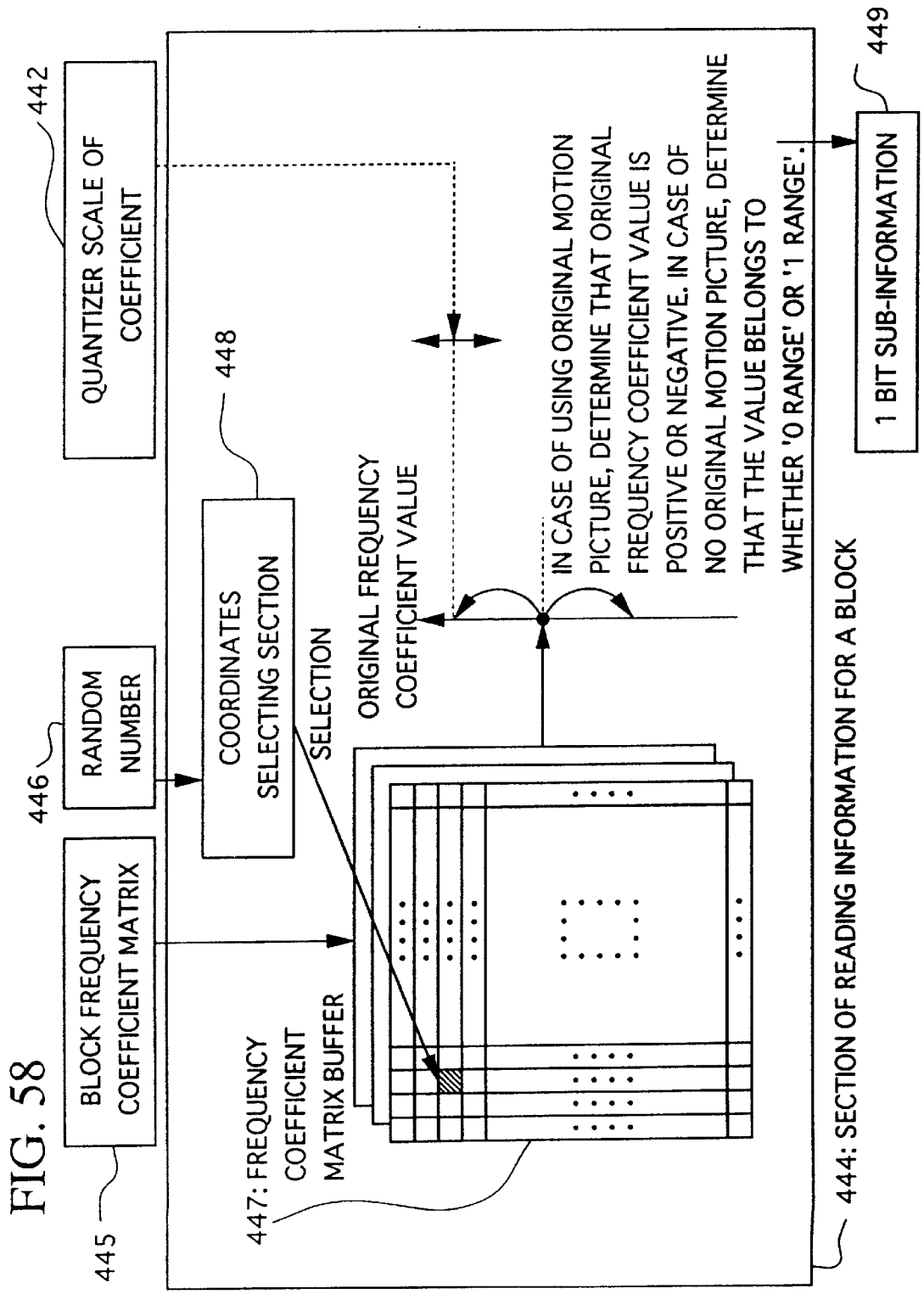
FIG. 58 is a conceptual diagram of a section-of-reading-information-for-a-block.

FIG. 58 shows a conceptual diagram of the outline structure and processing of the section-of-reading-information-for-a-block 444. The function of a part of the embedding-coefficient-selecting-section 22 in FIG. 3 is realized by a coordinates-selecting-section 448 in FIG. 58.

The Mu×Nu×Tu size block-coefficient-matrix 445 is stored in the coefficient-matrix-buffer 447. The random number 446 is input to the coordinates-selecting-section 448. The coordinates-selecting-section 448 carries out processing similar to that of the coordinate-selecting-section 420 used in the frequency-coefficient-change-processing-section 414. That is to say, with the coordinates-selecting-section 448 and the coordinate-selecting-section 420, when the same initial value for the random number is input, packaging is necessary so that the same coordinate is output.

The section-of-reading-information-for-a-block 444 judges the positive or negative of the coefficient corresponding to the coordinates selected by the coordinates-selecting-section 448 from the Mu×Nu×Tu size block-coefficient-matrix 445, to thereby read and output the 1 bit sub-information 449. The information read processing is performed $n_u$ times (where $n_u$ is the number of embedded information in a $block_u$ at the time of information embedding) on one block of the Mu×Nu×Tu size frequency transform matrix, and the embedded 1 bit sub-information is successively read.

Next is a more specific description of the processing for reading j ($0 \leq j \leq n_u$) individual bit information $b_{i,u,j} \in \{0,1\}$)

in the u-th block differential picture of the i-th M×N×T size time space picture of the differential images 437. Provided that the sub-information 432 being embedded in the 430 is made $b_o b_1 \ldots b_{k-1}$, and the quantizer-scale-of-coefficient 442 input to the section-of-reading-information-for-a-block 444 is made "range".

The section-of-reading-information-for-a-block 444 performs information reading with respect to the frequency coefficient values $C_{i,u,j}$ of the coordinates selected by the coordinates-selecting-section 448 by making:

$b_{i,u,j}$=1 when $C_{i,u,j}$ is positive and $b_{i,u,j}$=0 when $C_{i,u,j}$ is negative In this way, the embedded information reading in the information-reading-section 435 is effectively carried out using the differential value of the frequency coefficient which is the object of the information reading and the frequency coefficient of the corresponding position in the original image. Now the assignment of the {0, 1} corresponding to the positive or negative values is determined by the packaging system for the embedding processing.

Furthermore, in the case where an image is input which has been subjected to information embedding where information reading is possible irrespective of the presence of the original picture by means of the previous equations, then in the case where there is an original image, information reading can be performed with the above mentioned method. However in the case where there is no original image, information reading can be performed by directly inputting the information-embedded-motion-picture 430 to the image-resolving-section 434 without using the differential-image-forming-section 433 in FIG. 54, and resolving these into the block image, and then after carrying out processing to the block coefficient matrix with the frequency transform processing section 440, computing;

$$b_{i,u,j} = \left\lfloor \frac{c_{i,u,j}}{\text{range}} + \frac{1}{2} \right\rfloor \bmod 2$$

(Sub-information-reconstructing-section 436)

Figure 59:
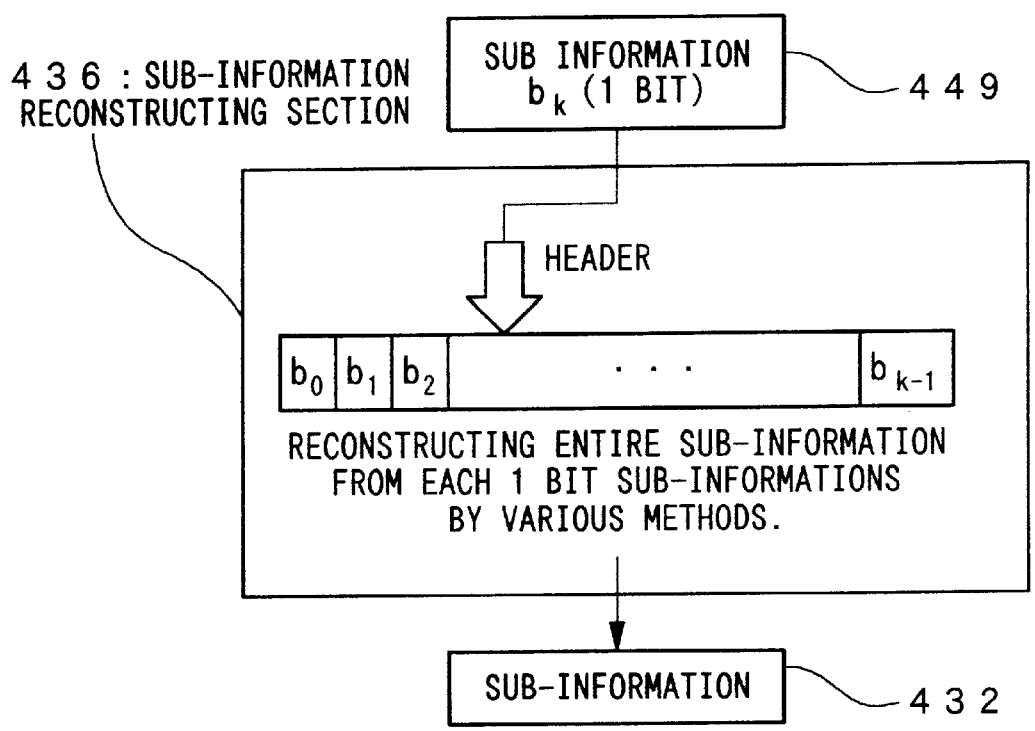
FIG. 59 is a conceptual diagram of a sub-information reconstructing-section.

FIG. 59 is a conceptual view of the processing of the sub-information-reconstructing-section 436. The sub-information-reconstructing-section 436 takes the input of the sub-information embedded in the block image successively 1 bit at a time, determines the respective sub-information bits input over several times using a technique such as majority vote processing, and increases the reading times of each bit of embedded sub-information in accordance with the information read processing times by the information-reading-section 435 which reconstructs the original sub-information. By carrying out error correction code processing such as majority vote processing on the respective bits of the repetitively read sub-information, then the reliability of the read sub-information can be improved.

The sub-information-reconstructing-section 436 controls the sub-information write header by a previously determined method each time a respective 1 bit of the sub-information is read. The sub-information reconstitution processing for one block of the coefficient matrix is completed by performing multiple processing, read processing repetitively with respect to one block of the coefficient matrix, n times being the number of bits embedded therein.

The above processing is performed for all of the block images (block$_0$, block$_1$, . . . , block$_{w-1}$), and each time the sub-information is reconstructed, or after the processing in all of the motion pictures is completed, then the sub-information 432 read from the pictures is output.

Next is a description of a method for improving the information read speed in the processing in the information-reading-apparatus 428. With the information-reading-section 435 in the information-reading-apparatus 428, as shown in FIG. 57, the differential-block-images 438 to be input are temporarily transformed to the block-coefficient-matrix 445 using the frequency-transforming-section 440. However, by not performing this transformation processing and directly computing from the block differential image only the frequency coefficient which has been subjected to information embedding, then the computation load can be reduced.

Figure 60:
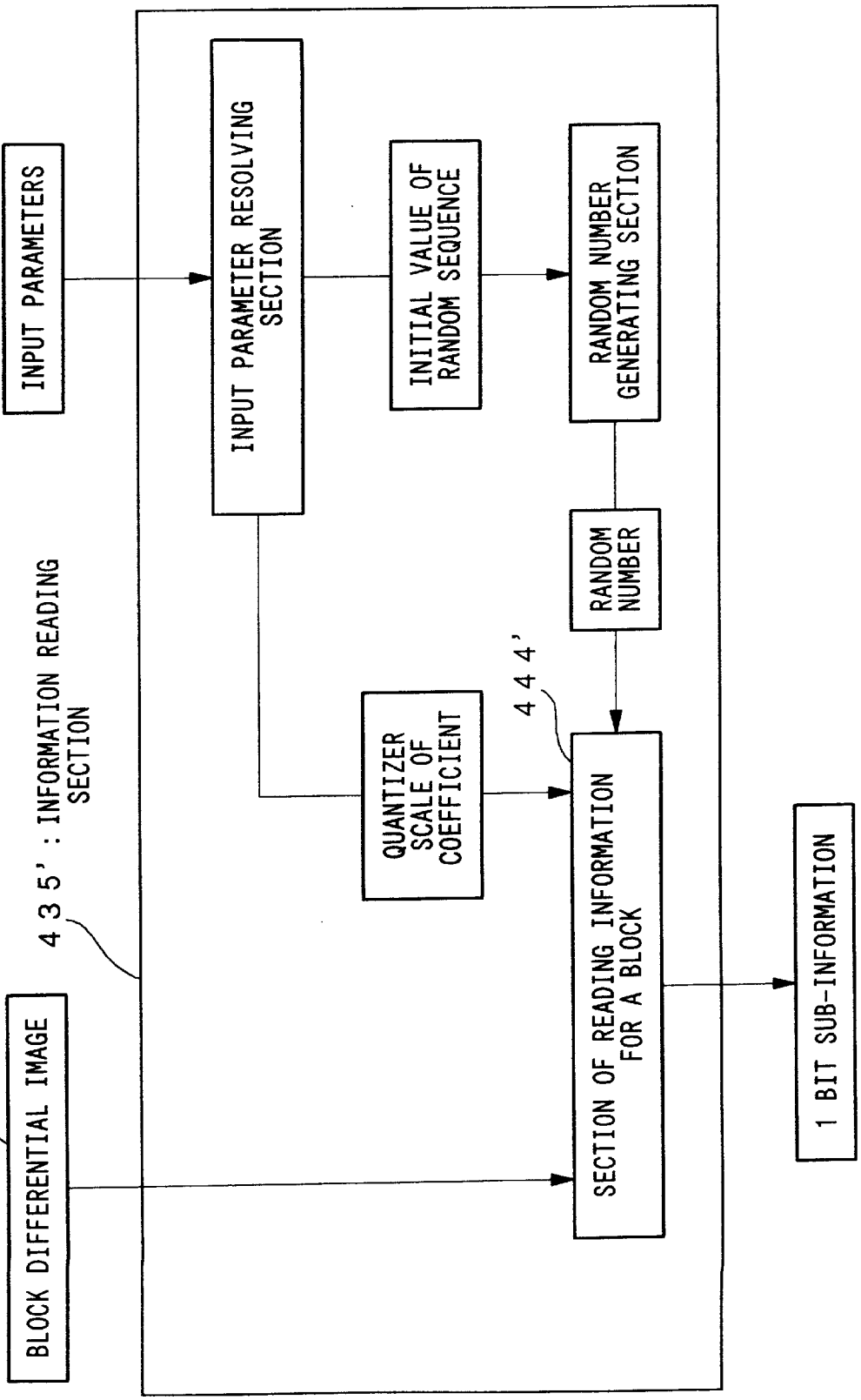
FIG. 60 is an other structure diagram of the information-reading-section.

FIG. 60 shows a structural diagram of a high-speed information-reading-section 435'. This construction is practically the same as that of the information-reading-section 435 in FIG. 57, the difference being that there is no frequency transform processing section 440, and the input to a section-of-reading-information-for-a-block 444' is changed from being the block-coefficient-matrix 445 to being the differential-block-images 438. In this case the function of the section-for-computing-coefficient-to-be-processed 23 in FIG. 3 is included in the section-of-reading-information-for-a-block 444' in FIG. 60. Furthermore, the information reading processing itself of the section-of-reading-information-for-a-block 444' is the same as the operation of the section-of-reading-information-for-a-block 444 explained with reference to FIG. 58. The only different part is that the differential-block-images 438 are stored in the image buffer and the pixel values of these block images are used to compute only the frequency coefficient matching the coordinates selected by the coordinate selection processing section. The method such as where the 1 bit sub-information is read by judging the code of the coefficient value is the same.

Embodiments of the present invention have been described above, however the following modifications and enlargements are possible.

(1) The range used at the time of information embedding can be changed for each individual block by observing the characteristics of the block image. For example, the entropy of the pixel value of the block image can be computed and the range then changed according to the resultant value (conversion of the value of the quantizer-scaleof-coefficient used for quantization, using the entropy).

(2) By error correction coding the sub-information to be embedded, then deterioration of the sub-information related to deterioration of the picture can be suppressed. For the error correction coding system, for example BCH coding or the like may be used. In this way, in the information reading apparatus, the reliability of the result of reading the embedded information can be improved.

(3) Apart from the sub-information of the bit portion for embedding in the respective block images, the watermark-information discriminating label may be information embedded in the same block image. In this way, it is possible to obtain reliability of the read information. For example the label information is made $a_0 a_1 \ldots a'_{-1}$, and information read is performed, and the hamming distance between the obtained label information part and the original label information is made m (m<2) (1 is L). At this time, the reliability S of the sub-information read simultaneous with the label information, can be computed as follows:

when hamming distance is 0, S=1

(ii) when $m \leq \frac{1}{2}$   $S = 0$ at other times, $$S = \frac{2^l - \sum_{k=0}^{2m} {}_lC_k}{2^l}$$

By reconstructing the sub-information for the read bits which have been weighted, based on these equations, then the information read accuracy can be further improved. Moreover, if the sub-information is that which has been subjected to error correcting coding, then the possibility of error correction can be judged from the reliability. Furthermore, the presence of dishonest alteration of the motion picture being the main information can be detected by examining the label reading accuracy, and information reading is possible even with a picture which has one portion taken out, by initialization of the random number, the initial value of which has been used.

(4) In FIG. 54, when the original-motion-picture 429 is used, then the differential image of the information-embedded-motion-picture 430 and the original-motion-picture 429 is at first formed by the differential-image-forming-section 433. This is preferable from the point of easing the processing load of the frequency conversion, and the processing of the embedded information reading, however, the arrangement is not limited to this. For example, at first in the image-resolving-section 434, the original-motion-picture 429 and the information-embedded-motion-picture 430 may be blocked so as to be the same, and then in the information-reading-section 435, the original-motion-picture 429 and the information-embedded-motion-picture 430 both frequency transformed based on the block. The differential of the corresponding frequency coefficients can then be taken and bit value determination carried out depending on the code.

With the invention of the present embodiment, as described above, there is for example the following effects: if there is no key information used at the time of information embedding, it is not possible to take out the sub-information; by devising the change frequency coefficient position in which the sub-information is embedded and the quantizer-scale-of-coefficient, then information embedding can be performed in a manner that cannot be perceived by a person, furthermore, the strength can be controlled to counter degradation of the sub-information (watermark-information) due to degradation of the primary information (picture); to the extent that there is no influence on each other, then a plurality of information can be embedded using an individual block size partitioning method; since with a still image, the size of the time axis direction of the motion picture is 1, then the technology is also applicable to still images; by using the error correcting code, then an appropriate robustness can be obtained with respect to compression and compilation of the picture; when the original picture is used in information reading, the reliability accuracy of the read information is improved.

The present invention can be applied not only where only the luminance component when the image is YUV format is made the object, but also to where the equivalent algorithm is a coloring component. Moreover, this is the same for where the image format is RGB, and the equivalent algorithm can be applied to the respective R, G, B components. If these methods are applied, it is possible to embed an even larger amount of information. Moreover, by making the information for embedding in the respective components the same, then this can also be used in detecting the presence of dishonest alteration of the picture and the embedding information.

Fifth Embodiment

With this embodiment, a description is given of an information embedding apparatus which, at the time of embedding the separate sub-information into a digital image, finely divides the image into block images, down samples (downgrades the resolution) for each of the block images, and carries out frequency transformation. Inverse orthogonal transform is then carried out using the value of the frequency coefficient, after which the image is up sampled (upgrading the resolution) and image reconstitution carried out.

Furthermore, with the fifth embodiment, a description is given of an information reading apparatus which, at the time of reading separate sub-information from the digital image which has been subjected to information embedding as described above, finely divides the image into block images, down samples for each of the block images, and carries out frequency transformation. Then reads the sub-information by computing the value of the frequency coefficient.

In this way, with an image wherein the resolution has dropped, by carrying out information embedding/reading on the component of the low frequency domain using the frequency transformation, and carrying out frequency transformation and subsequent information embedding in a block size larger than the block size used in the information compression, then the robustness with respect to image compiling can be preserved.

Moreover, by using the present invention in a copyright protection system or the like, the quality of the digital information contents can be improved over the conventional system. Furthermore with the strengthening of the copyright protection counter measures, it becomes possible to raise the borderline between the quality of the watermark-information and the rate of continuation of the watermark-information, which are in a relation of trade-off being a difficult subject. That is to say, since information embedding can be performed in a way that is unlikely to be influenced by quantization, by using recently used image compression techniques, and information embedding is performed by orthogonal transforming at a block size larger than the block size used in information compression, then influence on the picture (image quality degradation) can be suppressed. Moreover since embedding processing is carried out on the down-sampled image, then processing is faster than normal.

The fifth embodiment will now be described with reference to the accompanying drawings.

Figure 61:
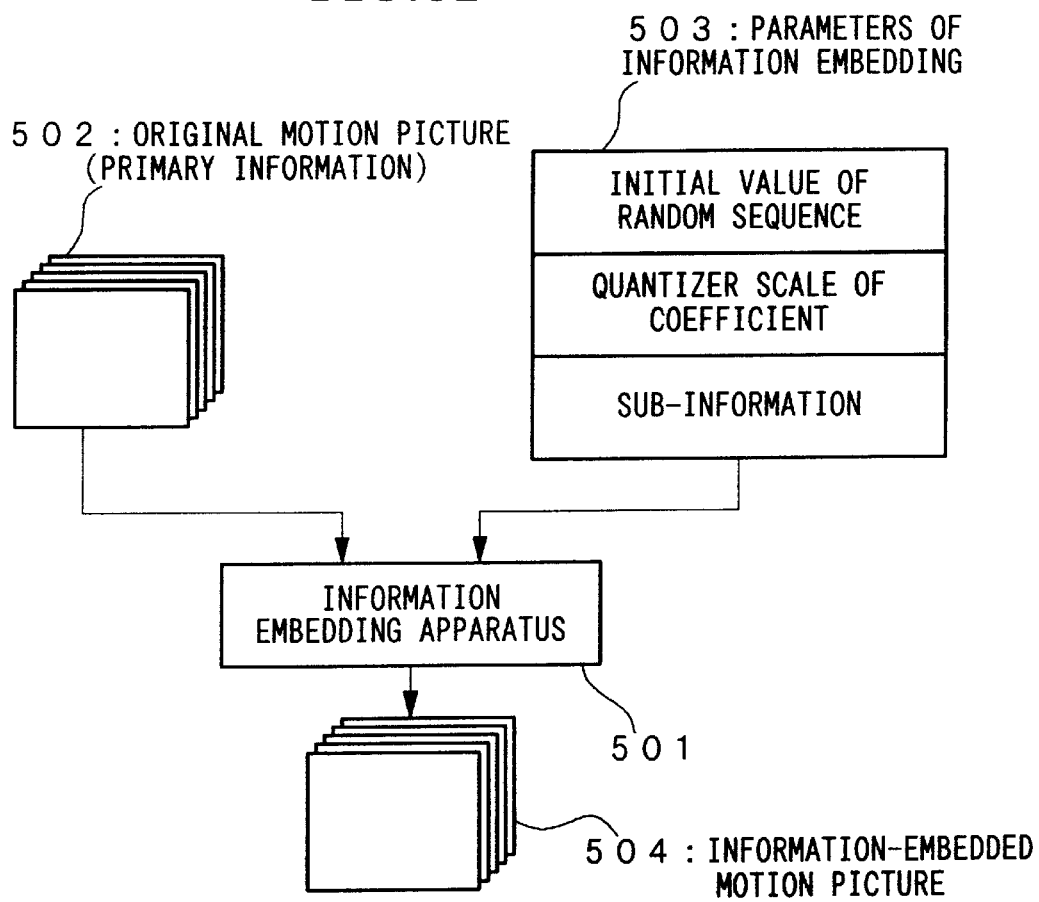
FIG. 61 is a schematic diagram showing the information input/output relationship of an information-embedding-apparatus according to a fifth embodiment.

First is a discussion of the processing for embedding information in pictures. FIG. 61 is a schematic diagram of the input/output relationship of an information-embedding-apparatus 501 according to this embodiment. The information-embedding-apparatus 501 takes the input of original-motion-picture (primary information) 502 of a digital motion picture or the like, and parameters-of-information-embedding 503, and outputs Information-embedded-motion-picture 504. The parameters-of-information-embedding 503 comprise the initial-value-of-a-random-sequence, the frequency quantization width, and information to be embedded (sub-information). Comparing FIG. 1 and FIG. 61, the information-embedding-apparatus 1, the original-data 2, the watermark-information 4, the key-of-embedding-information 3 and the embedded-data 5 in FIG. 1 correspond to the information-embedding-apparatus 501, the original-motion-picture 502, the sub-information in the parameters-of-information-embedding 503, the parameters-of-information-embedding 503 excluding the sub-information, and the Information-embedded-motion-picture 504 in FIG. 61, respectively. Moreover, the initialvalue-of-a-random-sequence 31 and the quantizer-scale-of-coefficient 32 in FIG. 1 correspond to the initial-value-of-a-random-sequence and the quantizer-scale-of-coefficient in the parameters-of-information-embedding 503 in FIG. 61, respectively.

Figure 62:
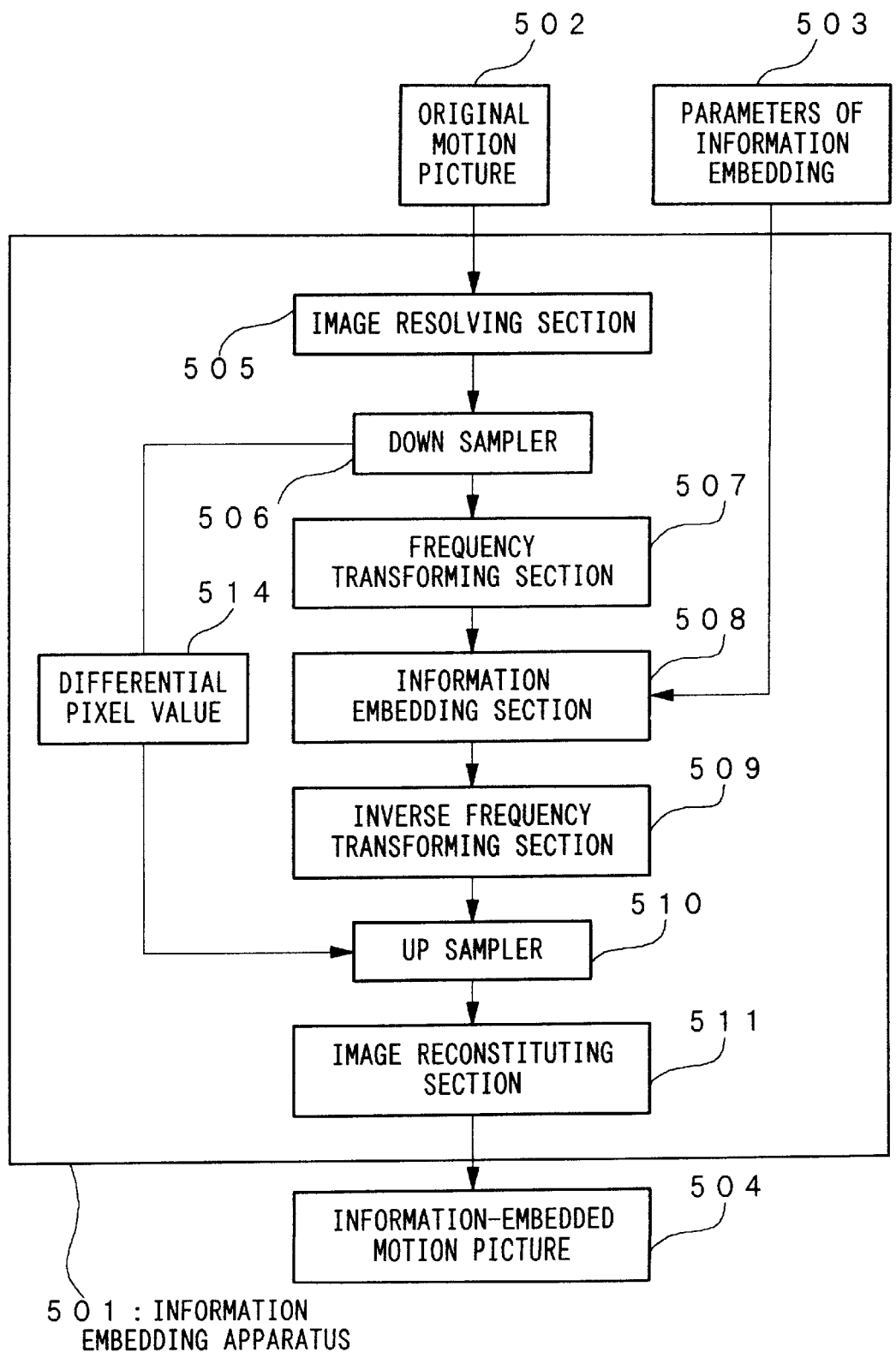
FIG. 62 is an overall structure diagram of one example of the information-embedding-apparatus according to the fifth embodiment.

FIG. 62 is a diagram showing the overall structure of one embodiment of the information-embedding-apparatus 501. The information-embedding-apparatus 501 comprises an image-resolving-section 505, a down-sampler 506, a frequency transform processing section 507, an information-embedding-section 508, an inverse frequency transform processing section 509, an up-sampler 510, and an image-reconstructing-section 511. The correspondence between FIG. 1 and FIG. 62 is as follows. The blocking-section 11 in FIG. 1 corresponds to the image-resolving-section 505 in FIG. 62, and the orthogonal-transform-section 12 in FIG. 1 corresponds to the down-sampler 506 and the frequency transform processing section 507 in FIG. 62. Furthermore, the functions of the embedding-coefficient-selecting-section 13 and the information-embedding-section 14 in FIG. 1 are included in the information-embedding-section 508. Moreover, the function of the inverse-orthogonal-transform-section 15 in FIG. 1 corresponds to inverse frequency transform processing section 509, the up-sampler 510, and the image reconstitution processing section 510. As follows is a sequential description of the respective processing sections 505~511.

(Image-resolving-section 505)

Figure 63:
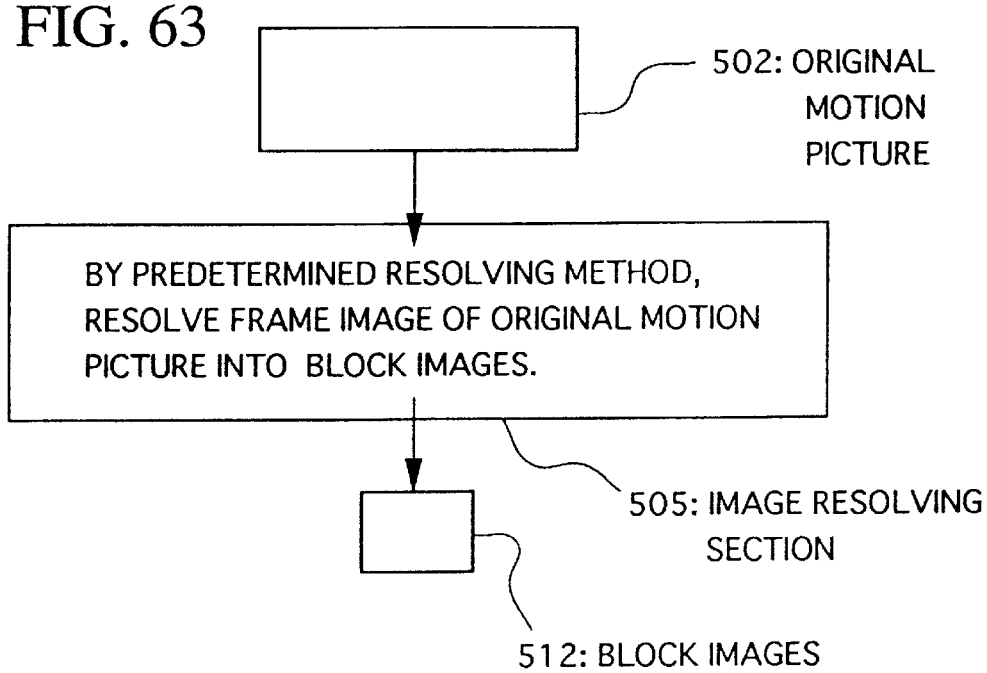
FIG. 63 is a conceptual diagram of an image-resolving-section of FIG. 62.

FIG. 63 is a conceptual diagram of the image-resolving-section 505. The image-resolving-section 505 resolves the respective frames of the original-motion-picture 502 into N×M size block-images 512, and sequentially sends these to the down-sampler.

(Down-sampler 506)

Figure 64:
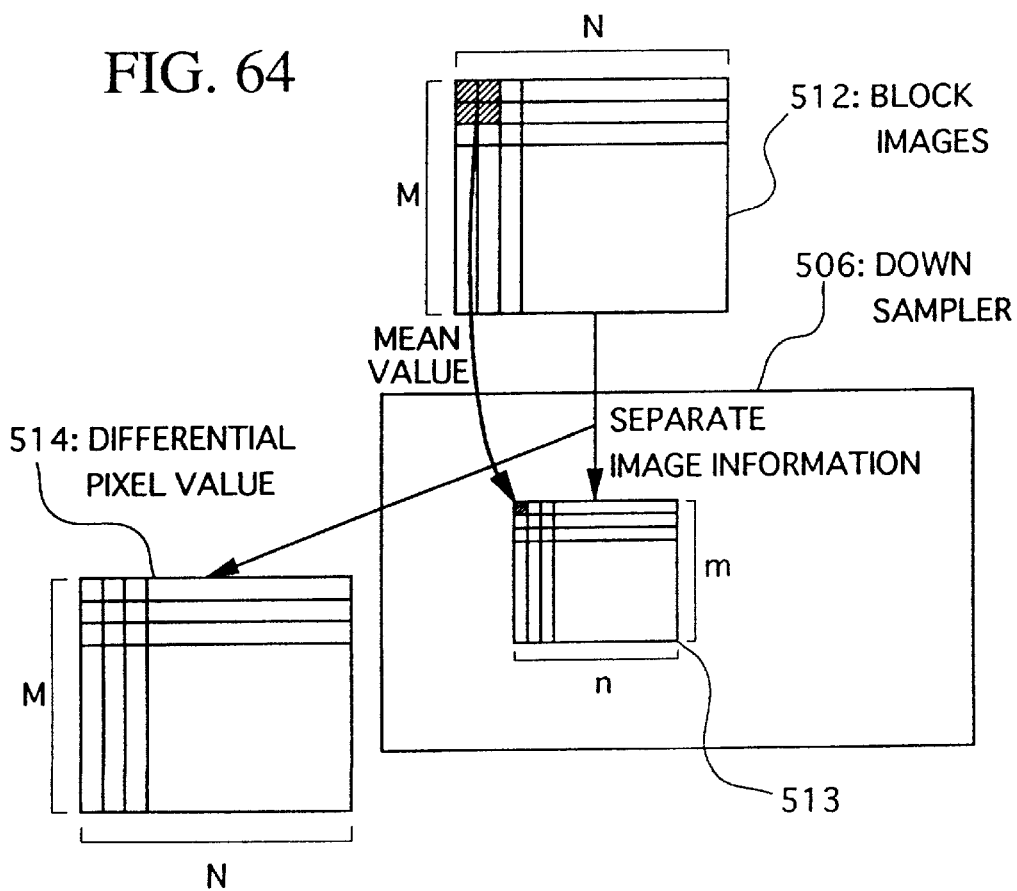
FIG. 64 is a conceptual diagram of the processing of a down-sampler of FIG. 62.

FIG. 64 is a conceptual diagram of the processing of the down-sampler 506. The down-sampler 506 reads the mean value of each of a plurality of regions of the N×M size block image 512 to create an image wherein the resolution has been dropped to n×m size, and separates the information into a down-sampled n×m size (for example as shown in FIG. 64, with n=N/2, m=M/2, the resolution becomes half of an image) image (down-sample image) 513 and differential-pixel-value 514, and sends the down-sampled-image 513 to a frequency-transforming-section 507, and the differential-pixel-value 514 to an up-sampler 510. Here, the differential-pixel-value 514 are the N×M size differential image of the image wherein the input block image 512 and the n×m size down-sampled image 513 have been expanded to N×M size.

(Frequency-transforming-section 507)

Figure 65:
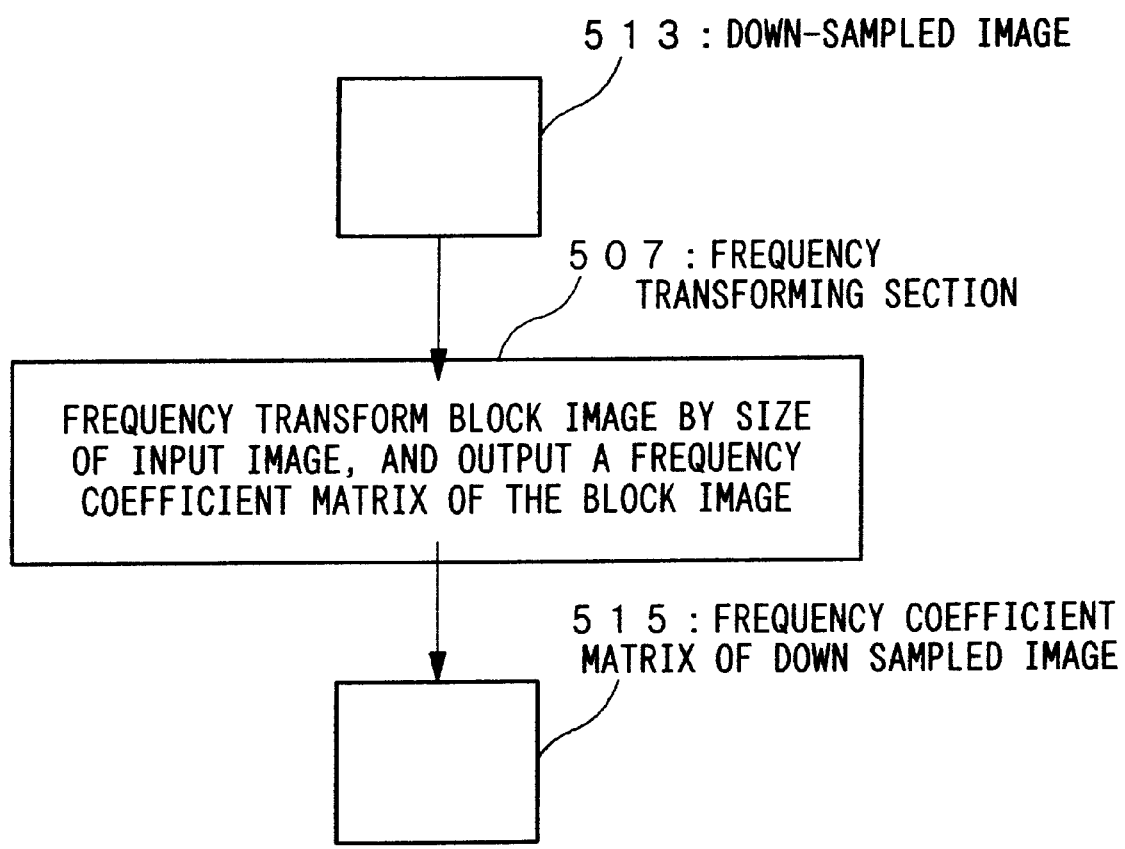
FIG. 65 is a conceptual diagram of a frequency-transforming-section of FIG. 62.

FIG. 65 is a conceptual diagram of the frequency-transforming-section 507. The frequency-transforming-section 507 n×m frequency transforms (for example by Discrete Cosine Transform or Discrete Fourier Transform) the n×m size down-sampled image 513, and outputs an n×m size frequency-coefficient-matrix-of-down-sampled-image 515.

(Information-embedding-section 508)

Figure 66:
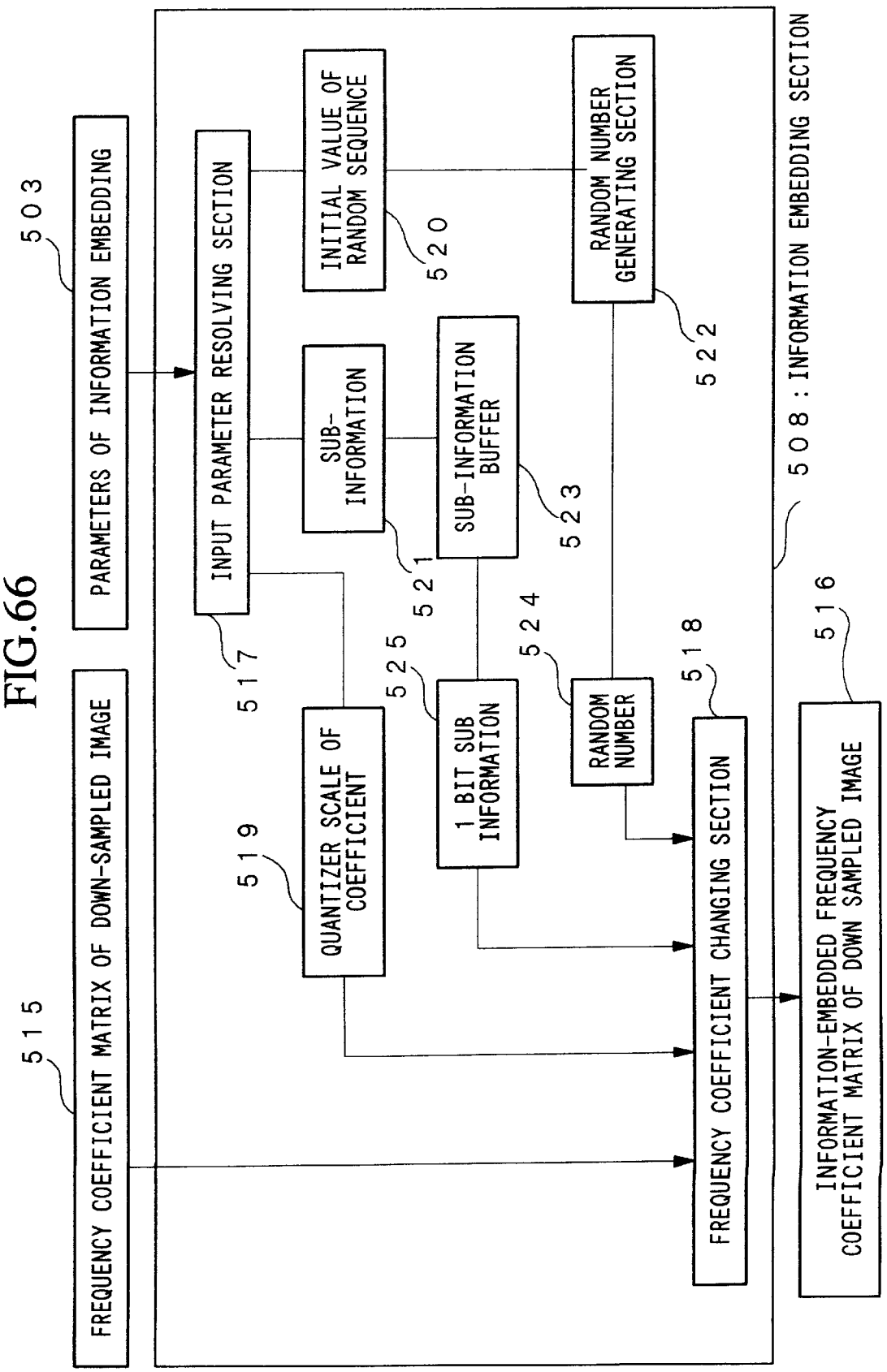
FIG. 66 is a structure diagram of an infor-mation-embedding-section of FIG. 62.

FIG. 66 is a structure diagram of the information-embedding-section 508. The information-embedding-section 508 takes the input of the parameters-of-information-embedding 503 and the frequency coefficient-matrix-of-down-sampled-image 515, and outputs an information-embedded-frequency-matrix-of-down-sampled-image 516 which is sent to the inverse frequency transform processing section 509. Here the function of the embedding-coefficient-selecting-section 13 in FIG. 1 is realized by a part of the function of a frequency-coefficient-changing-section 518 and a random-number-generation-processing-section 522 in FIG. 66. The operation of the information-embedding-section 508 will now be described.

The parameters-of-information-embedding 503 are sent to an input-parameter-resolving-section 517, while the frequency-coefficient-matrix-of-down-sampled-image 515 is sent to the frequency-coefficient-changing-section 518.

The input-parameter-resolving-section 517 resolves the parameters-of-information-embedding 503 into a frequency coefficient quantization width 519, an initial-value-of-a-random-sequence 520, and sub-information 521. The frequency coefficient quantization width 519 is sent to the frequency-coefficient-changing-section 518, the initial-value-of-a-random-sequence 520 is sent to the random-number-generation-processing-section 522, and the sub-information 521 is sent to a sub-information buffer 523.

The random-number-generation-processing-section 522 reads the initial-value-of-a-random-sequence 520 and based on this, successively creates a random number 524 for each processing of the respective one bit information embedding, and sends this to the frequency-coefficient-changing-section 518. Here the random-number-generation-processing-section 522 generates random numbers at a period which is sufficiently larger than the number of blocks of the image.

Figure 67:
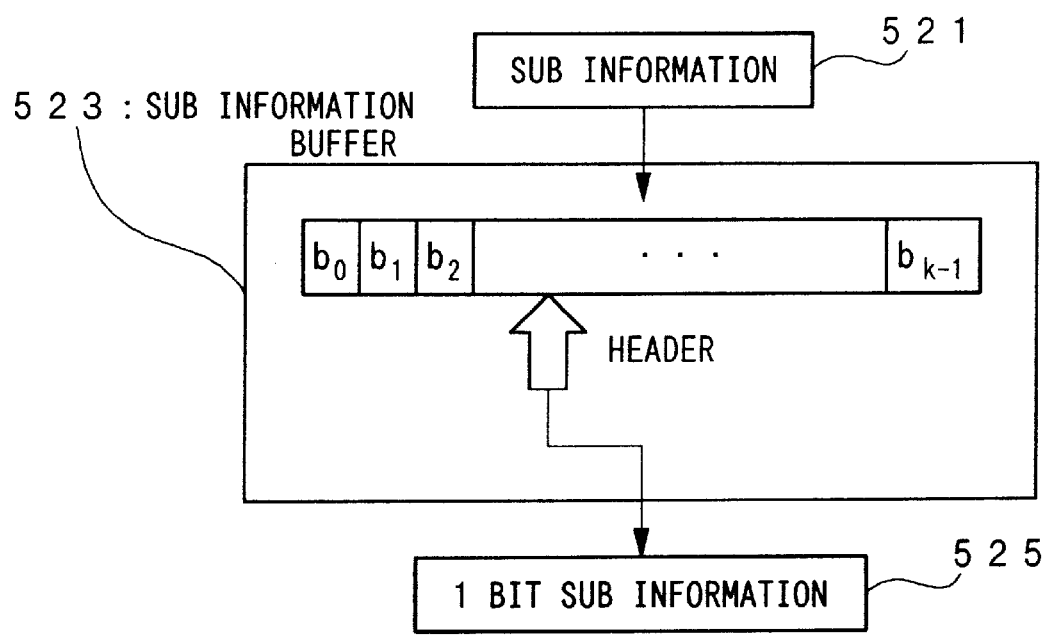
FIG. 67 is a schematic diagram of a sub-information-buffer of FIG. 66.

The sub-information buffer 523, as shown in FIG. 67, stores sub-information 521 in an internal buffer, and reads out information one bit at a time by means of a read out header, and successively sends the 1 bit sub-information 525 to the frequency-coefficient-changing-section 518 for each processing of the respective 1 bit information embedding.

For the control method of the information read/write header inside the sub-information buffer 523, various methods can be considered such as a method which is activated for each processing of the respective one bit information embedding and reading, or a method which is activated for each processing of the information embedding to and reading from the respective block images. However these depend on the packaging system for the information embedding and reading apparatus. With the control method for the header which performs information read out/writing of the sub-information buffer 523, packaging must be carried out with the same method in the information embedding apparatus and in an information reading apparatus to be described later.

Figure 68:
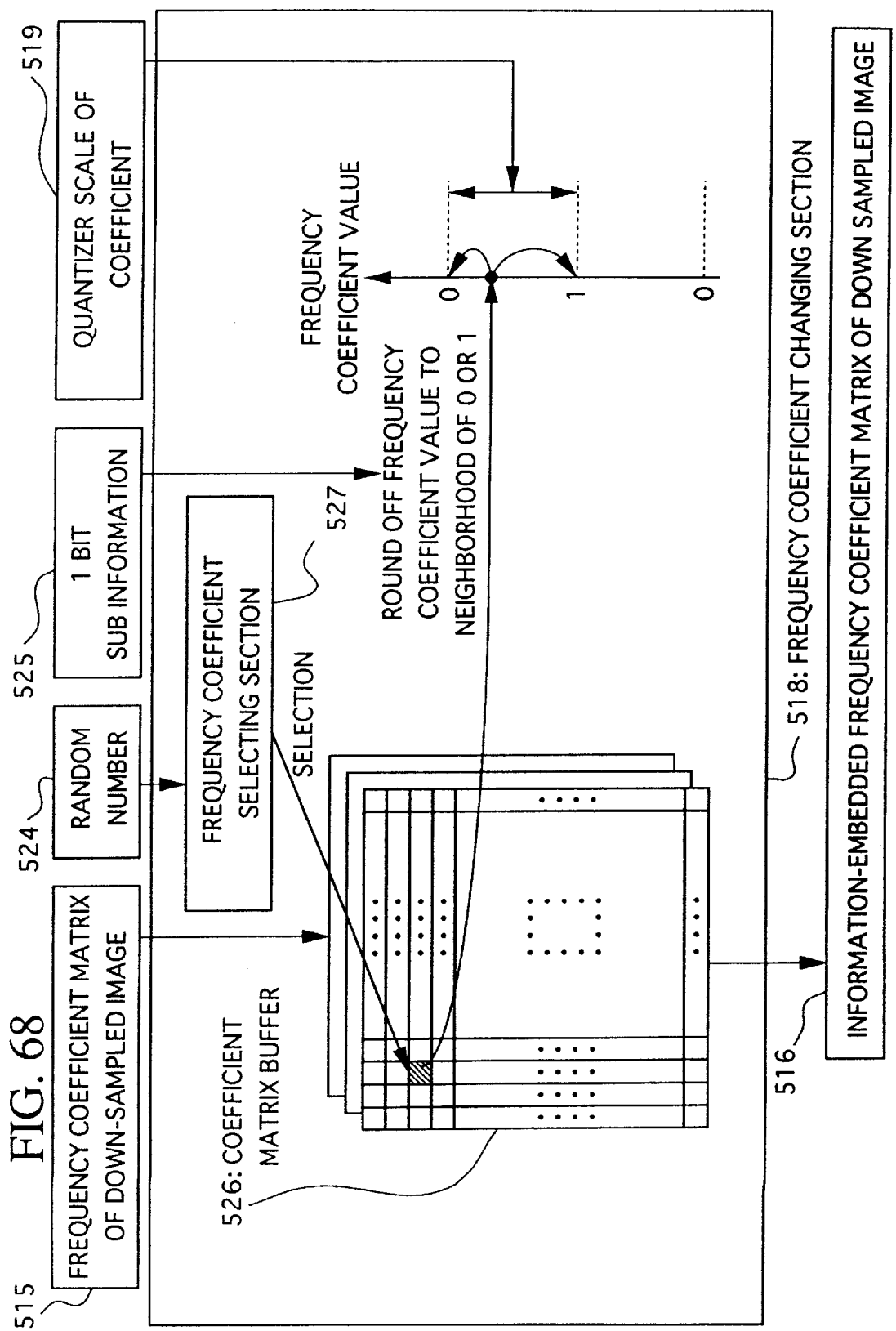
FIG. 68 is a conceptual diagram of a schematic structure and processing, of the frequency-coefficient-changing-section of FIG. 66.

FIG. 68 is a conceptual diagram of a schematic structure and processing of the frequency-coefficient-changing-section 518. A frequency-coefficient-selecting-section 527 in FIG. 68 serves as a part of the function of the embedding-coefficient-selecting-section 13 in FIG. 1.

The frequency-coefficient-matrix-of-down-sampled-image 515 is stored in a coefficient matrix buffer 526. The input random number 524 is sent to a frequency-coefficient-selecting-section 527. The frequency-coefficient-selecting-section 527, by means of the random number 524, selects one component of the down-sample coefficient matrix inside the coefficient matrix buffer 526 so that there is no conflict within the down-sample coefficient matrix.

The frequency-coefficient-changing-section 518 quantizes the coefficient selected by the frequency-coefficient-selecting-section 527 to thereby information embed the input 1 bit sub-information 525. The information embedding processing is performed T times (where T is the number (one or more) of information to be embedded in the respective block images. It is also necessary for the information reading device to package with the same method) on one block of the coefficient matrix. After all have been done, the information-embedded-frequency-matrix-of-down-sampled-image 516 is output.

Next is a more specific description of the processing for embedding the j-th ($1 \leq j \leq T$) bit information which is in the u-th block picture of the i-th frame of the input original-motion-picture 502. Provided that the frequency coefficient quantization width 519 is made "range", and the sub-information 521 for embedding is made $b_o b_1 \ldots b_{k-1}$ (where the watermark-information bit length is k, $b_j \in \{0, 1\}$, $0 \leq j \leq k-1$).

With the frequency-coefficient-changing-section 518, the value of the frequency coefficient value $c_{i, u, j}$ selected by the frequency-coefficient-selecting-section 527 is changed as follows to thereby embed the 1 bit sub-information 525.

To $$\left\lfloor \frac{c_{i,u,j}}{\text{range}} + \frac{1}{2} \right\rfloor \times \text{range}$$

where the bit information to be embedded is equal to $$\left\lfloor \frac{c_{i,u,j}}{\text{range}} + \frac{1}{2} \right\rfloor \mod 2 \text{ to } \left\lfloor \frac{c_{i,u,j}}{\text{range}} \right\rfloor \times \text{range}$$

where the bit information to be embedded is not equal to $$\left\lfloor \frac{c_{i,u,j}}{\text{range}} + \frac{1}{2} \right\rfloor \mod 2 \text{ and } \left\lfloor \frac{c_{i,u,j}}{\text{range}} + \frac{1}{2} \right\rfloor \text{ is equal to } \left\lceil \frac{c_{i,u,j}}{\text{range}} \right\rceil \text{ and to}$$

$$\left\lfloor \frac{c_{i,u,j}}{\text{range}} \right\rfloor \times \text{range}$$

where the bit information to be embedded is not equal to $$\left\lfloor \frac{c_{i,u,j}}{\text{range}} + \frac{1}{2} \right\rfloor \mod 2 \text{ and } \left\lfloor \frac{c_{i,u,j}}{\text{range}} + \frac{1}{2} \right\rfloor \text{ is not equal to } \left\lceil \frac{c_{i,u,j}}{\text{range}} \right\rceil$$

where in the equations $\lfloor X \rfloor$ indicates a maximum integer not exceeding x, $\lceil X \rceil$ indicates a minimum integer greater than or equal to x, and x mod y indicates the remainder after dividing x by y. These definitions are common for all embodiments.

In the frequency-coefficient-changing-section 518, the sub-information read out header of the sub-information buffer 523 is controlled by a previously determined method for each execution of the respective 1 bit information embedding. By repeating this embedding processing on one block coefficient matrix T times being the number of bits to be embedded, then the embedding processing of one block image is completed.

(Inverse-frequency-transforming-section 509)

Figure 69:
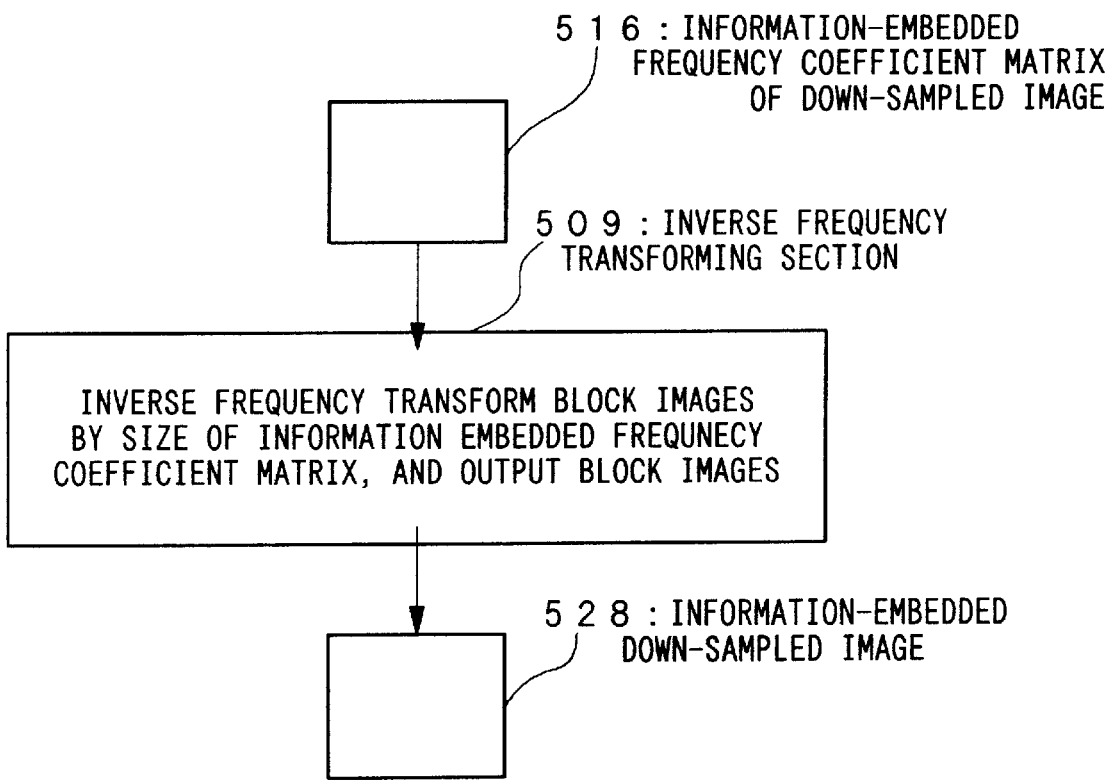
FIG. 69 is a conceptual diagram of an inverse-frequency-transforming-section.

FIG. 69 is a conceptual diagram of an inverse-frequency-transforming-section 509. The inverse-frequency-transforming-section 509 transforms the information-embedded-frequency-matrix-of-down-sampled-image 516 into an information-embedded-down-sampled-image 528, and sends this to the up-sampler 510.

(Up-sampler 510)

Figure 70:
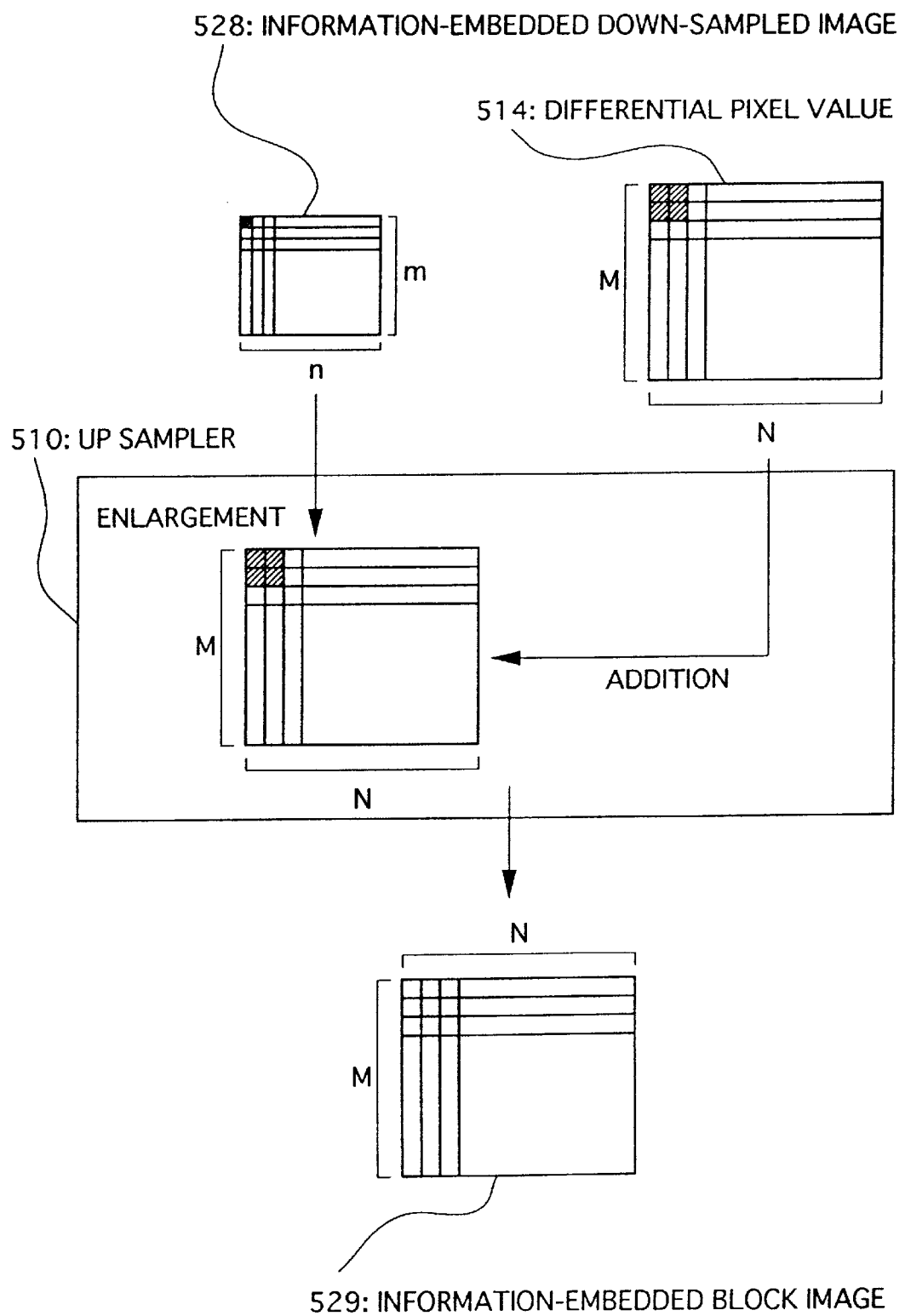
FIG. 70 is a conceptual diagram of a processing of an up-sampler of FIG. 62.

FIG. 70 is a conceptual diagram of the processing of the up-sampler 510. The up-sampler 510 expansion processes the n×m size information-embedded-down-sampled-image 528 into an N×M size image, and then interpolates using the down-sampled-image 513, to thereby output an information-embedded-block-image 529.

(Image-reconstructing-section 511)

Figure 71:
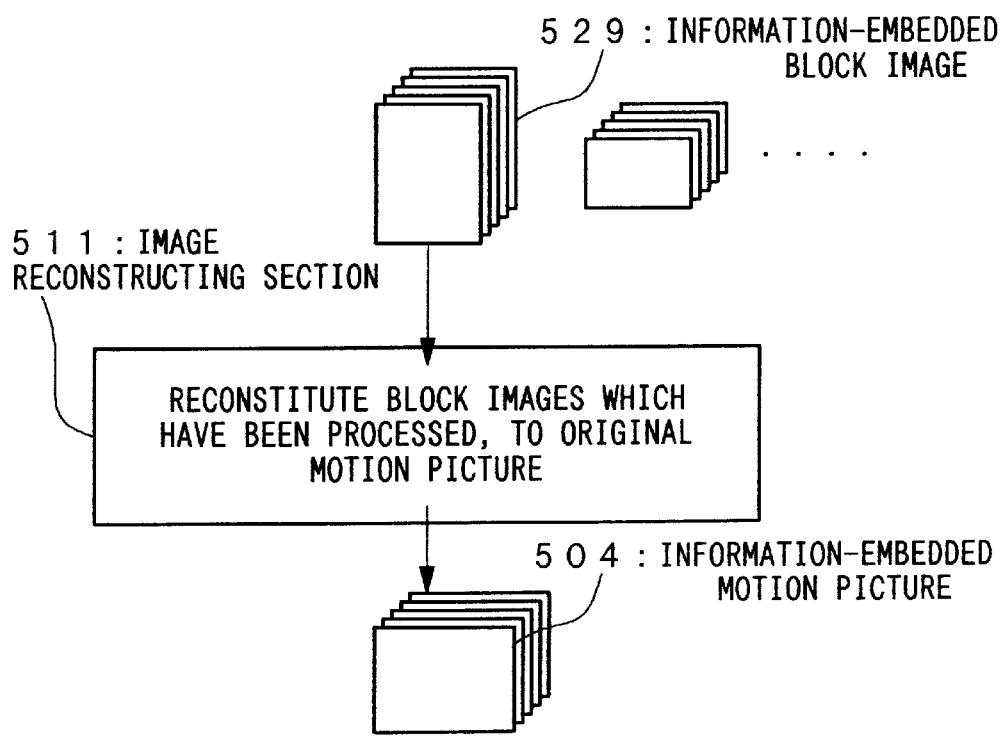
FIG. 71 is a conceptual diagram of an image-reconstructing-section of FIG. 62.

FIG. 71 is a conceptual diagram of the image-reconstructing-section 511. The image-reconstructing-section 511 connects together the information-embedded block images 529, restoring them to the still image and the motion picture to thereby output an information-embedded picture 504.

Figure 72:
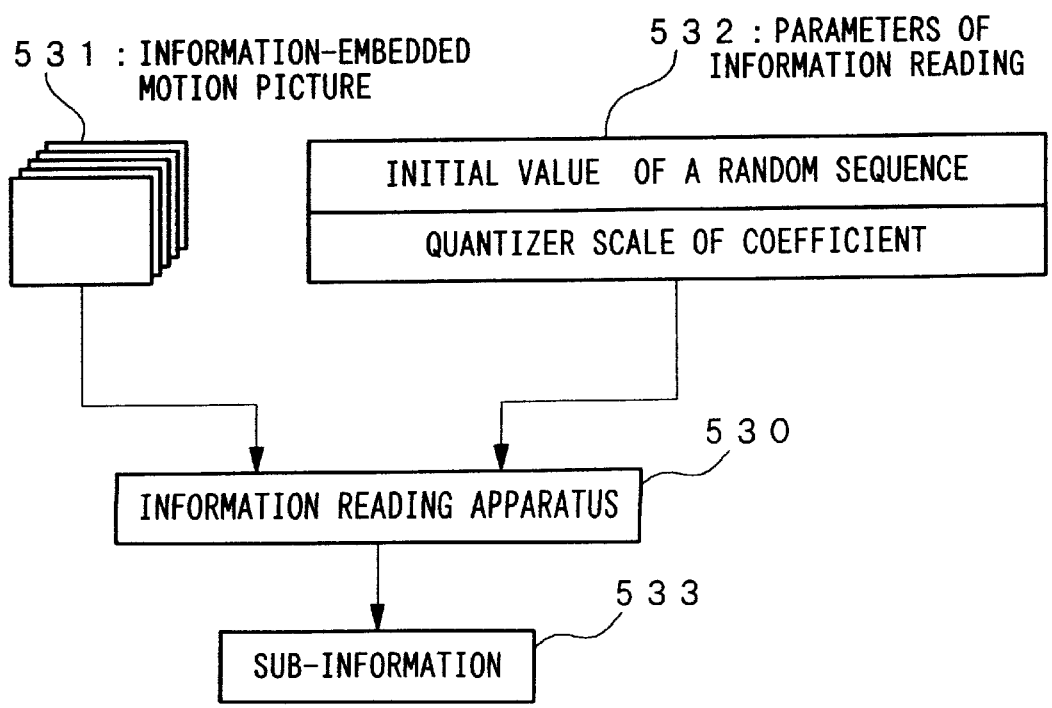
FIG. 72 is a schematic diagram showing the information input/output relationship of an information-reading-apparatus according to the fifth embodiment.

Next is a description of the processing for reading information from the information embedded image. FIG. 72 is a schematic diagram of the input/output relationship of an information reading apparatus of one embodiment according to the present invention. An information-reading-apparatus 530 takes the input of an information-embedded-motion-picture 531 and parameters-of-information-reading 532 and reads and outputs sub-information 533 embedded in the picture 531. The sub-information buffer 523 comprises the initial value of the random number of the information embedding key which is used at the time of creating the information-embedded-motion-picture 531, and the frequency coefficient quantization width. Comparing FIG. 3 and FIG. 72, the information-reading-apparatus 6, the embedded-data 5, the key-of-embedding-information 3 and the watermark-information 4 in FIG. 3 correspond to the information-reading-apparatus 530, the information-embedded-motion-picture 531, the parameters-of-information-reading 532, and the sub-information 533 in FIG. 72, respectively.

Figure 73:
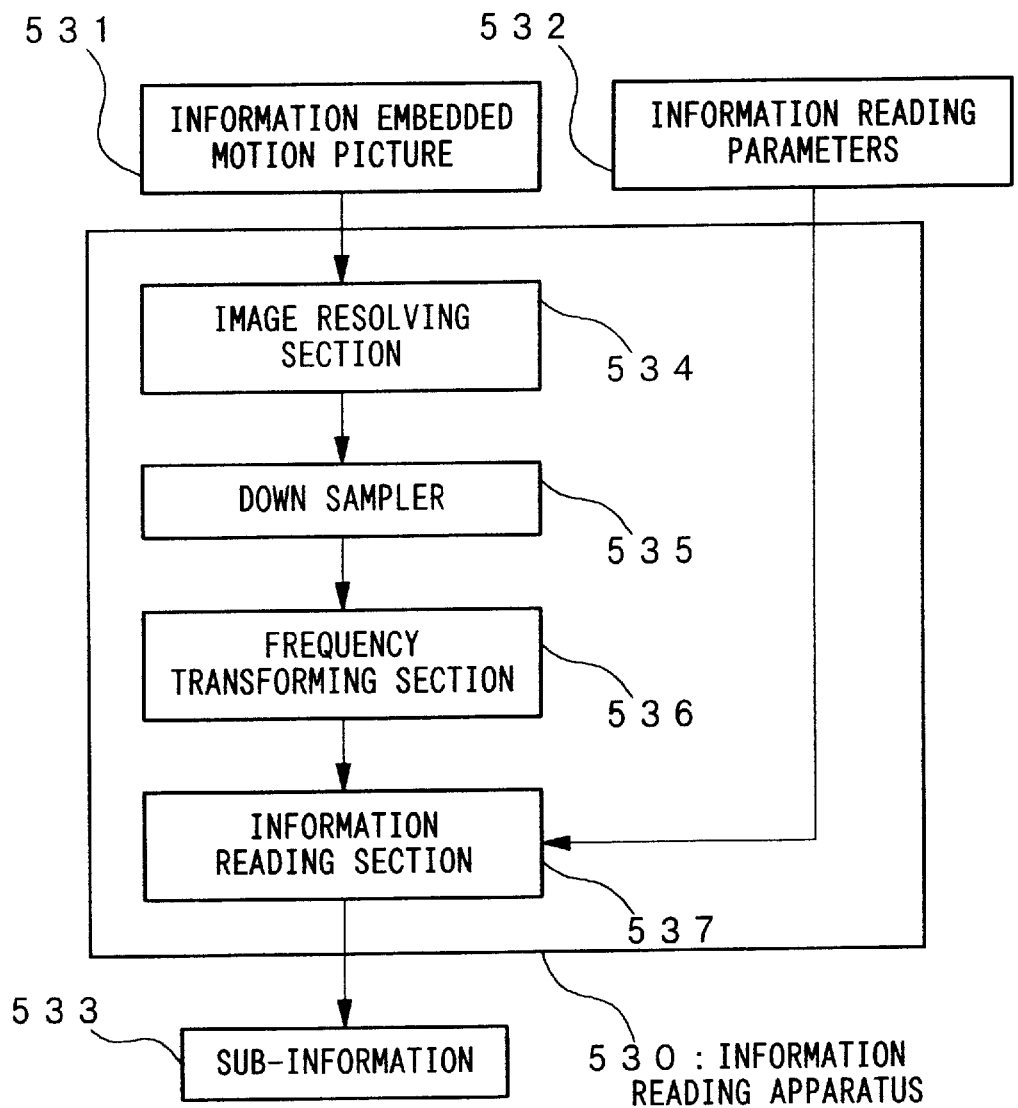
FIG. 73 is an overall structure diagram of one example of the information-reading-apparatus according to the fifth embodiment.

FIG. 73 shows an overall structure diagram of one example of the information-reading-apparatus 530. The information-reading-apparatus 530 comprises an image-resolving-section 534, a down-sampler 535, a frequency-transforming-section 536, and an information-reading-section 537. The blocking-section 21 in FIG. 3 corresponds to the image-resolving-section 534 in FIG. 73. The function of the embedding-coefficient-selecting-section 22 in FIG. 3 is included the information-reading-section 537 in FIG. 73. Moreover the section-for-computing-coefficient-to-be-processed 23 in FIG. 3 corresponds to the down-sampler 535 and the frequency-transforming-section 536 in FIG. 73. Furthermore the function of the information-reading-section 24 in FIG. 3 is realized by the information-reading-section 537. As follows is a sequential description of the respective processing sections 534~537.

(Image-resolving-section 534)

The image-resolving-section 534 resolves the respective frames of the information-embedded-motion-picture 531 into N×M size information embedded block images, and successively sends these to the down-sampler 535. The image-resolving-section 534 is the same as the image-resolving-section 505 on the information embedding apparatus side.

(Down-sampler 535)

Figure 74:
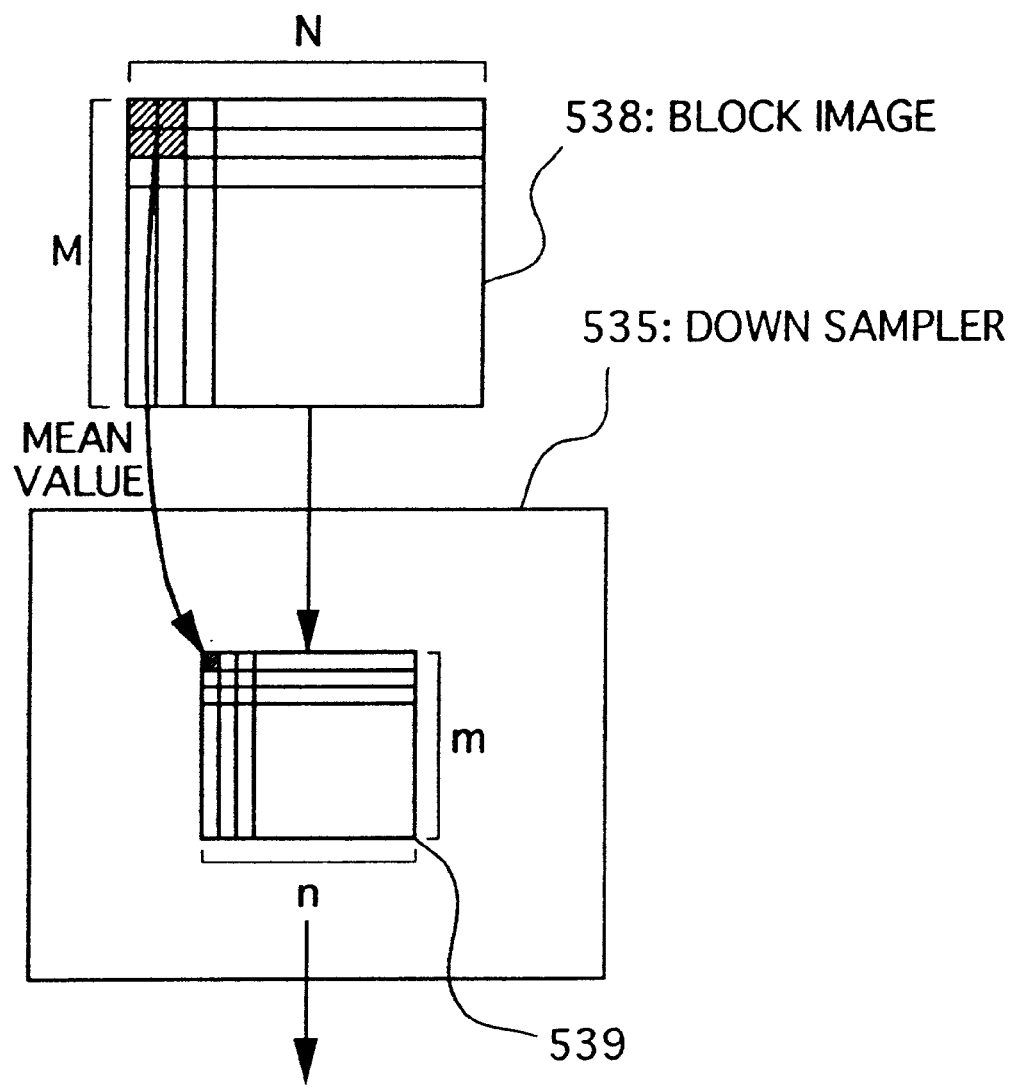
FIG. 74 is a conceptual diagram of the processing of a down-sampler of FIG. 73.

FIG. 74 is a conceptual diagram of the processing of the down-sampler 535. The down-sampler 535 creates a down-sampled n×m size image (information embedded down-sample image) 539 from an N×M size information embedded block-image 538, and sends this to the frequency-transforming-section 536. The down-sampler 535 differs slightly from the down-sampler 506 on the information embedding apparatus side in that the differential pixel values are not output.

(Frequency-transforming-section 536)

The frequency-transforming-section 536 n×m frequency transforms the n×m size information embedded down-sampled image 539, and outputs an n×m information embedded down-sample coefficient matrix. The frequency-transforming-section 536 is the same as the frequency-transforming-section 507 on the information embedding side.

(Information-reading-section 537)

Figure 75:
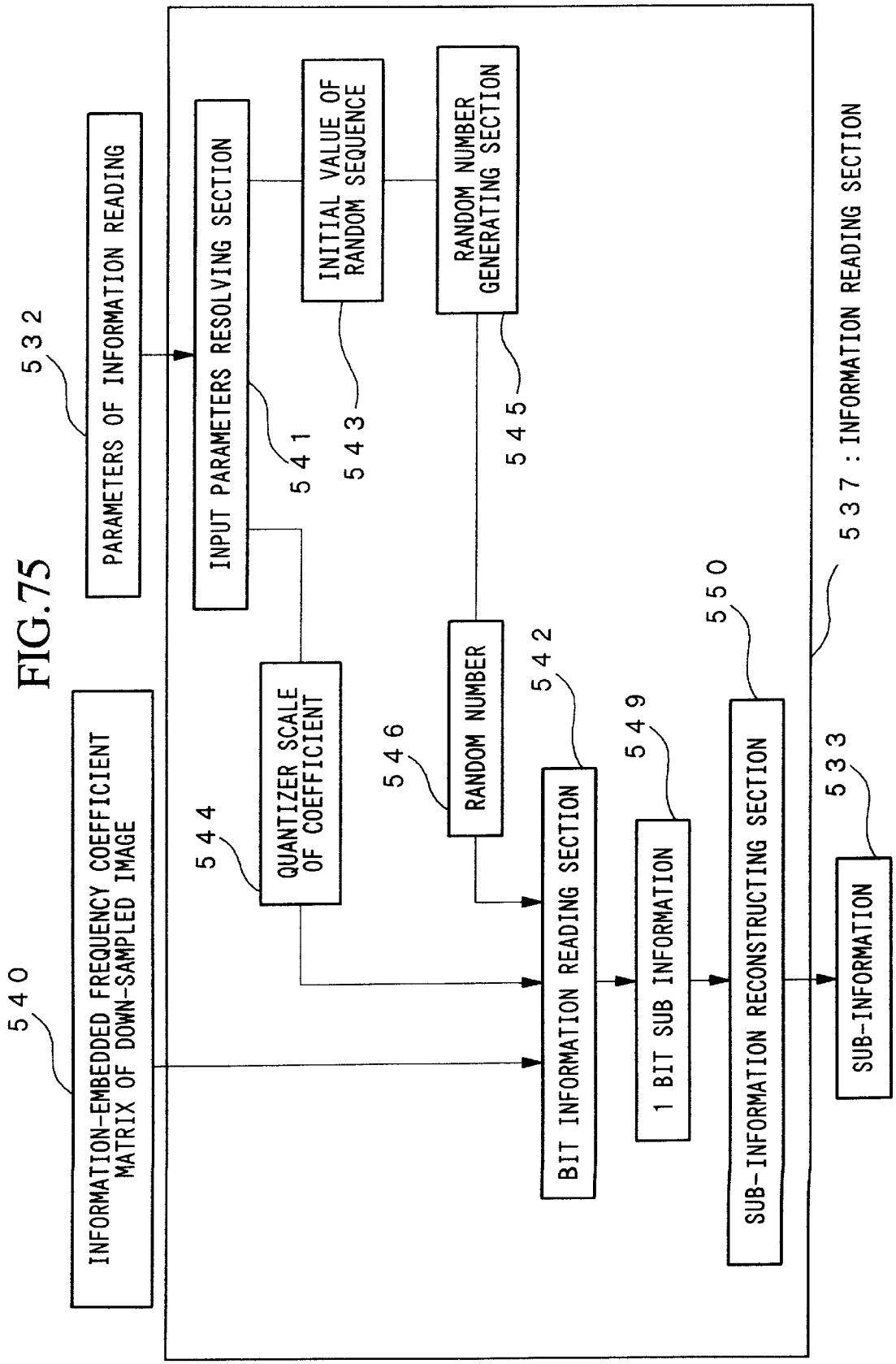
FIG. 75 is a structure diagram of an information-reading-section of FIG. 73.

FIG. 75 is a structure diagram of the information-reading-section 537. The information-reading-section 537 takes the input of the parameters-of-information-reading 532 and an information embedded-frequency-coefficient-matrix-of-down-sampled-image 540 of the frequency transform processing section 536, and outputs the sub-information 533. Here the function of the embedding-coefficient-selecting-section 22 in FIG. 1 is realized by a part of the function of a bit-information-reading-section 542 and a random number generation processing section 545. The operation of the information-reading-section 537 will now be described.

The parameters-of-information-reading 532 are sent to an input-parameters-resolving-section 541, while the information-embedded-frequency-coefficient-matrix-of-down-sampled-image 540 is sent to the bit-information-reading-section 542.

The input-parameters-resolving-section 541 resolves the parameters-of-information-reading 532 and outputs an initial-value-of-a-random-sequence 543 and a frequency coefficient quantizing width 544. The initial-value-of-a-random-sequence 543 is sent to the random number generation processing section 545, while the frequency coefficient quantizing width 544 is sent to the bit-information-reading-section 542.

The random number generation processing section 545 reads the initial-value-of-a-random-sequence 543, and based on this, successively creates a random number 546 for each processing of the respective 1 bit information reading, and sends this to the bit-information-reading-section 542. With the random number generation processing section 545 and the random-number-generation-processing-section 522, when the same initial value for the random number is input, then packaging is necessary so that the same random numbers are output in the same order.

FIG. 76 shows a conceptual diagram of a schematic structure and processing of the bit-information-reading-section 542. A part of the function of the embedding-coefficient-selecting-section 22 in FIG. 3 is realized by a frequency-coefficient-selecting-section 548 in FIG. 76.

The information-embedded-frequency-coefficient-matrix-of-down-sampled-image 540 is stored in a coefficient matrix buffer 547. The random number 546 is input to the frequency-coefficient-selecting-section 548. Here it is necessary for the frequency-coefficient-selecting-section 548 to package with the same processing as the frequency-coefficient-selecting-section 527 in the frequency coefficient-changing-section 518. That is to say, when the same random number is input to the frequency coefficient-selecting-section 527 and the frequency-coefficient-selecting-section 548, the same frequency coefficient is selected.

The bit-information-reading-section 542 judges the bit assigned with the quantization value closest to the coefficient value selected by the frequency-coefficient-selecting-section 548 to thereby read 1 bit sub-information 549. The information read processing is performed T times (where T is the number of information to embedded in the respective block images at the time of information embedding) on one of the information embedded down-sample coefficient matrixes 540, and the embedded 1 bit information successively output. With the number of times of information read processing, the number of times that the respective bits of the embedded sub-information are read is increased, and in accordance with this by carrying out error correction code processing such as majority vote processing on these, the reliability of the read sub-information can also be improved.

Next is a more specific description of the processing for reading the j-th ($1 \leq j \leq 1$) bit information (bi, u, j $\in \{0, 1\}$ which is in the u-th block picture of the i-th frame of the information-embedded-motion-picture 531. Provided that the sub-information 533 embedded in the information-embedded-motion-picture 531 is made $b_o b_1 \ldots b_{k-1}$, and the frequency coefficient quantizing width 544 input to the bit-information-reading-section 542 is made "range".

Information reading can be performed by computing;

$$bi, u, j = \left\lfloor \frac{c_{i,u,j}}{\text{range}} + \frac{1}{2} \right\rfloor \mod 2$$

for the frequency coefficient $c_{i, u, j}$ selected by the frequency-coefficient-selecting-section 548.

The 1 bit sub-information 549 is sent to a sub-information reconstructing section 550. The sub-information reconstructing section 550 takes the input of the sub-information embedded in the block image successively 1 bit at a time, finally determines the respective sub-information bits using a statistical technique such as majority vote processing on the respective sub-information which has been input several times, and then reconstructs the sub-information. The sub-information write header in the sub-information reconstructing section 550 is controlled by a previously determined method for each 1 bit reading.

The sub-information read processing from one of the information embedded down-sample coefficient matrices 540 is completed by read processing repetitively with respect to one of the information embedded down-sample coefficient matrixes 540, T times being the number of bits embedded therein.

The above processing is carried out on all of the block images, and with each reconstitution of the sub-information, or after completion of the processing for all of the motion pictures, the sub-information read from the pictures is output.

Embodiments of the present invention have been described above, however the following modifications and enlargements are possible.

(1) The range used at the time of information embedding and reading can be changed for each individual block by observing the characteristics of the block image. For example, the entropy of the pixel value of the block image can be computed and the range then changed according to the resultant value.

(2) By error correction coding the sub-information to be embedded, then deterioration of the sub-information related to deterioration of the picture can be suppressed.

(3) Apart from the sub-information of the bit portion for embedding in the respective block images, by information embedding the watermark-information discriminating label in the same block image, reliability of the read information can be obtained. The information embedding processing technique is the same as for embedding processing of only the sub-information.

For example the label information is made $a_0 a_1 \ldots a_{1-1}$, and information read is performed, and the hanging distance between the obtained label information and the original label information is made m (m<1). At this time, the reliability S of the sub-information read simultaneous with the label information, can be computed as follows:

$$\text{when hamming distance is } 0, \quad S = 1$$

-continued when $m \leq \frac{1}{2}$, $\quad S = 0$ at other times, $\quad S = \dfrac{2^l - \sum_{k=0}^{2m} lC_k}{2^l}$ By reconstructing the sub-information for the read bits which have been weighted, based on these equations, then the information read accuracy can be further improved. Moreover, if the sub-information is that which has been subjected to error correcting coding, then the judgment of the possibility of error correction can be made from the reliability, and if the error proportion is within the error correction capability, then correct information can always be read.

(4) By information embedding repeatedly by changing the information embedding block size in one block, and performing processing such as examining the label reading accuracy, the presence of dishonest alteration of the motion picture being the main information, can be detected.

(5) By initialization of the random number at a certain time unit, and taking this out in synchronous at the time of information reading, then information can be read from an optional frame such as during the reproduction of a motion picture.

As described above, according to the invention of the fifth embodiment, the following effects can be obtained:

(1) Since information embedding processing is performed on down-sampled pictures, then processing is faster than normal.

(2) If there is no key information used at the time of information embedding, it is not possible to take out the sub-information.

(3) By devising the change frequency coefficient position in which the sub-information is embedded and the frequency component quantization width, then information embedding can be performed in a manner that cannot be perceived by a person. Furthermore, the strength can be controlled to counter degradation of the sub-information (watermark-information) due to degradation of the primary information (picture).

(4) With a color motion picture as the object, then with respect to YUV format and RGB format and the like, separate information can be embedded in the respective information portions.

(5) To the extent that there is no influence on each other, then a plurality of information can be embedded using an individual block size partitioning method.

(6) Since information embedding is performed for each frame, then the technology is also applicable to still images.

(7) By using the error correcting code, then an appropriate robustness can be obtained with respect to compression and compilation of the picture.

(8) By performing random number initialization at an appropriate frame unit, information can be read from an optional frame of a motion picture (including a still image).

(9) By using local characteristics of the picture, information embedding is possible such that degradation cannot be perceived by the human eye.

With the present invention as described above by the respective embodiments, the following effects can be obtained:

1) Since embedding is performed by changing some of the coefficient values in the orthogonal transform coefficient matrix using a random number, then to the extent that there is no influence on each other, a plurality of information can be embedded using different information embedding keys.

2) With a motion picture or still image, by embedding information in a place which is not susceptible to influence from information compression (a low frequency component), then even if noise addition or compression processing is performed, reading of the embedded information can be reliably carried out.

3) At the time of reading the embedded information, by weighting according to the reliability of the information read from each block, then the accuracy of the read information can be improved.

4) By obtaining the embedded bit information from the quantization coefficient value, then the embedded information can be read without using the original information. Moreover, the embedded information can also be read using the original information, and in this case the accuracy of the read information is improved.

5) Since the function of block division/orthogonal transform and the like, can be realized to the extent that a number of functions can be added to a motion picture coder/decoder, then is it easy to realize real time processing.

The information embedding method, the information read method and their respective apparatus can be realized by combining together the above-mentioned respective embodiments.

Moreover, with the above embodiments, examples of two-dimensional and three-dimensional orthogonal transforms have been described as the orthogonal transform. However, a one-dimensional orthogonal transform can be used with the information embedding block in one dimension.

Furthermore, the above-mentioned information embedding methods, information read methods and their respective apparatus are not only applicable to motion pictures and still image data, but can also be applied to voice and musical data and so on.

In addition, a program for realizing the functions of the above-mentioned information embedding apparatus or information reading apparatus can be recorded on a recording medium which can be read by a computer. The information embedding or reading can then be performed by reading the program recorded on the recording medium into a computer and executing the program. The computer system mentioned here includes the operating system and hardware such as peripheral devices.

Moreover, the information embedding methods, information read methods and their respective apparatus according to the present invention, are applicable to contents distribution systems for voice, musical, still image, and movies. As a result the following effects can be obtained:

1) By embedding user information at the time of contents distribution, illegal copying can be prevented.

2) By embedding beforehand in the contents, copyright information related to the authors name and the like, then the user can be easily informed of the copyright information, so that legitimate secondary use can be facilitated and reuse of the contents promoted.

3) By embedding a copy management signal such as used in DVDs (Digital Video Discs), copy protection which is more secure than at present can be realized.

In addition as applications to other fields, the following can be considered:

1) To a system for preventing, when face picture data of a lawful owner is embedded in a commuter's pass, the unlawful use of the pass, by judging at the time of passing through a ticket gate, if the user and the lawful owner are the same person.

2) To a digital data authenticity judgment system which can detect, at the time of embedding recording circumstances (time, ID etc. of recorder parts) when recording voice, musical, static image, motion picture digital data, that the recorded data has been processed or edited.

Moreover, for the applicable areas of the information embedding methods, information read methods and their respective apparatus according to the present invention, the following areas can be considered:

1) Internet

2) Digital broadcasting Use for copyright presentation and operation of household accepting stations, by embedding information in the information contents for digital broadcasting using satellite, ground waves, optical cable or the like.

3) Package media Use for copyright presentation or picture recording/playback equipment operation, by enclosing information contents which have been previously embedded with information, in package media such as DVD, photo-CD, Video-CD, Digital-Video.

What is claimed is:

1. A method of embedding information comprising:

a blocking step for dividing original data into blocks;

an orthogonal transform step for obtaining coefficients by performing an orthogonal transformation for each block;

an embedding coefficient selecting step for determining coefficients in which watermark-information will be embedded by using a random sequence which is generated by initial value;

an information embedding step for sequentially embedding watermark-information, which has arbitrary length of bits, by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form, wherein in said orthogonal transform step said orthogonal transform is a three dimensional orthogonal transform, and in said inverse orthogonal transform step, said inverse orthogonal transform is a three dimensional inverse orthogonal transform, in said information embedding step, the entropy of the data value of the block to be processed is utilized for determining said predetermined value for quantization; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

2. A method of embedding information comprising:

a blocking step for dividing original data into blocks;

an orthogonal transform step for obtaining coefficients by performing an orthogonal transformation for each block;

an embedding coefficient selecting step for determining coefficients in which watermark-information will be embedded by using a random sequence which is generated by initial value;

an information embedding step for sequentially embedding watermark-information, which has arbitrary length of bits, by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form, wherein in said orthogonal transform step said orthogonal transform is a three dimensional orthogonal transform, and in said inverse orthogonal transform step, said inverse orthogonal transform is a three dimensional inverse orthogonal transform, in said orthogonal transform step, the block from said blocking step is down-sampled so that the block size is smaller, after which the down-sampled block is orthogonally transformed to obtain the orthogonal transform coefficient, in said inverse orthogonal transform step, after inverse orthogonally transforming the orthogonal transform coefficients obtained by said information embedding step, up sampling is performed so as to give a block of the size prior to down-sampling by said blocking step, in said information embedding step, the entropy of the data value of the block to be processed is utilized for determining said predetermined value for quantization; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

3. A method of embedding information comprising:

a blocking step for dividing original data into blocks;

an orthogonal transform step for obtaining coefficients by performing an orthogonal transformation for each block;

an embedding coefficient selecting step for determining coefficients in which watermark-information will be embedded by using a random sequence which is generated by initial value;

an information embedding step for sequentially embedding watermark-information, which has arbitrary length of bits, by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form, wherein in said orthogonal transform step said orthogonal transform is a three dimensional orthogonal transform, and in said inverse orthogonal transform step, said inverse orthogonal transform is a three dimensional inverse orthogonal transform, in said orthogonal transform step, the block from said blocking step is down-sampled so that the block size is smaller, after which the down-sampled block is orthogonally transformed to obtain the orthogonal transform coefficient, in said inverse orthogonal transform step, after inverse orthogonally transforming the orthogonal transform coefficients obtained by said information embedding step, up sampling is performed so as to give a block of the size prior to down-sampling by said blocking step, in said information embedding step, a value of a low frequency domain in the orthogonal transform coefficient obtained by said orthogonal transform step is utilized for normalizing the orthogonal transform coefficients; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

4. A method of embedding information comprising:

a blocking step for dividing original data into blocks;

an orthogonal transform step for obtaining coefficients by performing an orthogonal transformation for each block;

an embedding coefficient selecting step for determining coefficients in which watermark-information will be embedded by using a random sequence which is generated by initial value;

an information embedding step for sequentially embedding watermark-information, which has arbitrarm length of bits by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form, wherein in said orthogonal transform step said orthogonal transform is a three dimensional orthogonal transform, and in said inverse orthogonal transform step, said inverse orthogonal transform is a three dimensional inverse orthogonal transform, in said information embedding step, a value of a low frequency domain in the orthogonal transform coefficient obtained by said orthogonal transform step is utilized for normalizing the orthogonal transform coefficients; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

5. A method of embedding information comprising:

a blocking step for dividing original data into blocks;

an orthogonal transform step for obtaining coefficients by performing an orthogonal transformation for each block;

an embedding coefficient selecting step for determining coefficients in which the watermark-information will be embedded by using a random sequence which is generated by initial value;

an information embedding step for sequentially embedding watermark-information, which has arbitrary length of bits, by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form wherein in said information embedding step, the entropy of the data value of the block to be processed is utilized for determining said predetermined value for quantization; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

6. A method of reading information from data embedded with information by the method according to claim 5 comprising:

a blocking step for dividing said data into blocks;

an embedding coefficient selecting step for determining coefficients from which the watermark-information will be read by using a random sequence which is generated by the initial value which is used at the time of embedding the watermark-information;

an object coefficient computing step for obtaining the coefficients by carrying out orthogonal transformation for each block; and a bit reading step for sequentially reading each bit of the embedded watermark-information and outputting the read watermark-information wherein in said bit reading step, the entropy of the data value of the block to be processed is utilized for determining said predetermined value for quantization.

7. A method of reading information according to claim 6, wherein in said object coefficient computing step, said orthogonal transform is an orthogonal transform of a dimension corresponding to the dimension number of the orthogonal transform used at the time of information embedding.

8. A method of reading information according to claim 7, wherein in the case where down-sampling of the block is carried out at the time of information embedding, then in said object coefficient computing step, an orthogonal transform coefficient is obtained from the block which is down-sampled so that the block obtained from said blocking step is the same.

9. A method of reading information according to claim 6, wherein in the case where down-sampling of the block is carried out at the time of information embedding, then in said object coefficient computing step, an orthogonal transform coefficient is obtained from the block which is down-sampled so that the block obtained from said blocking step is the same.

10. A method of embedding information according to claim 5, wherein in said orthogonal transform step said orthogonal transform is a two dimensional orthogonal transform, and in said inverse orthogonal transform step, said inverse orthogonal transform is a two dimensional inverse orthogonal transform.

11. A method of embedding information according to claim 10, wherein in said orthogonal transform step, the block from said blocking step is down-sampled so that the block size is smaller, after which the down-sampled block is orthogonally transformed to obtain the orthogonal transform coefficient, and in said inverse orthogonal transform step, after inverse orthogonally transforming the orthogonal transform coefficients obtained by said information embedding step, up sampling is performed so as to give a block of the size prior to down-sampling by said blocking step.

12. A method of embedding information according to claim 5, wherein in said orthogonal transform step, the block from said blocking step is down-sampled so that the block size is smaller, after which the down-sampled block is orthogonally transformed to obtain the orthogonal transform coefficient, and in said inverse orthogonal transform step, after inverse orthogonally transforming the orthogonal transform coefficients obtained by said information embedding step, up sampling is performed so as to give a block of the size prior to down-sampling by said blocking step.

13. A method of embedding information comprising:

a blocking step for dividing original data into blocks;

an orthogonal transform step for obtaining coefficients by performing an orthogonal transformation for each block;

an embedding coefficient selecting step for determining coefficients in which watermark-information will be embedded by using a random sequence which is generated by initial value;

an information embedding step for sequentially embedding watermark-information, which has arbitrary length of bits, by quantizing value of said coefficients using a predetermined value for quantization; and an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form wherein in said information embedding step, a value of a low frequency domain in the orthogonal transform coefficient obtained by said orthogonal transform step is utilized for normalizing the orthogonal transform coefficients; and in said inverse orthogonal transform step, when the orthogonal transform coefficient obtained by said information embedding step is inverse orthogonal transformed, processing is further performed so that the value after the inverse orthogonal transform does not exceed a defined range of pixel values of the original data form.

14. A method of reading information from data embedded with information by the method according to claim 13 comprising:

a blocking step for dividing said data into blocks;

an embedding coefficient selecting step for determining coefficients from which the watermark-information will be read by using a random sequence which is generated by the initial value which is used at the time of embedding the watermark-information;

an object coefficient computing step for obtaining the coefficients by carrying out orthogonal transformation for each block; and a bit reading step for sequentially reading each bit of the embedded watermark-information and outputting the read watermark-information wherein in said bit reading step, the orthogonal transform coefficient of the low frequency domain in the orthogonal transform coefficients is utilized for normalizing the orthogonal transform coefficients.

15. A method of reading information according to claim 14, wherein in said object coefficient computing step, said orthogonal transform is an orthogonal transform of a dimension corresponding to the dimension number of the orthogonal transform used at the time of information embedding.

16. A method of reading information according to claim 15, wherein in the case where down-sampling of the block is carried out at the time of information embedding, then in said object coefficient computing step, an orthogonal transform coefficient is obtained from the block which is down-sampled so that the block obtained from said blocking step is the same.

17. A method of reading information according to claim 14, wherein in the case where down-sampling of the block is carried out at the time of information embedding, then in said object coefficient computing step, an orthogonal transform coefficient is obtained from the block which is down-sampled so that the block obtained from said blocking step is the same.

18. A method of embedding information according to claim 13, wherein in said orthogonal transform step said orthogonal transform is a two dimensional orthogonal transform, and in said inverse orthogonal transform step, said inverse orthogonal transform is a two dimensional inverse orthogonal transform.

19. A method of embedding information according to claim 18, wherein in said orthogonal transform step, the block from said blocking step is down-sampled so that the block size is smaller, after which the down-sampled block is orthogonally transformed to obtain the orthogonal transform coefficient, and in said inverse orthogonal transform step, after inverse orthogonally transforming the orthogonal transform coefficients obtained by said information embedding step, up sampling is performed so as to give a block of the size prior to down-sampling by said blocking step.

20. A method of embedding information according to claim 13, wherein in said orthogonal transform step, the block from said blocking step is down-sampled so that the block size is smaller, after which the down-sampled block is orthogonally transformed to obtain the orthogonal transform coefficient, and in said inverse orthogonal transform step, after inverse orthogonally transforming the orthogonal transform coefficients obtained by said information embedding step, up sampling is performed so as to give a block of the size prior to down-sampling by said blocking step.

21. A method of embedding information according to claim 13, wherein said information embedding step comprises the steps of:

calculating a mean value of coefficients of the low frequency domain in the orthogonal transform coefficient obtained by said orthogonal transform step;

obtaining a ratio between the mean value and a prescribed fixed value;

normalizing all the orthogonal transform coefficient by multiplying by the ratio;

embedding the watermark-information into the normalized coefficients; and inverse-normalizing the information-embedded coefficients by dividing by the ratio.

22. A method of reading information according to claim 14, wherein, when the watermark-information was embedded by the method of claim 21, said bit reading step comprises the steps of:
- calculating mean value of coefficients of the low frequency domain in the orthogonal transform coefficient obtained by said object coefficient computing step;
- obtaining a ratio between the mean value and a prescribed fixed value;
- normalizing all the orthogonal transform coefficient by multiplying by the ratio; and
- reading each bit of the embedded watermark-information from the normalized coefficients.

23. A method of embedding information comprising:
- a blocking step for dividing original data into blocks;
- an orthogonal transform step for obtaining coefficients by performing an orthogonal transformation for each block;
- an embedding coefficient selecting step for determining coefficients in which watermark-information will be embedded by using a random sequence which is generated by initial value;
- an information embedding step for sequentially embedding watermark-information, which has arbitrary length of bits, by quantizing value of said coefficients using a predetermined value for quantization; and
- an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form wherein in said inverse orthogonal transform step,
- when the orthogonal transform coefficient obtained by said information embedding step is inverse orthogonal transformed, processing is further performed by utilizing two pixel matrixes, one pixel matrix is obtained by;
- changing a DC component value of the orthogonal transform coefficient obtained by said information embedding step to the minimum value of a defined range;
- changing all values of the embedded coefficients to 0; and inverse-orthogonal-transforming the changed matrix; and the other pixel matrix is obtained by;
- changing a DC component of the orthogonal transform coefficient obtained by said information embedding step to 0;
- changing all values of the non-embedded coefficients to 0; and
- inverse-orthogonal-transforming the changed matrix; so that the value after inverse orthogonal transform does not exceed a defined range of pixel value of the original data form.

24. A method of embedding information according to claim 23, wherein in said inverse orthogonal transform step,
- the processing so that the value after inverse orthogonal transform does not exceed a defined range, uses the data obtained by said inverse orthogonal transform, and the whole data is reduced with the mean value of the data as the center.

25. A method of embedding information comprising:
- a blocking step for dividing original data into blocks;
- an orthogonal transform step for obtaining coefficients by performing an orthogonal transformation for each block;
- an embedding coefficient selecting step for determining coefficients in which watermark-information will be embedded by using a random sequence which is generated by initial value;
- an information embedding step for sequentially embedding watermark-information, which has arbitrary length of bits, by quantizing value of said coefficients using a predetermined value for quantization; and
- an inverse orthogonal transform step for carrying out inverse orthogonal transformation for embedded coefficients and non-embedded coefficients to form a block in which the watermark-information is embedded, as well as combining embedded blocks and to reconstruct data which is homogeneous to the original data form wherein in said inverse orthogonal transform step,
- when the orthogonal transform coefficient obtained by said information embedding step is inverse orthogonal transformed, processing is further performed so that the value after inverse orthogonal transform does not exceed a defined range of pixel values of the original data form.

26. An apparatus for embedding information comprising:
a blocking section for dividing original data into blocks;
- an orthogonal transform section for obtaining coefficients by performing an orthogonal transformation for each block;
- an embedding coefficient selecting section for determining coefficients in which watermark-information will be embedded by using a random sequence which is generated by initial value;
- an information embedding section for sequentially embedding watermark-information, which has arbitrary length of bits, by quantizing value of said coefficients using a predetermined value for quantization; and
- an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form,
- wherein in said orthogonal transform section said orthogonal transform is a three dimensional orthogonal transform, and in said inverse orthogonal transform section, said inverse orthogonal transform is a three dimensional inverse orthogonal transform,
- in said orthogonal transform section, the block from said blocking section is down-sampled so that the block size is smaller, after which he down-sampled block is orthogonally transformed to obtain the orthogonal transform coefficient,
- in said inverse orthogonal transform section, after inverse orthogonally transforming the orthogonal transform coefficients obtained in said information embedding section, up sampling is performed so as to give a block of the size prior to down-sampling in said blocking section,
- in said information embedding section, the entropy of the data value of the block to be processed is utilized for determining said predetermined value for quantization; and
- in said inverse orthogonal transform section, when the orthogonal transform coefficient obtained in said information embedding section is inverse orthogonal transformed, processing is further performed so that the value after the inverse orthogonal transform does not exceed a defined range of pixel values of the original data form.

27. An apparatus for embedding information comprising:
a blocking section for dividing original data into blocks;
an orthogonal transform section for obtaining coefficients by performing an orthogonal transformation for each block;
an embedding coefficient selecting section for determining coefficients in which watermark-information will be embedded by using a random sequence which is generated by initial value;
an information embedding section for sequentially embedding watermark-information, which has arbitrary length of bits, by quantizing value of said coefficients using a predetermined value for quantization; and
an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form,
wherein in said orthogonal transform section said orthogonal transform is a three dimensional orthogonal transform, and in said inverse orthogonal transform section, said inverse orthogonal transform is a three dimensional inverse orthogonal transform,
in said orthogonal transform section, the block from said blocking section is down-sampled so that the block size is smaller, after which the down-sampled block is orthogonally transformed to obtain the orthogonal transform coefficient,
in said inverse orthogonal transform section, after inverse orthogonally transforming the orthogonal transform coefficients obtained in said information embedding section, up sampling is performed so as to give a block of the size prior to down-sampling in said blocking section,
in said information embedding section, a value of a low frequency domain in the orthogonal transform coefficient obtained in said orthogonal transform section is utilized for normalizing the orthogonal transform coefficients; and
in said inverse orthogonal transform section, when the orthogonal transform coefficient obtained in said information embedding section is inverse orthogonal transformed, processing is further performed so that the value after the inverse orthogonal transform does not exceed a defined range of pixel values of the original data form.

28. An apparatus for embedding information comprising:
a blocking section for dividing original data into blocks;
an orthogonal transform section for obtaining coefficients by performing an orthogonal transformation for each block;
an embedding coefficient selecting section for determining coefficients in which watermark-information will be embedded by using a random sequence which is generated by initial value;
an information embedding section for sequentially embedding watermark-information, which has arbitrary length of bits, by quantizing value of said coefficients using a predetermined value for quantization; and
an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form,
wherein in said orthogonal transform section said orthogonal transform is a three dimensional orthogonal transform, and in said inverse orthogonal transform section, said inverse orthogonal transform is a three dimensional inverse orthogonal transform,
in said information embedding section, the entropy of the data value of the block to be processed is utilized for determining said predetermined value for quantization; and
in said inverse orthogonal transform section, when the orthogonal transform coefficient obtained in said information embedding section is inverse orthogonal transformed, processing is further performed so that the value after the inverse orthogonal transform does not exceed a defined range of pixel values of the original data form.

29. An apparatus for embedding information comprising:
a blocking section for dividing original data into blocks;
an orthogonal transform section for obtaining coefficients by performing an orthogonal transformation for each block;
an embedding coefficient selecting section for determining coefficients in which watermark-information will be embedded by using a random sequence which is generated by initial value;
an information embedding section for sequentially embedding watermark-information, which has arbitrary length of bits, by quantizing value of said coefficients using a predetermined value for quantization; and
an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form,
wherein in said orthogonal transform section said orthogonal transform is a three dimensional orthogonal transform, and in said inverse orthogonal transform section, said inverse orthogonal transform is a three dimensional inverse orthogonal transform,
in said information embedding section, a value of a low frequency domain in the orthogonal transform coefficient obtained in said orthogonal transform section is utilized for normalizing the orthogonal transform coefficients; and
in said inverse orthogonal transform section, when the orthogonal transform coefficient obtained in said information embedding section is inverse orthogonal transformed, processing is further performed so that the value after the inverse orthogonal transform does not exceed a defined range of pixel values of the original data form.

30. An apparatus for embedding information comprising:
a blocking section for dividing original data into blocks;
an orthogonal transform section for obtaining coefficients by performing an orthogonal transformation for each block;
an embedding coefficient selecting section for determining coefficients in which watermark-information will be embedded by using a random sequence which is generated by initial value;

an information embedding section for sequentially embedding watermark-information, which has arbitrary length of bits, by quantizing value of said coefficients using a predetermined value for quantization; and an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form wherein in said information embedding section, the entropy of the data value of the block to be processed is utilized for determining said predetermined value for quantization; and in said inverse orthogonal transform section, when the orthogonal transform coefficient obtained in said information embedding section is inverse orthogonal transformed, processing is further performed so that the value after the inverse orthogonal transform does not exceed a defined range of pixel values of the original data form.

31. An apparatus for embedding information according to claim 30, wherein in said orthogonal transform section said orthogonal transform is a two dimensional orthogonal transform, and in said inverse orthogonal transform section, said inverse orthogonal transform is a two dimensional inverse orthogonal transform.

32. An apparatus for embedding information according to claim 31, wherein in said orthogonal transform section, the block from said blocking section is down-sampled so that the block size is smaller, after which the down-sampled block is orthogonally transformed to obtain the orthogonal transform coefficient, and in said inverse orthogonal transform section, after inverse orthogonally transforming the orthogonal transform coefficients obtained by said information embedding step, up sampling is performed so as to give a block of the size prior to down-sampling in said blocking section.

33. An apparatus for embedding information according to claim 30, wherein in said orthogonal transform section, the block from said blocking section is down-sampled so that the block size is smaller, after which the down-sampled block is orthogonally transformed to obtain the orthogonal transform coefficient, and in said inverse orthogonal transform section, after inverse orthogonally transforming the orthogonal transform coefficients obtained in said information embedding section, up sampling is performed so as to give a block of the size prior to down-sampling in said blocking section.

34. An apparatus for embedding information comprising:

a blocking section for dividing original data into blocks;

an orthogonal transform section for obtaining coefficients by performing an orthogonal transformation for each block;

an embedding coefficient selecting section for determining coefficients in which watermark-information will be embedded by using a random sequence which is generated by initial value;

an information embedding section for sequentially embedding watermark-information, which has arbitrary length of bits, by quantizing value of said coefficients using a predetermined value for quantization; and an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form wherein in said information embedding section, a value of a low frequency domain in the orthogonal transform coefficient obtained in said orthogonal transform section is utilized for normalizing the orthogonal transform coefficients; and in said inverse orthogonal transform section, when the orthogonal transform coefficient obtained in said information embedding step is inverse orthogonal transformed, processing is further performed so that the value after the inverse orthogonal transform does not exceed a defined range of pixel values of the original data form.

35. An apparatus for embedding information according to claim 34, wherein in said orthogonal transform section said orthogonal transform is a two dimensional orthogonal transform, and in said inverse orthogonal transform section, said inverse orthogonal transform is a two dimensional inverse orthogonal transform.

36. An apparatus for embedding information according to claim 35, wherein in said orthogonal transform section, the block from said blocking section is down-sampled so that the block size is smaller, after which the down-sampled block is orthogonally transformed to obtain the orthogonal transform coefficient, and in said inverse orthogonal transform section, after inverse orthogonally transforming the orthogonal transform coefficients obtained in said information embedding section, up sampling is performed so as to give a block of the size prior to down-sampling by said blocking section.

37. An apparatus for embedding information according to claim 34, wherein in said orthogonal transform section, the block from said blocking section is down-sampled so that the block size is smaller, after which the down-sampled block is orthogonally transformed to obtain the orthogonal transform coefficient, and in said inverse orthogonal transform section, after inverse orthogonally transforming the orthogonal transform coefficients obtained in said nation embedding section, up sampling is performed so as to give a block of the size prior to down-sampling in said blocking section.

38. An apparatus for embedding information according to claim 34, wherein said information embedding section comprises the steps of:

means for calculating a mean value of coefficients of the low frequency domain in the orthogonal transform coefficient obtained in said orthogonal transform section;

means for obtaining a ratio between the mean value and a prescribed fixed value;

means for normalizing all the orthogonal transform coefficient by multiplying by the ratio;

means for embedding the watermark-information into the normalized coefficients; and means for inverse-normalizing the information-embedded coefficients by dividing by the ratio.

39. An apparatus for embedding information comprising:

a blocking section for dividing original data into blocks;

an orthogonal transform section for obtaining coefficients by performing an orthogonal transformation for each block;

an embedding coefficient selecting section for determining coefficients in which watermark-information will be embedded by using a random sequence which is generated by initial value;

an information embedding section for sequentially embedding watermark-information, which has arbitrary length of bits, by quantizing value of said coefficients using a predetermined value for quantization; and an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form wherein in said inverse orthogonal transform step, when the orthogonal transform coefficient obtained in said information embedding section is inverse orthogonal transformed, processing is further performed by utilizing two pixel matrixes, one pixel matrix is obtained by;

changing a DC component value of the orthogonal transform coefficient obtained in said information embedding section to the minimum value of a defined range;

changing all values of the embedded coefficients to 0; and inverse-orthogonal-transforming the changed matrix; and the other pixel matrix is obtained by;

changing a DC component of the orthogonal transform coefficient obtained by said information embedding step to 0;

changing all values of the non-embedded coefficients to 0; and inverse-orthogonal-transforming the changed matrix; so that the value after inverse orthogonal transform does not exceed a defined range of pixel value of the original data form.

40. An apparatus for embedding information according to claim 39, wherein in said inverse orthogonal transform section, the processing so that the value after inverse orthogonal transform does not exceed a defined range, uses the data obtained by said inverse orthogonal transform, and the whole data is reduced with the mean value of the data as the center.

41. An apparatus for embedding information comprising:

a blocking section for dividing original data into blocks;

an orthogonal transform section for obtaining coefficients by performing an orthogonal transformation for each block;

an embedding coefficient selecting section for determining coefficients in which watermark-information will be embedded by using a random sequence which is generated by initial value;

an information embedding section for sequentially embedding watermark-information, which has arbitrary length of bits, by quantizing value of said coefficients using a predetermined value for quantization; and an inverse orthogonal transform section for carrying out inverse orthogonal transformation for embedded coefficients and non-embedded coefficients to form a block in which the watermark-information is embedded, as well as combining embedded blocks and to reconstruct data which is homogeneous to the original data form wherein in said inverse orthogonal transform section, when the orthogonal transform coefficient obtained in said information embedding section is inverse orthogonal transformed, processing is further performed so that the value after inverse orthogonal transform does not exceed a defined range of pixel values of the original data form.

42. An apparatus for reading information from data embedded with information by the method according to claim 5 comprising:

a blocking section for dividing said data into blocks;

an embedding coefficient selecting section for determining coefficients from which the watermark-information will be read by using a random sequence which is generated by the initial value which is used at the time of embedding the watermark-information;

an object coefficient computing section for obtaining the coefficients by carrying out orthogonal transformation for each block; and a bit reading section for sequentially reading each bit of the embedded watermark-information and outputting the read watermark-information wherein in said bit reading section, the entropy of the data value of the block to be processed is utilized for determining said predetermined value for quantization.

43. An apparatus for reading information according to claim 42, wherein in said object coefficient computing section, said orthogonal transform is an orthogonal transform of a dimension corresponding to the dimension number of the orthogonal transform used at the time of information embedding.

44. An apparatus for reading information according to claim 43, wherein in the case where down-sampling of the block is carried out at the time of information embedding, then in said object coefficient computing section, an orthogonal transform coefficient is obtained from the block which is down-sampled so that the block obtained from said blocking section is the same.

45. An apparatus for reading information according to claim 42, wherein in the case where down-sampling of the block is carried out at the time of information embedding, then in said object coefficient computing section, an orthogonal transform coefficient is obtained from the block which is down-sampled so that the block obtained from said blocking section is the same.

46. An apparatus for reading information from data embedded with information by the method according to claim 13 comprising:

a blocking section for dividing said data into blocks;

an embedding coefficient selecting section for determining coefficients from which the watermark-information will be read by using a random sequence which is generated by the initial value which is used at the time of embedding the watermark-information;

an object coefficient computing section for obtaining the coefficients by carrying out orthogonal transformation for each block; and a bit reading section for sequentially reading each bit of the embedded watermark-information and outputting the read watermark-information wherein in said bit reading section, the orthogonal transform coefficient of the low frequency domain in the orthogonal transform coefficients is utilized for normalizing the orthogonal transform coefficients.

47. An apparatus for reading information according to claim 46, wherein in said object coefficient computing section,
said orthogonal transform is an orthogonal transform of a dimension corresponding to the dimension number of the orthogonal transform used at the time of information embedding.

48. An apparatus for reading information according to claim 47, wherein in the case where down-sampling of the block is carried out at the time of information embedding,
then in said object coefficient computing section, an orthogonal transform coefficient is obtained from the block which is down-sampled so that the block obtained from said blocking section is the same.

49. An apparatus for reading information according to claim 46, wherein, when the watermark-information was embedded according to claim 38, said bit reading section comprises:
means for calculating mean value of coefficients of the low frequency domain in the orthogonal transform coefficient obtained in said object coefficient computing section;
means for obtaining a ratio between the mean value and a prescribed fixed value;
means for normalizing all the orthogonal transform coefficient by multiplying by the ratio; and
means for reading each bit of the embedded watermark-information from the normalized coefficients.

50. An apparatus for reading information according to claim 46, wherein in the case where down-sampling of the block is carried out at the time of information embedding,
then in said object coefficient computing section, an orthogonal transform coefficient is obtained from the block which is down-sampled so that the block obtained from said blocking section is the same.

51. A recording medium which can be read by a computer and on which is recorded an information embedding program for realizing on a computer:
a blocking function for dividing original data into blocks;
an orthogonal transform function for obtaining coefficients by performing an orthogonal transformation for each block;
an embedding coefficient selecting function for determining coefficients in which watermark-information will be embedded by using a random sequence which is generated by initial value;
an information embedding function for sequentially embedding watermark-information, which has arbitrary length of bits, by quantizing value of said coefficients using a predetermined value for quantization; and
an inverse orthogonal transform function for carrying out inverse orthogonal transformation for embedded coefficients and non-embedded coefficients to form a block in which the watermark-information is embedded, as well as combining embedded blocks and to reconstruct data which is homogeneous to the original data form,
wherein in said orthogonal transform section said orthogonal transform is a three dimensional orthogonal transform, and in said inverse orthogonal transform section, said inverse orthogonal transform is a three dimensional inverse orthogonal transform,
in said orthogonal transform function, the block from said blocking function is down-sampled so that the block size is smaller, after which the down-sampled block is orthogonally transformed to obtain the orthogonal transform coefficient,
in said inverse orthogonal transform function, after inverse orthogonally transforming the orthogonal transform coefficients obtained in said information embedding function, up sampling is performed so as to give a block of the size prior to down-sampling in said blocking function,
in said information embedding function, the entropy of the data value of the block to be processed is utilized for determining said predetermined value for quantization; and
in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

52. A recording medium which can be read by a computer and on which is recorded an information embedding program for realizing on a computer:
a blocking function for dividing original data into blocks;
an orthogonal transform function for obtaining coefficients by performing an orthogonal transformation for each block;
an embedding coefficient selecting function for determining coefficients in which watermark-information will be embedded by using a random sequence which is generated by initial value;
an information embedding function for sequentially embedding watermark-information, which has arbitrary length of bits, by quantizing value of said coefficients using a predetermined value for quantization; and
an inverse orthogonal transform function for carrying out inverse orthogonal transformation for embedded coefficients and non-embedded coefficients to form a block in which the watermark-information is embedded, as well as combining embedded blocks and to reconstruct data which is homogeneous to the original data form,
wherein in said orthogonal transform section said orthogonal transform is a three dimensional orthogonal transform, and in said inverse orthogonal transform section, said inverse orthogonal transform is a three dimensional inverse orthogonal transform,
in said orthogonal transform function, the block from said blocking function is down-sampled so that the block size is smaller, after which the down-sampled block is orthogonally transformed to obtain the orthogonal transform coefficient,
in said inverse orthogonal transform function, after inverse orthogonally transforming the orthogonal transform coefficients obtained in said information embedding function, up sampling is performed so as to give a block of the size prior to down-sampling in said blocking function,
in said information embedding function, a value of a low frequency domain in the orthogonal transform coefficient obtained in said orthogonal transform function is utilized for normalizing the orthogonal transform coefficients; and in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

53. A recording medium which can be read by a computer and on which is recorded an information embedding program for realizing on a computer:
- a blocking function for dividing original data into blocks;
- an orthogonal transform function for obtaining coefficients by performing an orthogonal transformation for each block;
- an embedding coefficient selecting function for determining coefficients in which watermark-information will be embedded by using a random sequence which is generated by initial value;
- an information embedding function for sequentially embedding watermark-information, which has arbitrary length of bits, by quantizing value of said coefficients using a predetermined value for quantization; and
- an inverse orthogonal transform function for carrying out inverse orthogonal transformation for embedded coefficients and non-embedded coefficients to form a block in which the watermark-information is embedded, as well as combining embedded blocks and to reconstruct data which is homogeneous to the original data form,
- wherein in said orthogonal transform section said orthogonal transform is a three dimensional orthogonal transform, and in said inverse orthogonal transform section, said inverse orthogonal transform is a three dimensional inverse orthogonal transform,
- in said information embedding function, the entropy of the data value of the block to be processed is utilized for determining said predetermined value for quantization; and
- in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

54. A recording medium which can be read by a computer and on which is recorded an information embedding program for realizing on a computer:
- a blocking function for dividing original data into blocks;
- an orthogonal transform function for obtaining coefficients by performing an orthogonal transformation for each block;
- an embedding coefficient selecting function for determining coefficients in which watermark-information will be embedded by using a random sequence which is generated by initial value;
- an information embedding function for sequentially embedding watermark-information, which has arbitrary length of bits, by quantizing value of said coefficients using a predetermined value for quantization; and
- an inverse orthogonal transform function for carrying out inverse orthogonal transformation for embedded coefficients and non-embedded coefficients to form a block in which the watermark-information is embedded, as well as combining embedded blocks and to reconstruct data which is homogeneous to the original data form,
- wherein in said orthogonal transform section said orthogonal transform is a three dimensional orthogonal transform, and in said inverse orthogonal transform section, said inverse orthogonal transform is a three dimensional inverse orthogonal transform,
- in said information embedding function, a value of a low frequency domain in the orthogonal transform coefficient obtained in said orthogonal transform function is utilized for normalizing the orthogonal transform coefficients; and
- in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

55. A recording medium which can be read by a computer and on which is recorded an information embedding program for realizing on a computer:
- a blocking function for dividing original data into blocks;
- an orthogonal transform function for obtaining coefficients by performing an orthogonal transformation for each block;
- an embedding coefficient selecting function for determining coefficients in which watermark-information will be embedded by using a random sequence which is generated by initial value;
- an information embedding function for sequentially embedding watermark-information, which has arbitrary length of bits, by quantizing value of said coefficients using a predetermined value for quantization; and
- an inverse orthogonal transform function for carrying out inverse orthogonal transformation for determining embedded coefficients and non-embedded coefficients to form a block in which the watermark-information is embedded, as well as combining embedded blocks and to reconstruct data which is homogeneous to the original data form wherein
  - in said information embedding function, the entropy of the data value of the block to be processed is utilized for determining said predetermined value for quantization; and
  - in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

56. A recording medium according to claim 55, wherein in said orthogonal transform function said orthogonal transform is a two dimensional orthogonal transform, and in said inverse orthogonal transform function, said inverse orthogonal transform is a two dimensional inverse orthogonal transform.

57. A recording medium according to claim 56, wherein in said orthogonal transform function,
- the block from said blocking function is down-sampled so that the block size is smaller, after which the down-sampled block is orthogonally transformed to obtain the orthogonal transform coefficient, and
- in said inverse orthogonal transform function, after inverse orthogonally transforming the orthogonal transform coefficients obtained in said information embedding function, up sampling is performed so as to give a block of the size prior to down-sampling in said blocking function.

58. A recording medium according to claim 55, wherein in said orthogonal transform function, the block from said blocking function is down-sampled so that the block size is smaller, after which the down-sampled block is orthogonally transformed to obtain the orthogonal transform coefficient, and in said inverse orthogonal transform function, after inverse orthogonally transforming the orthogonal transform coefficients obtained in said information embedding function, up sampling is performed so as to give a block of the size prior to down-sampling in said blocking function.

59. A recording medium which can be read by a computer and on which is recorded an information embedding program for realizing on a computer:

a blocking function for dividing original data into blocks;

an orthogonal transform function for obtaining coefficients by performing an orthogonal transformation for each block;

an embedding coefficient selecting function for determining coefficients in which watermark-information will be embedded by using a random sequence which is generated by initial value;

an information embedding function for sequentially embedding watermark-information, which has arbitrary length of bits, by quantizing value of said coefficients using a predetermined value for quantization; and an inverse orthogonal transform function for carrying out inverse orthogonal transformation for determining embedded coefficients and non-embedded coefficients to form a block in which the watermark-information is embedded, as well as combining embedded blocks and to reconstruct data which is homogeneous to the original data form wherein in said information embedding function, a value of a low frequency domain in the orthogonal transform coefficient obtained in said orthogonal transform function is utilized for normalizing the orthogonal transform coefficients; and in said inverse orthogonal transform function, when the orthogonal transform coefficient obtained in said information embedding function is inverse orthogonal transformed, processing is further performed so that the value after the inverse orthogonal transform does not exceed a defined range of pixel values of the original data form.

60. A recording medium according to claim 59, wherein in said orthogonal transform function said orthogonal transform is a two dimensional orthogonal transform, and in said inverse orthogonal transform function, said inverse orthogonal transform is a two dimensional inverse orthogonal transform.

61. A recording medium according to claim 60, wherein in said orthogonal transform function, the block from said blocking function is down-sampled so that the block size is smaller, after which the down-sampled block is orthogonally transformed to obtain the orthogonal transform coefficient, and in said inverse orthogonal transform function, after inverse orthogonally transforming the orthogonal transform coefficients obtained in said information embedding function, up sampling is performed so as to give a block of the size prior to down-sampling in said blocking function.

62. A recording medium according to claim 59, wherein in said orthogonal transform function, the block from said blocking function is down-sampled so that the block size is smaller, after which the down-sampled block is orthogonally transformed to obtain the orthogonal transform coefficient, and in said inverse orthogonal transform function, after inverse orthogonally transforming the orthogonal transform coefficients obtained in said information embedding function, up sampling is performed so as to give a block of the size prior to down-sampling in said blocking function.

63. A recording medium according to claim 59, wherein said information embedding function comprises the steps of:

a calculating function for calculating a mean value of coefficients of the low frequency domain in the orthogonal transform coefficient obtained by said orthogonal transform step;

an obtaining function for obtaining a ratio between the mean value and a prescribed fixed value;

a normalizing function for normalizing all the orthogonal transform coefficient by multiplying by the ratio;

an embedding function for embedding the watermark-information into the normalized coefficients; and an inverse-normalizing function for inverse-normalizing the information-embedded coefficients by dividing by the ratio.

64. A recording medium which can be read by a computer and on which is recorded an information embedding program for realizing on a computer:

a blocking function for dividing original data into blocks;

an orthogonal transform function for obtaining coefficients by performing an orthogonal transformation for each block;

an embedding coefficient selecting function for determining coefficients in which watermark-information will be embedded by using a random sequence which is generated by initial value;

an information embedding function for sequentially embedding watermark-information, which has arbitrary length of bits, by quantizing value of said coefficients using a predetermined value for quantization; and an inverse orthogonal transform function for carrying out inverse orthogonal transformation for determining embedded coefficients and non-embedded coefficients to form a block in which the watermark-information is embedded, as well as combining embedded blocks and to reconstruct data which is homogeneous to the original data form wherein in said inverse orthogonal transform step, when the orthogonal transform coefficient obtained in said information embedding function is inverse orthogonal transformed, processing is further performed by utilizing two pixel matrixes, one pixel matrix is obtained by;

changing a DC component value of the orthogonal transform coefficient obtained in said information embedding function to the minimum value of a defined range;

changing all values of the embedded coefficients to 0; and inverse-orthogonal-transforming the changed matrix; and the other pixel matrix is obtained by;

changing a DC component of the orthogonal transform coefficient obtained by said information embedding step to 0;

changing all values of the non-embedded coefficients to 0; and inverse-orthogonal-transforming the changed matrix; so that the value after inverse orthogonal transform does not exceed a defined range of pixel value of the original data form.

65. A recording medium according to claim 64, wherein in said inverse orthogonal transform function, the processing so that the value after inverse orthogonal transform does not exceed a defined range, uses the data obtained by said inverse orthogonal transform, and the whole data is reduced with the mean value of the data as the center.

66. A recording medium which can be read by a computer and on which is recorded an information embedding program for realizing on a computer:

a blocking function for dividing original data into blocks;

an orthogonal transform function for obtaining coefficients by performing an orthogonal transformation for each block;

an embedding coefficient selecting function for determining coefficients in which watermark-information will be embedded by using a random sequence which is generated by initial value;

an information embedding function for sequentially embedding watermark-information, which has arbitrary length of bits, by quantizing value of said coefficients using a predetermined value for quantization; and an inverse orthogonal transform function for carrying out inverse orthogonal transformation for determining embedded coefficients and non-embedded coefficients to form a block in which the watermark-information is embedded, as well as combining embedded blocks and to reconstruct data which is homogeneous to the original data form wherein in said inverse orthogonal transform function, when the orthogonal transform coefficient obtained in said information embedding function is inverse orthogonal transformed, processing is further performed so that the value after inverse orthogonal transform does not exceed a defined range of pixel values of the original data form.

67. A recording medium which can be read by a computer and on which is recorded an information reading program for reading information from data embedded with information by the method according to claim 5 comprising:

a blocking function for dividing said data into blocks;

an embedding coefficient selecting function for determining coefficients from which the watermark-information will be read by using a random sequence which is generated by the initial value which is used at the time of embedding the watermark-information;

an object coefficient computing function for obtaining the coefficients by carrying out orthogonal transformation for each block; and a bit reading function for sequentially reading each bit of the embedded watermark-information and outputting the read watermark-information wherein in said bit reading function, the entropy of the data value of the block to be processed is utilized for determining said predetermined value for quantization.

68. A recording medium according to claim 67, wherein in said object coefficient computing function, said orthogonal transform is an orthogonal transform of a dimension corresponding to the dimension number of the orthogonal transform used at the time of information embedding.

69. A reading medium according to claim 68, wherein in the case where down-sampling of the block is carried out at the time of information embedding, then in said object coefficient computing function, an orthogonal transform coefficient is obtained from the block which is down-sampled so that the block obtained from said blocking function is the same.

70. A recording medium according to claim 67, wherein in the case where down-sampling of the block is carried out at the time of information embedding, then in said object coefficient computing function, an orthogonal transform coefficient is obtained from the block which is down-sampled so that the block obtained from said blocking function is the same.

71. A reading medium which can be read by a computer and on which is recorded an information reading program for reading from data embedded with information by the method according to claim 13 comprising:

a blocking function for dividing said data into blocks;

an embedding coefficient selecting function for determining coefficients from which the watermark-information will be read by using a random sequence which is generated by the initial value which is used at the time of embedding the watermark-information;

an object coefficient computing function for obtaining the coefficients by carrying out orthogonal transformation for each block; and a bit reading function for sequentially reading each bit of the embedded watermark-information and outputting the read watermark-information wherein in said bit reading function, the orthogonal transform coefficient of the low frequency domain in the orthogonal transform coefficients is utilized for normalizing the orthogonal transform coefficients.

72. A recording medium according to claim 71, wherein in said object coefficient computing function, said orthogonal transform is an orthogonal transform of a dimension corresponding to the dimension number of the orthogonal transform used at the time of information embedding.

73. A recording medium according to claim 72, wherein in the case where down-sampling of the block is carried out at the time of information embedding, then in said object coefficient computing function, an orthogonal transform coefficient is obtained from the block which is down-sampled so that the block obtained from said blocking function is the same.

74. A recording medium according to claim 71, wherein in the case where down-sampling of the block is carried out at the time of information embedding, then in said object coefficient computing function, an orthogonal transform coefficient is obtained from the block which is down-sampled so that the block obtained from said blocking function is the same.

75. A recording medium according to claim 71, wherein, when the watermark-information was embedded by the method of claim 63, said bit reading function comprises:

a calculating function for calculating mean value of coefficients of the low frequency domain in the orthogonal transform coefficient obtained by said object coefficient computing step;

an obtaining function for obtaining a ratio between the mean value and a prescribed fixed value;

a normalizing function for normalizing all the orthogonal transform coefficient by multiplying by the ratio; and a reading function for reading each bit of the embedded watermark-information from the normalized coefficients.

\* \* \* \* \*